United States Patent
Weiner et al.

(10) Patent No.: US 12,160,338 B1
(45) Date of Patent: Dec. 3, 2024

(54) SYSTEMS AND METHODS FOR PERFORMING A CONTROL TASK FOR A REAL-WORLD COMMUNICATIONS NETWORK

(71) Applicant: Granite Telecommunications, LLC, Quincy, MA (US)

(72) Inventors: Adam Weiner, Quincy, MA (US); Stephen Herrick, Somerville, MA (US)

(73) Assignee: GRANITE TELECOMMUICATIONS, LLC, Quincy, MA (US)

( * ) Notice: Subject to any disclaimer, the term of this patent is extended or adjusted under 35 U.S.C. 154(b) by 0 days.

(21) Appl. No.: 18/340,591

(22) Filed: Jun. 23, 2023

(51) Int. Cl.
 *H04L 41/0803* (2022.01)
 *H04L 41/22* (2022.01)

(52) U.S. Cl.
 CPC .......... *H04L 41/0803* (2013.01); *H04L 41/22* (2013.01)

(58) Field of Classification Search
 CPC .......................... H04L 41/0803; H04L 41/22
 See application file for complete search history.

(56) References Cited

U.S. PATENT DOCUMENTS

| | | | | |
|---|---|---|---|---|
| 6,275,955 B1 * | 8/2001 | Klein | ................... | G05B 19/056 714/38.12 |
| 2003/0130752 A1 * | 7/2003 | Gasiorek | ............ | G05B 23/0216 700/86 |
| 2004/0029601 A1 | 2/2004 | O'Neill et al. | | |
| 2004/0174390 A1 * | 9/2004 | Shah | ...................... | G06Q 10/10 370/352 |
| 2007/0220451 A1 | 9/2007 | Arnone et al. | | |
| 2009/0276706 A1 * | 11/2009 | Lukes | ................... | G06F 11/263 715/708 |
| 2016/0027019 A1 * | 1/2016 | Michaelangelo | ........................... | G06Q 10/06316 705/7.26 |
| 2016/0155249 A1 * | 6/2016 | Moore | ...................... | G06F 8/34 715/227 |

(Continued)

OTHER PUBLICATIONS

"Wire Your Ideas With React Flow—A highly customizable React component for building node-based editors and interactive diagrams," pp. 1-7, https://reactflow.dev, downloaded Sep. 15, 2023.

(Continued)

*Primary Examiner* — Abdulkader M Alriyashi
(74) *Attorney, Agent, or Firm* — Hamilton, Brook, Smith & Reynolds, P.C.

(57) ABSTRACT

Embodiments perform a control task for a real-world communications network. First, a data structure is loaded in memory. The data structure includes node(s) corresponding to step(s) of a workflow. Next, the workflow is executed, to perform the task, by traversing a subset of the node(s). Traversing includes, at each node of the subset, determining a node type of the node. Based on the node type, a graphical representation of the node is rendered on a display. Responsive to the rendering, a data input is received. Further, responsive to determining the node type is not a final node type: (i) a next node of the subset is determined based on the input and response value(s) (associated with the node type) of the node and (ii) a move to the next node occurs. Responsive to determining the node type is the final node type, performance of the task is completed.

18 Claims, 93 Drawing Sheets

(56) References Cited

U.S. PATENT DOCUMENTS

| | | | |
|---|---|---|---|
| 2017/0286199 A1* | 10/2017 | Soini | G06F 9/44 |
| 2019/0268288 A1* | 8/2019 | Chandra | G06F 9/541 |
| 2022/0058065 A1* | 2/2022 | Kiefer | G06F 9/541 |
| 2022/0210053 A1 | 6/2022 | Du | |

OTHER PUBLICATIONS

International Search Report and Written Opinion received for PCT Patent Application No. PCT/US2024/034685, mailed on Oct. 7, 2024, 21 pages.

\* cited by examiner

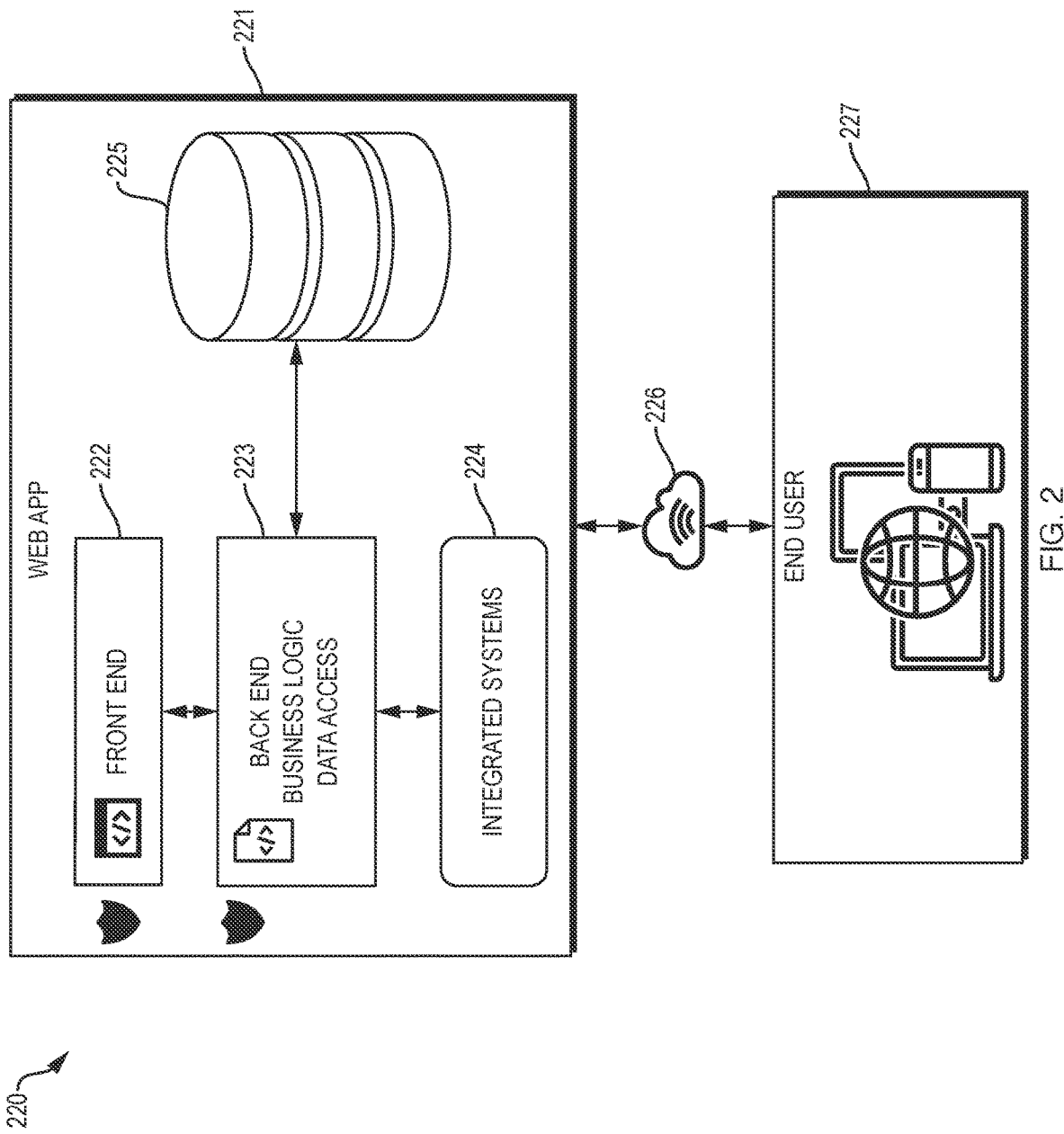

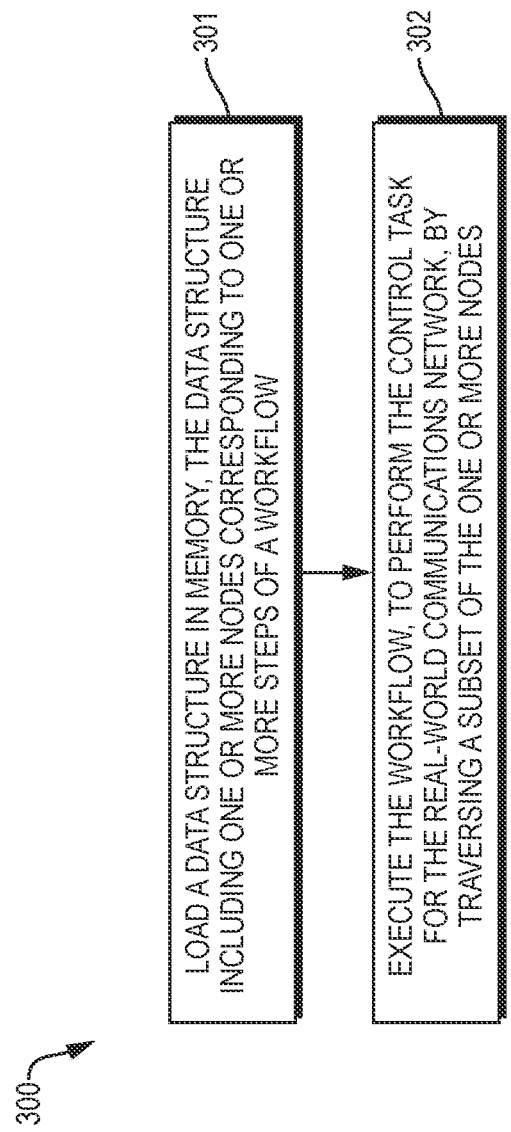

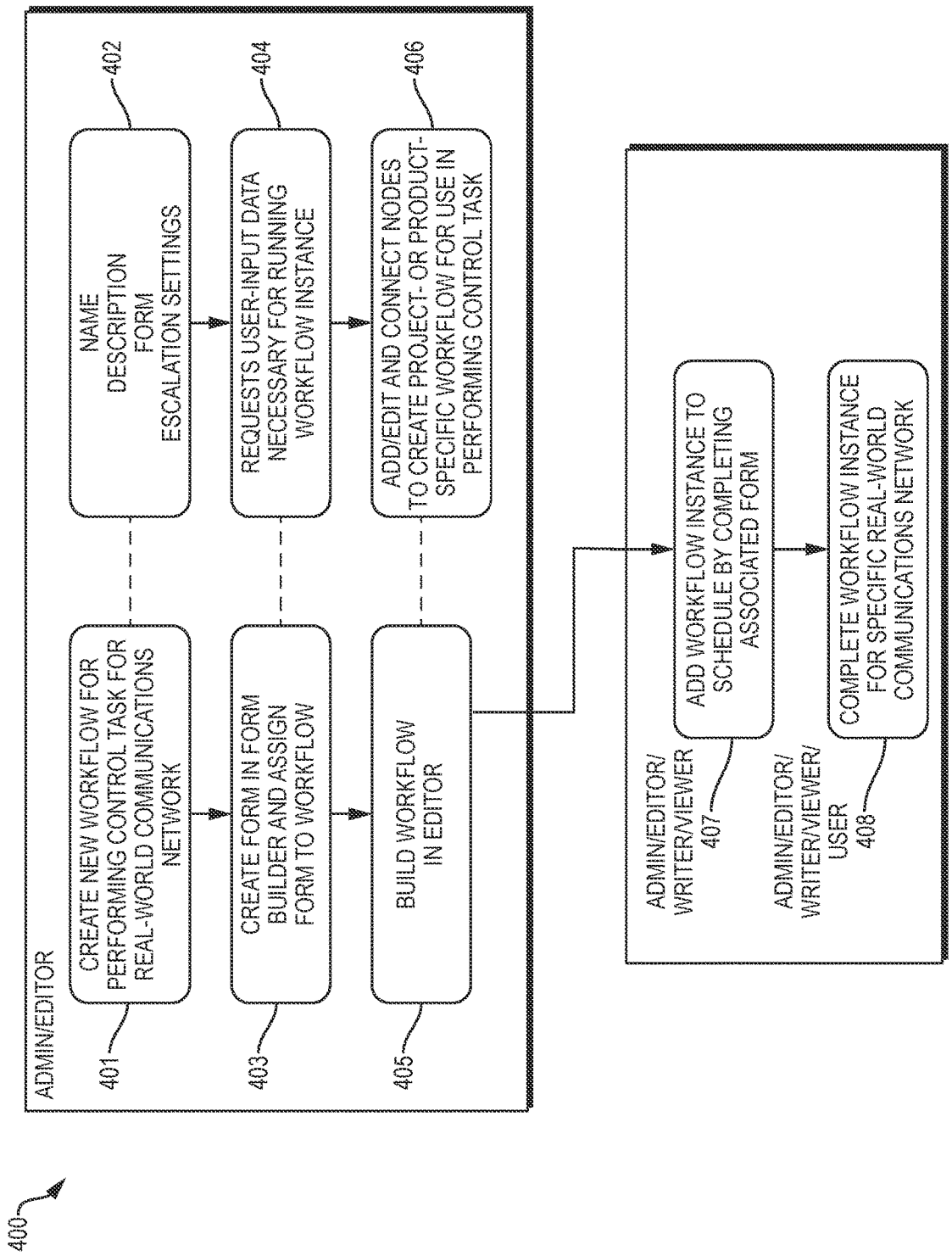

```
998 ─┐
      ↘
998a ── {"type": "radio",
998b ── "data": {
998b1 ──   "status": null,
           "message": "",
           "question": "Do you have access to the customer telco room?",
998b2 ──   "answers": [
998b2a ──    {"text": "Yes"},
998b2b ──    {"text": "No"}
           ],
           "position": {
             "x": 303.35983855839664,
             "y": 3417.478576748215
           },
998c ──    "id": "radio-2",
           "width": 384,
           "height": 141,
           "selected": false,
           "positionAbsolute": {
             "x": 303.35983855839664,
             "y": 3417.478576748215
           },
           "dragging": false
         }
```

FIG. 9B

```
{
    "source": "radio-2",
    "sourceHandle": "radio-2_1",
    "target": "escalate-2",
    "targetHandle": "escalate-2", "type":
"custom",
    "label": "No",
    "id": "edge-radio-2radio-2_1-escalate-2escalate-2",
    "style": {
        "stroke": "#b1b1b7",
        "opacity": 1,
        "strokeWidth": 2
    },
    "animated": false,
    "selected": false
```

```
1411 ── { "type": "api",
1412 ──   "data": {
1412a ──    "name": "Getting Carrier Circuit ID",
1412b ──    "endpoint": "",
1412b1 ──   "results": [
             {
              "status": "200",
              "success": "false",
              "response": "Timeout error"
             },
1412b2 ──    {
              "status": "200",
              "success": "false",
              "response": "Unable to find NSO service"
             },
1412b3 ──    {
              "status": "200",
              "success": "true",
              "response": ""
             },
1412b4 ──    {
              "status": "200",
              "success": "false",
              "response": "Unable to locate Service Instance"
             }
            ],
            "images": []
           },
           "position": {
              "x": -179.3037264829254,
              "y": 3898.05820384697.9
           },
1412c ──   "id": "api-1",
           "width": 384,
           "height": 249,
           "selected": false,
           "positionAbsolute": {
              "x": -179.3037264829254,
              "y": 3898.05820384697.9
           },
           "dragging": false
          }
```

```
{
  "answers": [
    {
      "next": "api-1",
      "text": "Yes"
    },
    {
      "next": "escalate-2",
      "text": "No"
    }
  ],
  "id": "radio-2",
  "images": null,
  "question": "Do you have access to the customer telco room?",
  "referenceFlowId": null,
  "type": "radio"
}
```

2410  
2411 — "answers"  
2411a  
2411a1 — "next": "api-1"  
2411a2 — "text": "Yes"  
2411b  
2411b1 — "next": "escalate-2"  
2411b2 — "text": "No"  
2412 — "id": "radio-2"  
2413 — "question": "Do you have access to the customer telco room?"  
2414 — "type": "radio"

FIG. 24B

```
2811 ── {
2812 ──   "id": "api-1",
2813 ──   "referenceFlowId": null,
          "type": "api",
          "apis": [
            {
  2813a ──    "name": "Getting Carrier Circuit ID",
  2813b ──    "endpoint": ""
            }
          ],
2814 ──   "results": [
  2814a ──   {
    2814a2 ──  "status": 200,
               "success": false,
               "response": "Timeout error",      ── 2814a3
    2814a4 ──  "next": "escalate-3"
             },
  2814b ──   {
    2814b2 ──  "status": 200,
               "success": false,
               "response": "Unable to find NSO service",  ── 2814b3
    2814b4 ──  "next": "escalate-4"
             },
  2814c ──   {
    2814c2 ──  "status": 200,
               "success": true,
               "response": "",
    2814c4 ──  "next": "radio-4"                 ── 2814c3
             },
  2814d ──   {
    2814d2 ──  "status": 200,
               "success": false,
               "response": "Unable to locate Service Instance",  ── 2814d3
    2814d4 ──  "next": "escalate-32"
             }
          ]
        }
```

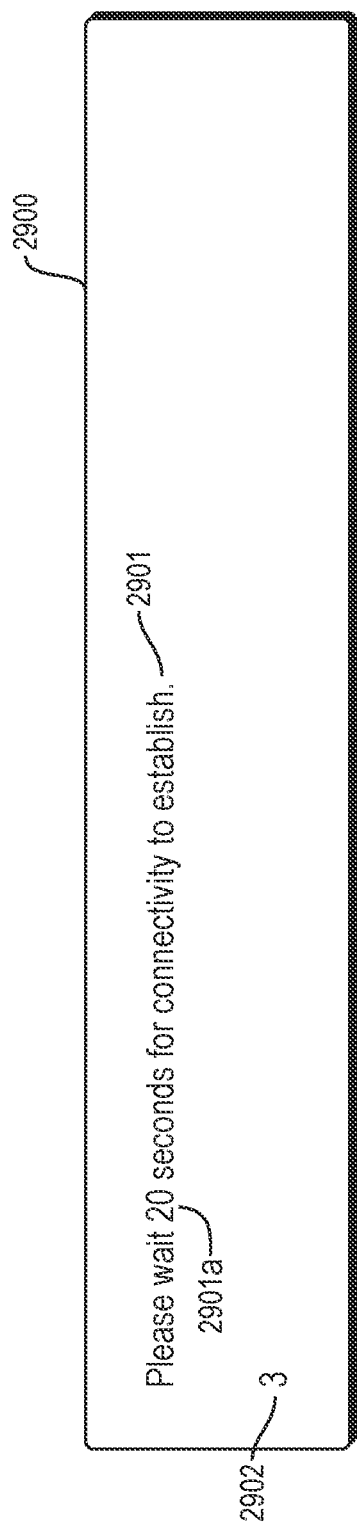

FIG. 39

New Turn Up — 3900

Workflow Name*: Start — 3901

Account Number*: 01234567
Customer Name*: Start Test
Ticket*: 123456789
Address*: 123 Street
Suite/Bldg:
City*: Anyplace
State*: AK
Zip Code*: 01234 — 3903b
Dispatch Date*: 06/14/2023
Dispatch Time*: 05:00 PM — 3902, 3903a Line
Line Type: Phone — 3904a
Number: 5555555555
Line Type: Fax — 3904b
Number: 5555555566

Cancel  Save

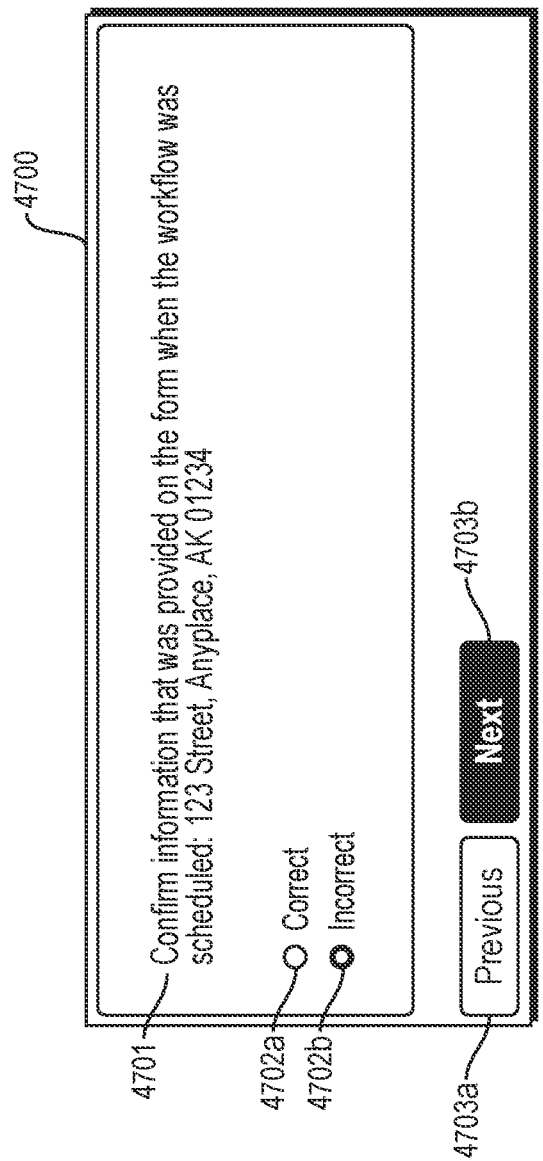

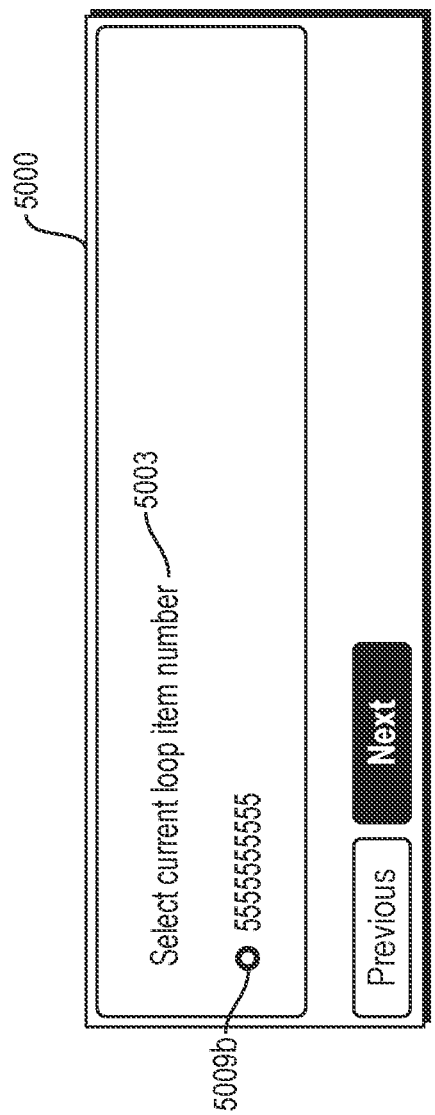

SYSTEMS AND METHODS FOR PERFORMING A CONTROL TASK FOR A REAL-WORLD COMMUNICATIONS NETWORK

BACKGROUND

Communication networks and the use of devices that rely on communication networks is widespread. As such, these networks and devices have become essential for many facets of life.

SUMMARY

Because of the widespread use and reliance upon communication networks and devices, the proper functioning, maintenance, and establishment of said networks, and devices that utilize the networks, has become increasingly important. While methods to perform various control tasks (e.g., maintenance and repair tasks) for these networks and devices exist, the existing methods could benefit from improvements. Embodiments provide such functionality.

One such embodiment is directed to a computer-implemented method for performing a control task for a real-world communications network. The method includes loading a data structure in memory. The data structure includes node(s) corresponding to step(s) of a workflow. In an embodiment, the data structure may be, e.g., a decision tree, or any other suitable data structure known to those of skill in the art. Further, the method includes executing the workflow, to perform the control task for the real-world communications network, by traversing a subset of the node(s). The traversing includes, at each node of the subset, determining a node type of the node. Based on the determined node type, a graphical representation of the node is rendered on a display. Responsive to the rendering, a data input is received. Further, responsive to determining the node type is not a final node type, the method determines a next node of the subset based on the received data input and response value(s) of the node. The response value(s) are associated with the determined node type. Also, responsive to determining the node type is not a final node type, the method moves to the determined next node. In the alternative, responsive to determining the node type is the final node type, the method completes the performance of the control task for the real-world communications network.

In some aspects, rendering includes rendering the response value(s) on the display. Receiving the data input includes receiving a user input. Further, determining the next node of the subset includes identifying, based on the received user input, given response value(s) of the response value(s). Determining the next node of the subset also includes determining the next node based on the given response value(s), i.e., the aforementioned identified response values. In some implementations, the node type of the given node is a radio button type, a checkbox type, or a field input type.

In some embodiments, for a given node of the subset, the node type is an application programming interface (API) type. In such an embodiment, receiving the data input may include receiving an API result by invoking an API associated with the given node. In addition, rendering includes rendering the API result on the display. Further, determining the next node of the subset includes identifying, based on the received API result, a given response value of the response value(s). Determining the next node of the subset also includes determining the next node based on the given response value.

In some aspects, for a given node of the subset, the node type is a countdown type and receiving the data input includes obtaining a time interval associated with the given node. Additionally, rendering includes rendering the time interval on the display. In some implementations, executing the workflow is also suspended for a duration of the time interval.

In some embodiments, for a given node of the subset, the node type is an escalation type. According to such an embodiment, rendering includes rendering, on the display, a communications interface for a communications channel associated with the given node. In addition, receiving the data input includes receiving a user input in response to rendering the communications interface. Further, determining the next node of the subset includes identifying, based on the received user input, a given response value of the response value(s). Determining the next node of the subset may include determining the next node based on the given response value. In some aspects, receiving the user input includes acquiring an image relating to a real-world device.

In some aspects, for a given node of the subset, the node type is a conditional type. In such an embodiment, receiving the data input includes obtaining prior input(s) corresponding to node(s) of the subset prior to the given node in the workflow. Such an embodiment determines the next node of the subset by identifying, based on the prior input(s), a given response value of the response value(s). Determining the next node of the subset also includes determining the next node based on the given response value.

In some embodiments, for a given node of the subset, rendering includes rendering an image on the display.

In some implementations, the method further includes generating the data structure by defining the node(s). According to an example embodiment, defining the node(s) includes, for each node, (i) creating, in a database memory, based on a user input, a node data structure corresponding to the node, (ii) determining, based on the user input, a node type of the node, and (iii) determining, based on the node type and the user input, edge response value(s) of the node. Defining the node(s) also includes, for each node, creating, based on the user input, edge(s) of the data structure corresponding to the edge response value(s). Each of the edge(s) defines a connection between the node and an adjacent node of the data structure.

In embodiments, the control task can be any network control task known to those of skill in the art. For example, according to an embodiment, the control task for the real-world communications network includes a control task for a real-world device. The control task for the real-world device may include, among other examples, activating the real-world device, configuring the real-world device, verifying operating parameter(s) of the real-world device, instantiating virtual network function(s) for the real-world device, or instantiating virtual machine(s) for the real-world device.

In some implementations, a computer-based system is disclosed for performing a control task for a real-world communications network. The system includes a display, a processor, and a memory with computer code instructions stored thereon. In addition, the processor and the memory, with the computer code instructions, are configured to cause the system to implement any embodiments or combination of embodiments described herein.

In some aspects, a non-transitory computer program product is disclosed for performing a control task for a real-world communications network. The computer program product includes a computer-readable medium with computer code instructions stored thereon. In addition, the computer code instructions are configured, when executed by a processor, to cause an apparatus associated with the processor to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2 is a simplified block diagram of a system for performing a control task for a real-world communications network according to an embodiment.

FIG. 3A is a flow diagram of a method for performing a control task for a real-world communications network according to an embodiment.

FIG. 4 is a flow diagram of a method for performing a control task for a real-world communications network according to an embodiment.

FIG. 9B is an exemplary node data structure according to an embodiment.

FIG. 9C is an exemplary edge data structure according to an embodiment.

FIG. 10B illustrates a form interface for defining a checkbox type node according to an embodiment.

FIG. 14B is an exemplary node data structure according to an embodiment.

FIG. 24B is an exemplary map entry data structure according to an embodiment.

FIG. 28B is an exemplary map entry data structure according to an embodiment.

FIG. 29 illustrates rendering of a countdown or wait type node according to an embodiment.

FIG. 39 illustrates a form interface for scheduling execution of a workflow according to an example embodiment.

FIG. 47B illustrates rendering a node of FIG. 47A and associated response values.

FIGS. 50D-E illustrate rendering the loop type node of FIG. 50A.

DETAILED DESCRIPTION

A description of example embodiments follows.

Figure 1:
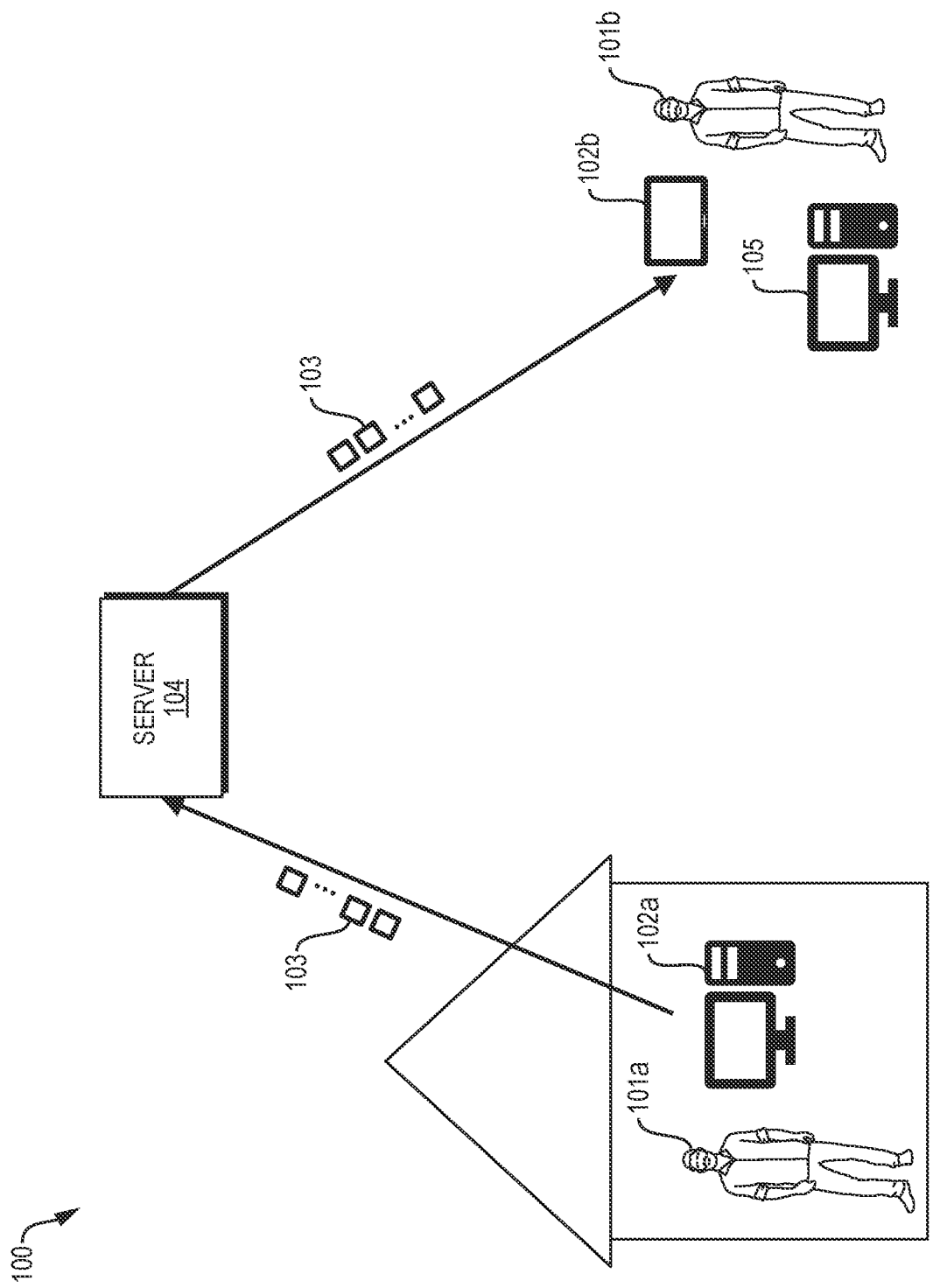
FIG. 1 is a simplified illustration of a system for performing a control task for a real-world communications network according to an embodiment.

FIG. 1 is a simplified illustration of a system 100 for performing a control task for a real-world communications network according to an embodiment. System 100 includes users 101a and 101b, user devices 102a and 102b, server 104, and device 105. User 101a may possess, e.g., business domain knowledge and/or engineering expertise, and may use such knowledge and experience in the process of formulating or developing steps for a workflow of a network control task. Further, user 101a creates the workflow using a device, e.g., user device 102a (or any other computing device known to those of skill in the art). User 101b may be, e.g., a field engineer or customer support technician. Similarly, user device 102b may be, e.g., a mobile, handheld, portable device, or any other computing device known to those of skill in the art. In the system 100, the user device 102b may be employed by user 101b to execute a workflow of a network control task.

To illustrate operation of system 100, consider an example where user 101a creates a workflow using user device 102a according to the method 400 described hereinbelow in relation to FIG. 4. The created workflow is stored in data structure 103 and transmitted from user device 102a via a network to, e.g., a cloud-based server, such as server 104. Subsequently, data structure 103 is downloaded via a network from server 104 to user device 102b, where the workflow is executed by user 101b via user device 102b to, for example, activate device 105.

In some embodiments, a computer-implemented method is disclosed for performing a control task for a real-world communications network. The method includes loading a data structure, e.g., data structure 103 received via server 104, in memory, e.g., a memory of user device 102b. The data structure includes node(s) corresponding to step(s) of a workflow. Further, the method includes executing, e.g., via user device 102b, the workflow, to perform the control task for the real-world communications network, by traversing a subset of the node(s). The traversing includes, at each node of the subset, determining a node type of the node. Based on the determined node type, a graphical representation of the node is rendered on a display, e.g., a display of user device 102b. Responsive to the rendering, a data input, e.g., an input from user 101b, is received. Further, responsive to determining the node type is not a final node type, the method determines a next node of the subset based on the received data input and response value(s) of the node. The response value(s) are associated with the determined node type. Also responsive to determining the node type is not a final node type, the method moves to the determined next node. Responsive to determining the node type is the final node type, the method completes the performance of the control task for the real-world communications network.

In some implementations, the method further includes generating the data structure, e.g., data structure 103, by defining the node(s). In some aspects, defining the node(s)

includes, for each node: (i) creating, in a database memory, e.g., a database memory of user device 102*a*, based on a user input, e.g., an input from user 101*a*, a node data structure corresponding to the node, (ii) determining, based on the user input, a node type of the node, and (iii) determining, based on the node type and the user input, edge response value(s) of the node. Defining the node(s) may also include, for each node, creating, based on the user input, edge(s) of the data structure corresponding to the edge response value(s). According to an embodiment, each of the edge(s) defines a connection between the node and an adjacent node of the data structure.

In other embodiments, the data structure, e.g., data structure 103, may be transmitted from user device 102*a* to user device 102*b*, such as via server 104.

Application Design

FIG. 2 is a simplified block diagram of a system 220 for performing a control task for a real-world communications network according to an embodiment. The system 220 includes web application 221, network 226, and end user device 227. Moreover, web application 221 includes front end module 222, back end/business logic/data access module 223, integrated systems module 224, and database 225. According to an aspect, front end 222 may provide a user interface, which may allow users, e.g., user 101*a* and/or 102*b* (FIG. 1), to create and update workflows via an exemplary workflow editor module, and to step through or interact with previously created workflows via an exemplary workflow execution module. In an implementation, back end 223 may perform various functions for the exemplary workflow editor and execution modules. With respect to the former, back end 223 may carry out data processing that translates data created or input via front end 222 into data structures for storage in a database, e.g., database 225, or any other suitable storage system known to those of skill in the art. As for the latter—the exemplary workflow execution module—back end 223 may use, e.g., database 225, to store data concerning a specific execution instance of a workflow. Such data may include, e.g., actions taken during workflow execution, an execution sequence of a workflow, inputs entered and/or results (such as API results) at each step of a workflow, and/or workflow metadata (such as a workflow instance ID, a workflow creation and/or modification date, or any other suitable known metadata types). In an aspect, integrated systems 224 may provide an API, e.g., a REST (representational state transfer) or other suitable known API, for accessing product-level data, such as operational data relating to real-world devices/products for which a control task may be performed according to embodiments of the present disclosure. Data accessed via integrated systems 224 may be retrieved from in-house or proprietary systems, vendor systems, external systems, third-party systems, or any other suitable known systems, including, for example, Juniper® SSR (Session Smart™ Router), Fortinet® FortiManager®, ADVAR Director, or Granite® Epik™'s MyEpik portal.

Figure 3B:
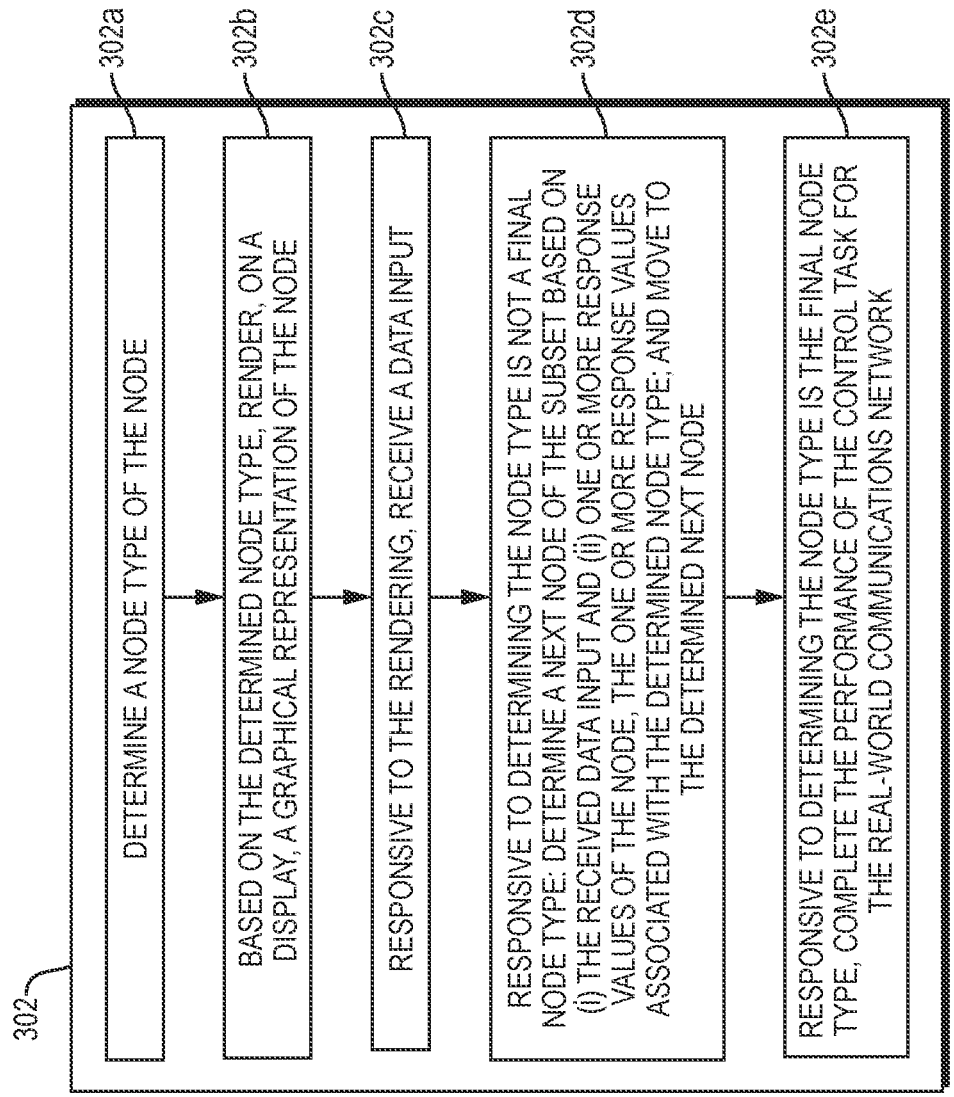
FIG. 3B is a flow diagram illustrating exemplary operations performed by the method of FIG. 3A according to an embodiment.

FIGS. 3A and 3B are flow diagrams of a method 300 for performing a control task for a real-world communications network according to an embodiment. The method 300 may be implemented by a computing device as described herein, e.g., end user devices 102*a*/102*b* (FIG. 1) and/or 227 (FIG. 2).

Figure 3C:
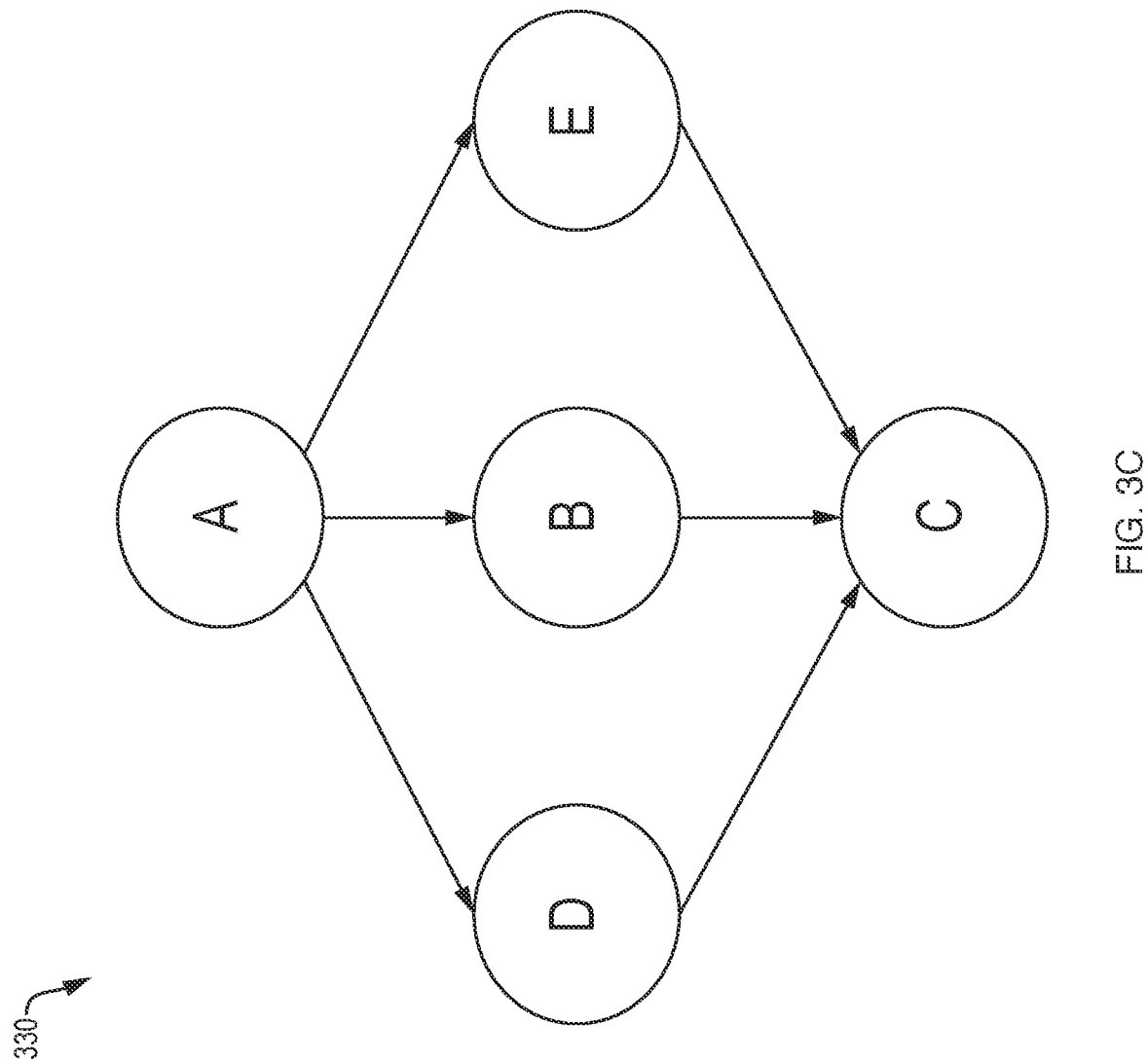
FIG. 3C is an example data structure according to an embodiment.

FIG. 3C is an example data structure 330 according to an embodiment. As shown in FIG. 3C, data structure 330 includes nodes A, B, C, D, and E. Data structure 330 is utilized hereinbelow to illustrate functionality of method 300.

Returning to FIG. 3A, method 300 starts at step 301 by loading a data structure, e.g., data structure 103 (FIG. 1) or data structure 330, in memory. The data structure includes node(s), e.g., nodes A, B, C, D, and/or E of FIG. 3C, corresponding to step(s) of a workflow. Then, at step 302, method 300 executes the workflow, to perform the control task for the real-world communications network, by traversing a subset of the node(s). The traversing includes, at each node of the subset, performing some or all operations depicted in FIG. 3B.

FIG. 3B is a flow diagram illustrating exemplary operations performed by method 300 at step 302 of FIG. 3A according to an embodiment. As shown in FIG. 3B, step 302 includes nested steps 302*a*-*e*. At step 302*a*, method 300 first determines a node type of the node. Next, at step 302*b*, based on the determined node type, method 300 renders, on a display, e.g., a display of user device 102*b* (FIG. 1), a graphical representation of the node. At step 302*c*, responsive to the rendering, method 300 receives a data input, e.g., an input from user 101*b* (FIG. 1). At step 302*d*, responsive to determining the node type is not a final node type, method 300, first, determines a next node of the subset based on the received data input and response value(s) of the node and, second, moves to the determined next node. The response value(s) are associated with the determined node type. Thus, for example, at node A of FIG. 3C, method 300 may first determine, based on the received data input and response value(s) of node A, that node B is a next node, and then move to node B. Likewise, at node B, after determining, based on the received data input and response value(s) of node B, that node C is a next node, method 300 may then move to node C.

According to an embodiment, method 300 determines whether a node is a final node based upon a hierarchical structure of the workflow. For instance, in the example workflow of FIG. 3C, starting and intermediate nodes A, B, D, or E are not final nodes, while end node C is a final node.

Continuing with FIG. 3B, at step 302*e*, responsive to determining the node type is the final node type—e.g., if the node is a final node such as node C of FIG. 3C—method 300 completes the performance of the control task for the real-world communications network.

According to an embodiment, completing performance of the control task by method 300 may include providing an indication or otherwise notifying user(s) that the task was completed. Further, results of performing the task may be reported or provided to user(s) and/or stored or tracked.

Process Flow

FIG. 4 is a flow diagram of a method 400 for performing a control task for a real-world communications network according to an embodiment. At step 401, method 400 starts by creating a new workflow for performing a control task for a real-world communications network. Creating a new workflow may include, at step 402, receiving data such as a workflow name, workflow description, a form, and/or escalation settings, among other examples. Next, at step 403, method 400 generates or populates the form in a software tool, such as a "Form Builder" application, and assigns the form to the workflow. Generating and assigning the form may include, at step 404, requesting user-input data, e.g., data input by a workflow administrator/editor such as user 101*a* (FIG. 1), which data is used for running the workflow instance. In an embodiment, the form may be used to store administrative data such as customer information and scheduling information for performing the workflow, among other examples. At step 405, method 400 builds the workflow in a software tool, such as a workflow "Editor" application, an example of which is described in more detail hereinbelow in relation to FIGS. 5-6, 8A-B, 9A-C, 10A-B, 11, 12A-B, 13A-B, 14A-B, 15, 16A-B, and 17-20. Building the workflow may include, at step 406, adding and/or editing and connecting nodes to create a project- or product-specific workflow for use in performing the control task.

For example, in some embodiments, at step 406, method 400 may generate a data structure, e.g., data structure 103 (FIG. 1) or 330 (FIG. 3C), for the workflow by defining the nodes, e.g., nodes A, B, C, D, and/or E (FIG. 3C). In an aspect, defining the nodes may include, for each node, (i) creating, in a database memory, e.g., a database memory of user device 102a (FIG. 1), based on a user input, e.g., an input from user 101a (FIG. 1), a node data structure corresponding to the node, (ii) determining, based on the user input, a node type of the node, and (iii) determining, based on the node type and the user input, edge response value(s) of the node. Defining the nodes may also include, for each node, creating, based on the user input, edge(s) of the data structure corresponding to the edge response value(s). Each of the edge(s) may define a connection between the node and an adjacent node of the data structure.

Continuing with FIG. 4, at step 407, method 400 schedules the workflow instance for later execution by completing the associated form. Step 407 may include receiving user input from a workflow administrator, editor, writer, and/or viewer, such as user 101a or 101b (FIG. 1). Finally, at step 408, method 400 executes/completes the workflow instance by performing a control task for a real-world communications network. Step 408 may include receiving user input from a workflow administrator, editor, writer, viewer, and/or user, such as user 101a or 101b.

Workflow Editor

In an embodiment, an exemplary workflow editor software tool provides a graphical user interface (GUI) that visually represents a workflow, and allows a user to draw or create logic, including steps or nodes, for a workflow.

Nodes, Handles, and Edges

Figure 5:
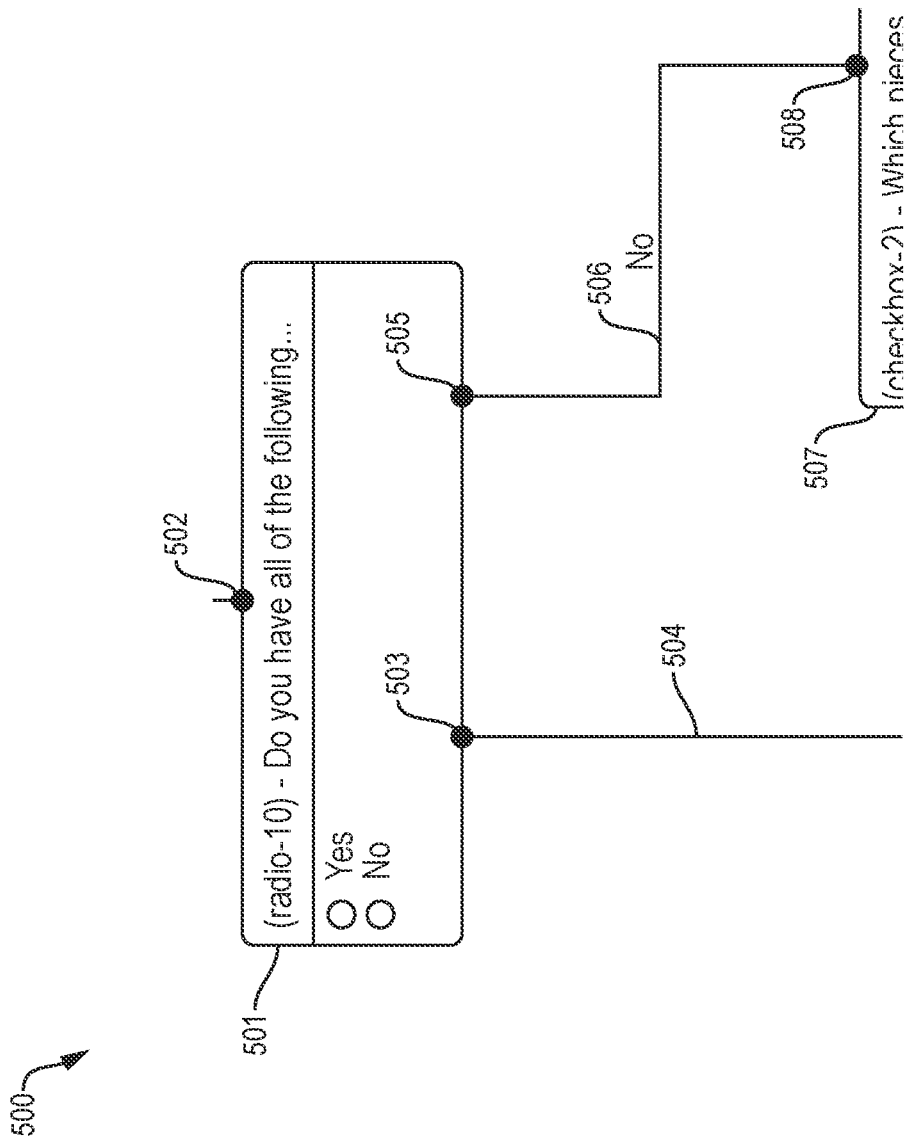
FIG. 5 is an image of workflow nodes according to an embodiment.

FIG. 5 is an image 500 of workflow nodes 501 and 507 according to an embodiment. Image 500 may be an example of a workflow editor tool GUI. In an implementation, node 501 includes handles 502, 503, and 505 as shown in FIG. 5 by three corresponding black dots on an outside border of node 501. According to an aspect, a handle may be used to connect nodes.

Continuing with FIG. 5, also shown are edge 504 extending from handle 503 of node 501, and edge 505 between handle 505 of node 501 and handle 508 of node 507. In an embodiment, an edge may be a connection between two node handles, and may indicate execution or logical paths of a workflow.

Figure 6:
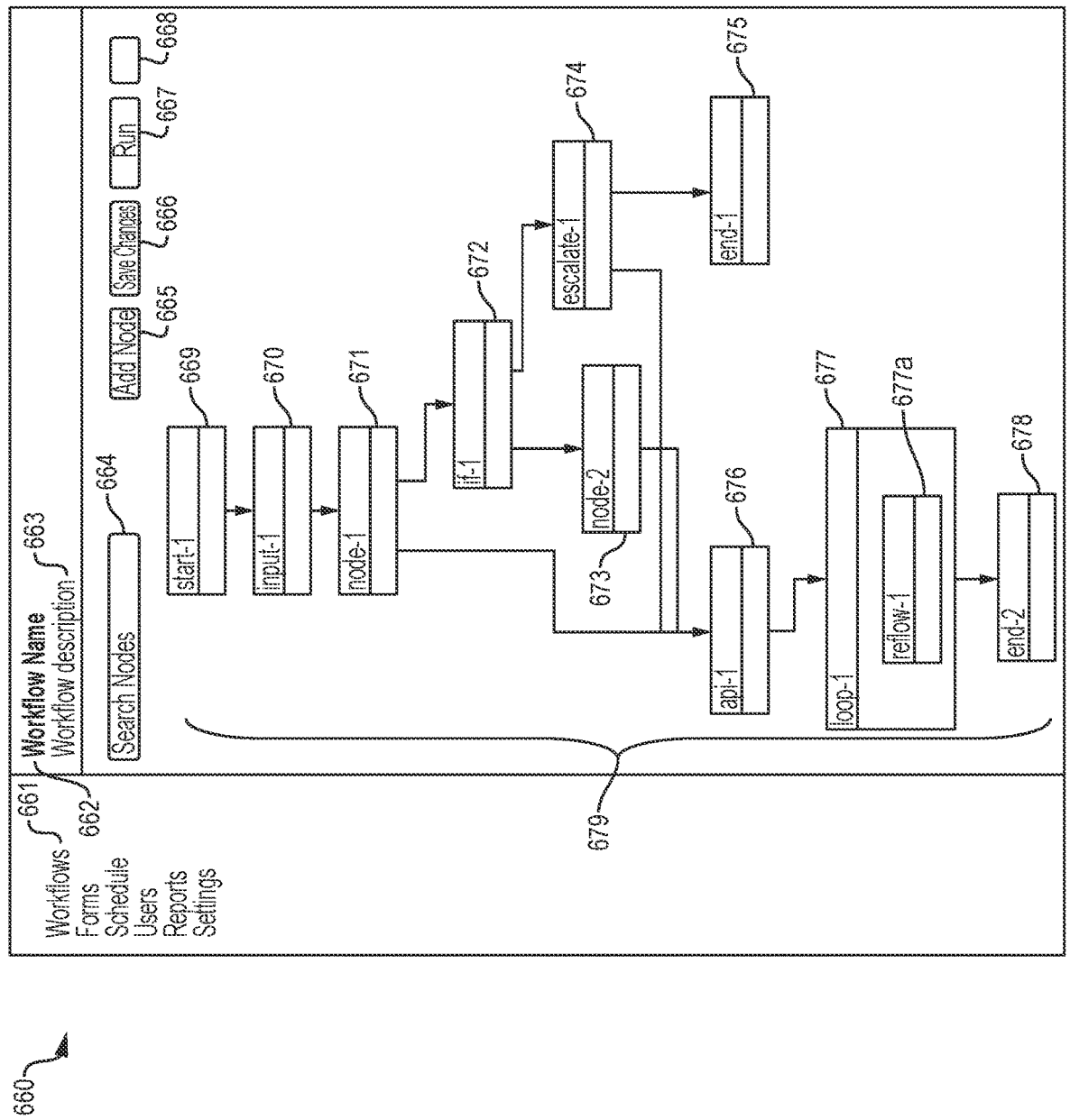
FIG. 6 illustrates a user interface for an exemplary workflow editor software tool according to an embodiment.

FIG. 6 illustrates a user interface 660 for an exemplary workflow editor software tool according to an embodiment. In an implementation, user interface 660 may be displayed by, e.g., user device 102a or 102b for viewing by user 101a or user 102b (FIG. 1), respectively. As shown in FIG. 6, user interface 660 includes menu pane 661, workflow name 662, workflow description 663, search bar 664, and buttons 665-668. User interface 660 also displays a workflow of a control task, e.g., a workflow having data structure 679, 103 (FIG. 1), 330 (FIG. 3C), that includes nodes 669-678. Nodes 669-678 and their interconnections represent steps/paths of a control task. Further displayed in user interface 660 is nested node 677a included in loop type node 677. According to an aspect, user interface 660 may also include (not shown) buttons for adjusting or modifying a view of a workflow, including, for example: (i) Zoom In; (ii) Zoom Out; (iii) Fit to Screen-Zoom to fit entire workflow in a window; and (iv) Toggle Interactivity-Lock nodes in place when interactivity is configured as "locked."

In some embodiments, each node in a data structure may have a unique identifier (ID). For example, in FIG. 6, nodes 669-677, 677a, and 678 have unique IDs "start-1," "input-1," "node-1," "if-1," "node-2," "escalate-1," "end-1," "api-1," "loop-1," "reflow-1," and "end-2," respectively. In an aspect, user interface 660 may indicate node types, e.g., an API type or an escalation type, with different colors or shading, among other examples.

In other embodiments, user interface 660 may enable "quick actions" for each node. For example, in an implementation, quick actions for a given node may include editing the node, duplicating or copying the node, deleting the node, and/or launching a dry run of a workflow starting at the node. According to an aspect, available quick actions for a given loop type node may further include adding a sub-node to the loop type node. In an embodiment, each quick action may have a corresponding button or icon (not shown).

Further, in yet other embodiments, buttons 665-668 include add node button 665, save changes button 666, run button 667, and dropdown menu button 668. According to an implementation, add node button 665 may be used to add a new node to a workflow displayed by user interface 660, as described in more detail with respect to FIG. 7 hereinbelow. If changes have been made to a workflow since it was last saved, save changes button 666 will be active, thereby enabling new changes to be saved. Otherwise, save changes button 666 will be inactive. In an aspect, save changes button 666 may be displayed by user interface 660 with a white color when inactive, or a blue color when active. Run button 667 may be used to launch a dry run of a workflow for testing purposes. According to an embodiment, dropdown menu button 668 may, when clicked or otherwise engaged, present menu options including, for example: (i) Reset-Revert a workflow to a last saved version; (ii) Layout-Automatically organize a workflow; (iii) Export-Download a text file of a workflow; and (iv) Import-Upload a text file of a workflow. In an implementation, a file used to export or import a workflow may be in, e.g., JavaScript Object Notation (JSON) format, or any other suitable format known to those of skill in the art.

Building a Workflow in a Workflow Editor

In an embodiment, a workflow may begin with a start type node. According to an implementation, an input type node may follow a start type node. In an embodiment, an input type node may request information from a user, e.g., a field engineer or customer support technician such as user 101b (FIG. 1), among other examples.

Figure 7:
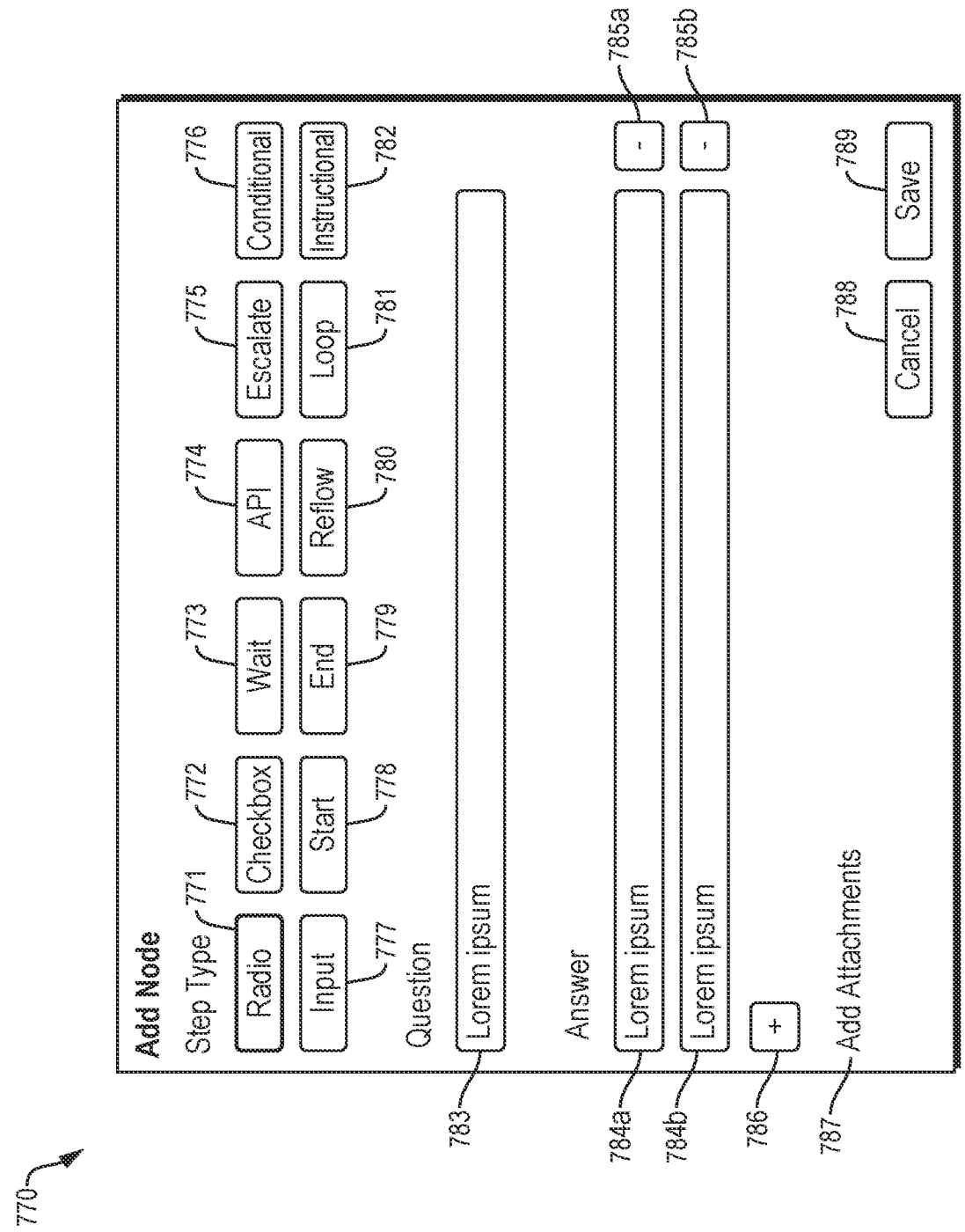
FIG. 7 illustrates an interface for adding a new node in an exemplary workflow editor software tool according to an embodiment.

FIG. 7 illustrates an interface 770 for adding a new node in an exemplary workflow editor software tool according to an embodiment. As discussed hereinabove with respect to FIG. 6, according to an aspect, interface 770 may be displayed in response to, e.g., selecting or clicking add node button 665. In an implementation, interface 770 may also or alternately be accessed by double clicking on a source handle of a node, e.g., handle 503 or 505 of node 501 (FIG. 5). According to an embodiment, interface 770 may be a dialog, such as a modal or nonmodal dialog.

Continuing with FIG. 7, interface 770 includes step type selection buttons 771-782, attachments button 787, cancel button 788, and save button 789. In an aspect, step type selection buttons 771-782 may be used for adding, respectively, a radio button type node, a checkbox type node, a countdown or wait type node, an API type node, an escalation type node, a conditional type node, an input type node, a start type node, an end or final type node, a reflow (reference flow) type node, a loop type node, or an instructional type node, among other examples. According to an implementation, attachments button 787 may be used to include attachment(s) with the new node to be added. In an embodiment, node attachment(s) may include media items to be displayed as part of rendering the node. According to an aspect, media items may be content items such as photos, videos, Graphics Interchange Format (GIF) images, and any other type of content item known to those of skill in the art. In an embodiment, attachment(s) may be included with any type of node that is rendered, such as a radio button type node, a checkbox type node, a wait/countdown type node, an API type node, an escalation type node, a field input type node, a start node, or a final node type, among other examples. Node attachment(s) are discussed in more detail hereinbelow in relation to FIG. 31. According to an aspect, cancel button 788 may be used to terminate a process of adding a new node, while save button 789 may be used to finalize a new node to be added.

In an implementation, interface 770 may change depending on a node type being added. In the example illustrated in FIG. 7, button 771 is selected for adding a radio button type node and, as such, user interface 770 displays question/title input field 783 and button 786 for adding handles to the node, e.g., handles with corresponding answer input fields 784a and 784b. In an embodiment, when adding a radio button type node, user interface 770 may also display remove buttons 785a and 785b for removing handles/answers 784a and 784b, respectively.

Exemplary Node Types

The description below in relation to FIGS. 8A-B, 9A-C, 10A-B, 11, 12A-B, 13A-B, 14A-B, 15, 16A-B, and 17-20 outlines example node types that may be part of network control task workflows according to embodiments. In operation, a user defines a control task workflow using a combination of nodes interconnected so as to implement the desired task. Stepping through the nodes results in execution of the control task. It is noted that while several node types are described below, embodiments are not limited to these node types and other node types may be used to implement any control task workflow logic that is desired.

Radio Button Node

In some embodiments, a radio button type node may be used to permit a selection of only one of multiple choices or answers.

Figure 8A:
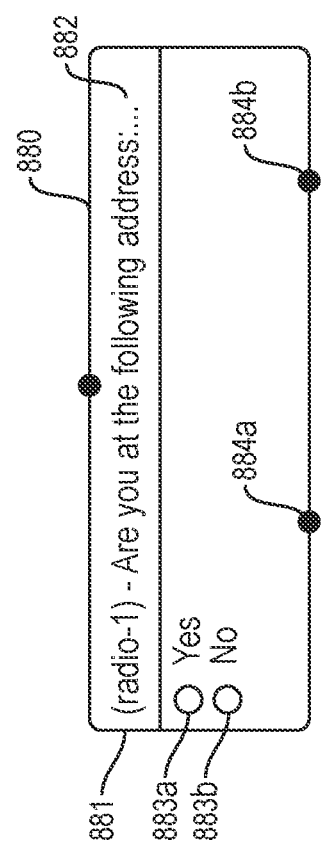
FIG. 8A illustrates defining a radio button type node according to an example embodiment.

FIG. 8A illustrates defining a radio button type node 880 according to an example embodiment. As shown in FIG. 8A, in a workflow editor interface, radio button type node 880 is displayed with unique ID 881, question 882, and answer choices 883a and 883b, which correspond to handles 884a and 884b. As such, for a workflow using radio button 880, if answer 883a is selected, the workflow moves to a node connected to handle 884a and, if answer 883b is selected, the workflow moves to a node connected to handle 884b.

Figure 8B:
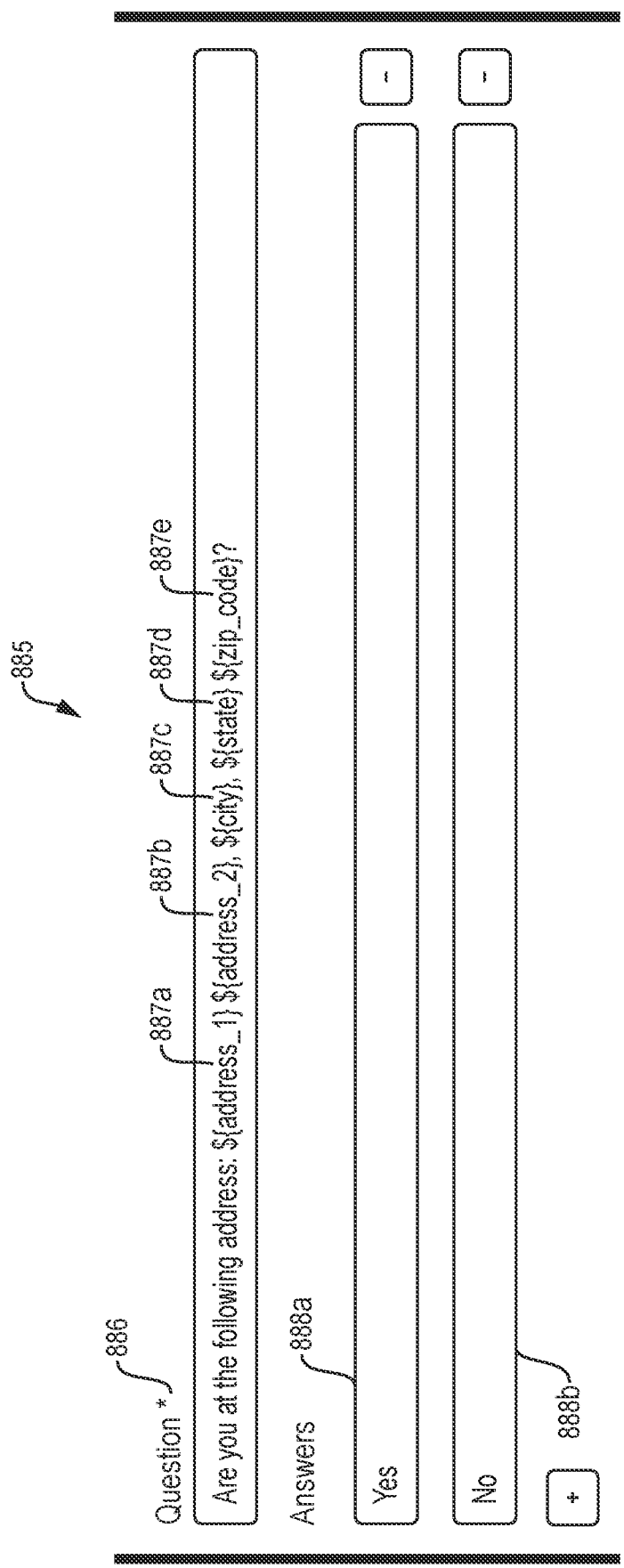
FIG. 8B illustrates a form interface for defining a radio button type node according to an example embodiment.

FIG. 8B illustrates a form interface 885 for defining a radio button type node, e.g., node 880 of FIG. 8A, according to an embodiment. As shown in FIG. 8B, interface 885 includes question input field 886 and answer input fields 888a and 888b. In an aspect, contents of a question input field, e.g., field 886, may include one or more variable references, e.g., variable references 887a-887e. According to an implementation, field 886 may be used to define, e.g., question/title 882 of node 880 (FIG. 8A), while fields 888a and 888b may be used, respectively, to define answer choices 883a and 883b of node 880.

In an embodiment, a variable reference, e.g., reference(s) 887a-887e, may be used to reference data, input(s), or response(s) from previous node(s) in a workflow, such as radio button type nodes and API type nodes, as well as to reference other data and/or information associated with a workflow, such as information provided as part of an intake form, among other examples.

According to an aspect, a variable reference may be indicated by a specific notation, such as a pair of curly brackets enclosing a variable identifier and prefixed with a dollar sign. Thus, for example, reference 887a of FIG. 8B includes a variable identifier of "address_1", which may identify a portion of a customer location, such as a street address, that was previously entered into a workflow intake form. In an implementation, an intake form field—such as a field for a customer address (e.g., "address_1") or workflow scheduling date—may be identified by the field label; a previous node response may be identified by, e.g., the node's unique ID; data returned from an API type node may be identified by the node's unique ID together with the data label; and a response from an API type node may be identified by the node's unique ID together a label for a subfield of the response. According to an embodiment, variable references may also be used to reference information obtained from reflow type nodes and loop type nodes.

Figure 9A:
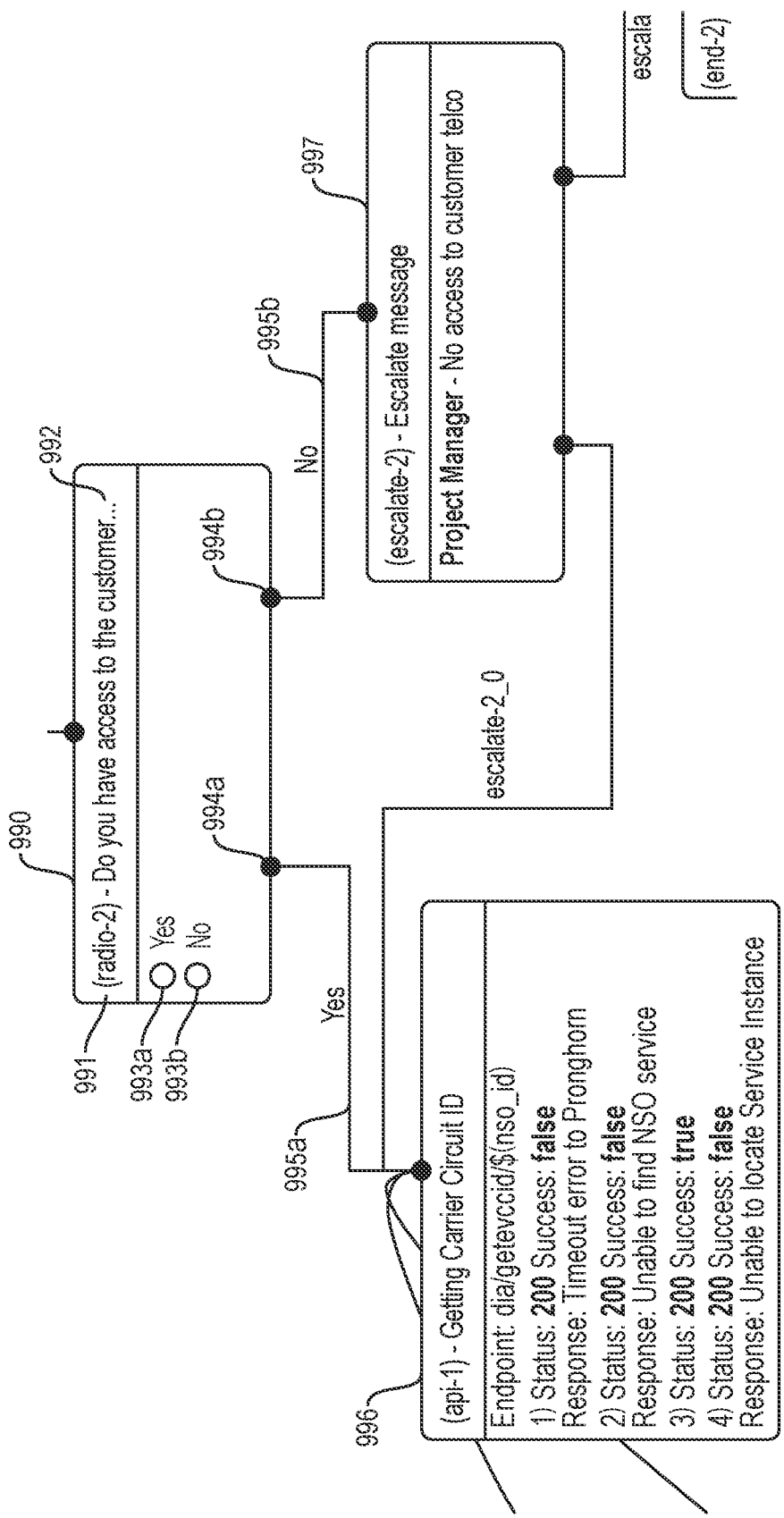
FIG. 9A illustrates defining a radio button type node according to another example embodiment.

FIG. 9A illustrates defining a radio button type node 990 according to another example embodiment. As shown in FIG. 9A, in a workflow editor interface, radio button type node 990 is displayed with unique ID 991, question 992, and answer choices 993a and 993b, which correspond to handles 994a and 994b. Further, edge 995a connects handle 994a of node 990 to API type node 996, while edge 995b connects handle 994b of node 990 to escalation type node 997. Thus, in an aspect, edges 995a and 995b provide downstream connections from node 990 to nodes 996 and 997, respectively.

FIG. 9B is an exemplary node data structure 998 according to an embodiment. In an aspect, data structure 998 may represent the contents of a radio button type node, e.g., node 990 of FIG. 9A. As shown in FIG. 9B, data structure 998 includes fields 998a-998c. In turn, field 998b includes subfields 998b1 and 998b2. Field 998b2 further includes its own subfields 998b2a and 998b2b.

According to an implementation, field 998a indicates a node type, e.g., a radio button node type. In an embodiment, a node type indicated by a field, e.g., field 998a, informs what data is expected in data structure 998 in relation to the node type. In FIG. 9B, the data expected in relation to the node type 998a is shown by the field 998b, which may contain custom properties of a node. For example, in an aspect, when field 998a indicates a radio button type node, field 998b includes a question/title subfield, e.g., field 998b1, and an answers/responses subfield, e.g., field 998b2 with further subfields 998b2a and 998b2.

Continuing with FIG. 9B, field 998c may indicate a node's unique ID, e.g., "radio-2."

FIG. 9C is an exemplary edge data structure 999 according to an embodiment. In an aspect, data structure 999 may correspond to, e.g., edge 995b of FIG. 9A from handle 994b of node 990 to node 997. As shown in FIG. 9C, data structure 999 includes fields 999a-999c.

In an implementation, fields 999a and 999b may indicate, respectively, a source node and associated source handle, e.g., node 990 of FIG. 9A and associated handle 994b, for an edge, while field 999c may indicate a target node, e.g., node 997 (FIG. 9A), for the edge.

According to an embodiment, node data structure 998 and/or edge data structure 999 may be arranged according to, e.g., JSON format, or any other suitable format known to those of skill in the art.

In some embodiments, interface 770 (FIG. 7) may be employed by method 400 (FIG. 4) for generating a data structure, e.g., data structure 103 (FIG. 1), 330 (FIG. 3C), or 679 (FIG. 6), by defining node(s) of a workflow. For example, in an aspect, for each node to be defined, e.g., node 501 (FIG. 5), 880 (FIG. 8A), or 990 (FIG. 9A), method 400 first creates, in a database memory, e.g., a database memory of user device 102*a* (FIG. 1), based on a user input, e.g., an input from user 101*a* (FIG. 1) received via interface 770, a node data structure, e.g., data structure 998 (FIG. 9B), corresponding to the node. Second, method 400 determines, based on the user input, a node type of the node, e.g., a node type 998*a* of data structure 998. Third, method 400 determines, based on the node type and the user input, edge response value(s) of the node, e.g., response values 998*b*2*a-b* of data structure 998 (which may correspond to, for example, answers 883*a-b* of node 880 or answers 993*a-b* of node 990). Fourth, method 400 creates, based on the user input, edge(s) of the data structure, e.g., edge data structure 999 (FIG. 9C), corresponding to the edge response value(s). Each of the edge(s) may define a connection between the node and an adjacent node of the data structure. For example, in an implementation, edge data structure 999 may define a connection between a source node 999*a* of data structure 998, e.g., node 501, 880, or 990, and a target node 999*c* of data structure 998, e.g., node 997 (FIG. 9A).

In some embodiments, a radio button type node, e.g., node 501 (FIG. 5), 880 (FIG. 8A), or 990 (FIG. 9A), may be used to perform or facilitate performing real-world tasks, including tasks involving real-world devices. Such tasks may include, e.g., making real-world decisions or identifications, as well as confirming real-world information. For example, in an aspect, a radio button type node may present a Yes/No answer choice to a question such as "Does the serial number on device XYZ match the following: $ {api-2.data.serial_number}?"—where "device XYZ" refers to a real-world device, and variable identifier "$ {api-2.data.serial_number}" refers to data retrieved using an API type node.

Checkbox Node

In other embodiments, a checkbox type node may be used to permit a selection of one or more choice(s) or answer(s).

Figure 10A:
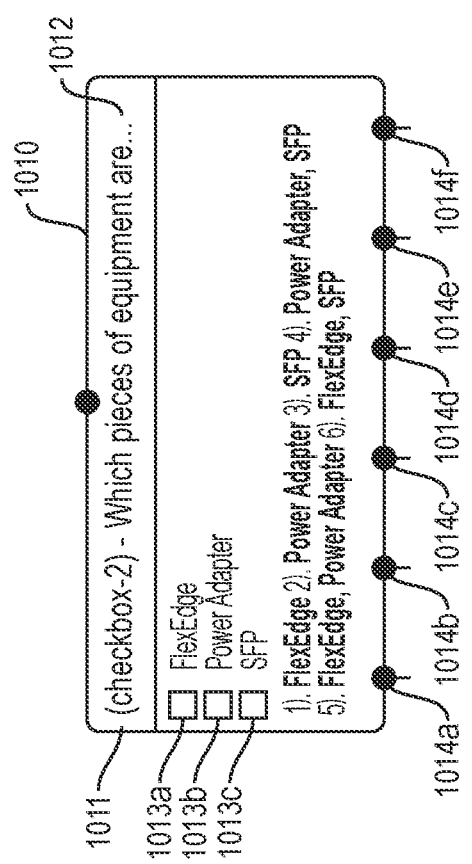
FIG. 10A illustrates defining a checkbox type node according to an example embodiment.

FIG. 10A illustrates defining a checkbox type node 1010 according to an example embodiment. As shown in FIG. 10A, in a workflow editor interface, checkbox type node 1010 is displayed with unique ID 1011, question/title 1012, answer choices 1013*a*-1013*c*, and handles 1014*a*-1014*f*. In an aspect, each of handles 1014*a*-1014*f* may corresponding to a different permutation or combination of answer choices 1013*a*-1013*c*. Thus, for example, handle 1014*a* may correspond to selection of only answer 1013*a*, handle 1014*d* may correspond to a selection of answers 1013*b* and 1013*c*, and handle 1014*e* may correspond to a selection of answers 1013*a* and 1013*b*. Any number of different logical combinations may be implemented.

Figure 10B:
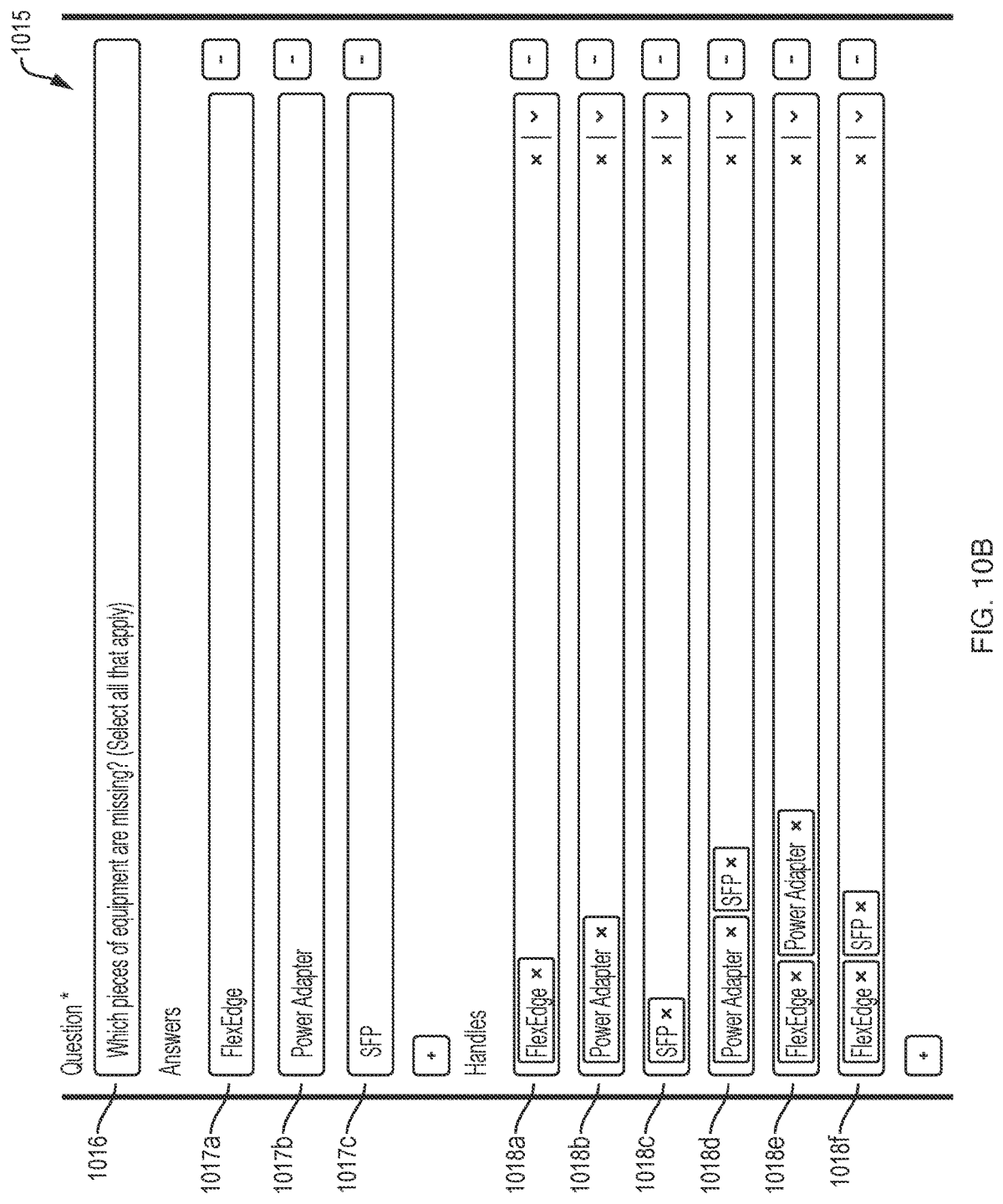

FIG. 10B illustrates a form interface 1015 for defining a checkbox type node, e.g., node 1010 of FIG. 10A, according to an embodiment. As shown in FIG. 10B, and similar to interface 885 (FIG. 8B), interface 1015 includes question input field 1016 and answer input fields 1017*a*-1017*c*. However, unlike interface 885, interface 1015 further includes handle input fields 1018*a*-1018*f*. In an aspect, each of handle input fields 1018*a*-1018*f* may enable a handle to be defined based on a permutation or combination of answers defined by answer input fields 1017*a*-1017*c*. Thus, for example, handle input field 1018*a* may define a handle based on a selection of only an answer defined by answer input field 1017*a*, handle input field 1018*d* may define a handle based on a selection of answers defined by answer input fields 1017*b* and 1017*c*, and handle input field 1018*e* may define a handle based on a selection of answers defined by answer input fields 1017*a* and 1017*b*.

By way of interface 1015, users can define multiple checkboxes and answers associated therewith. Further, users can define handles that correspond to different answer scenarios. It is noted that while interface 1015 shows answers 1017*a-c* and handles 1018*a-f*, embodiments are not limited to these answers 1017*a-c* and handles 1018*a-f* and any desired answers and handles can be defined by a user. Further, in some embodiments, a checkbox type node may also be used to ensure a task has been completed, such as by, e.g., user 101*a* or 101*b* (FIG. 1), before advancing further in a workflow.

Figure 11:
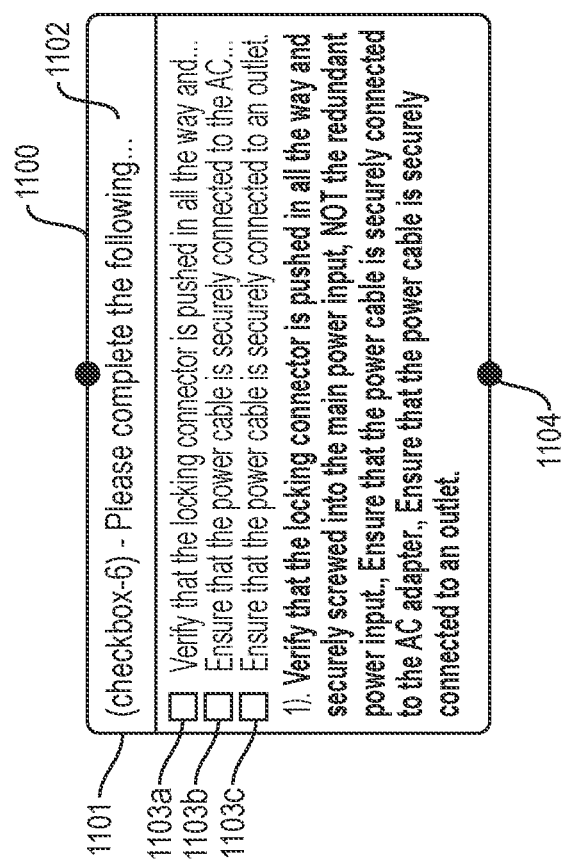
FIG. 11 illustrates defining a checkbox type node according to another example embodiment.

FIG. 11 illustrates defining a checkbox type node 1100 according to another example embodiment. As shown in FIG. 11, in a workflow editor interface, checkbox type node 1100 is displayed with unique ID 1101, question/title 1102, answer choices 1103*a*-1103*c*, and handle 1104. In an aspect, handle 1104 may correspond to a selection of all available answer choices 1103*a*-1103*c*. Thus, according to an implementation, handle 1104 may be configured such that every answer of checkbox type node 1100 must be selected before a workflow can proceed.

In some embodiments, a checkbox type node, e.g., node 1010 (FIG. 10A) or 1100 (FIG. 11), may be used to perform or facilitate performing real-world tasks, including tasks involving real-world devices. Such tasks may include, e.g., (i) identifying missing or present real-world equipment or products and (ii) completing and/or verifying real-world steps. For example, in an aspect, with respect to aforementioned category (i), a checkbox type node may display a prompt stating "Please select the reason device XYZ cannot be connected to the carrier equipment."—where "device XYZ" is a real-world device, and the prompt may be answered by selecting either or both of answers "Incorrect patch cable" and "No/Incorrect SFP [small formfactor pluggable] in the carrier device." With respect to aforementioned category (ii), a checkbox type node may display a prompt stating "Please complete the following steps to install device XYZ"—where "device XYZ" is again a real-world device and options associated with the prompt correspond to real-world steps/tasks for the device, with each option being checked as the corresponding task is performed.

Wait/Countdown Node

In yet other embodiments, a wait or countdown timer type node may be used to pause a workflow for a specified amount of time.

Figure 12A:
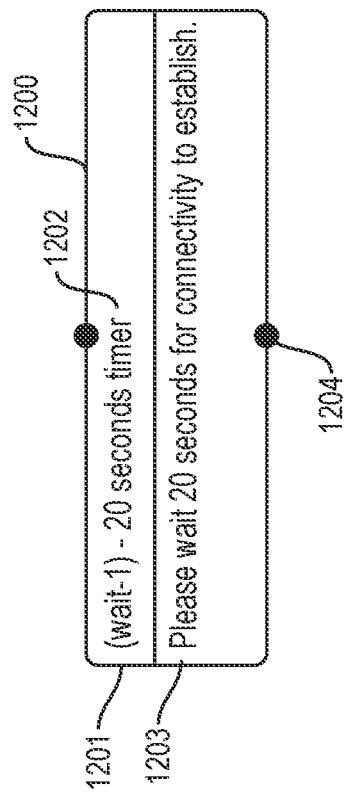
FIG. 12A illustrates defining a countdown type node according to an example embodiment.

FIG. 12A illustrates defining a countdown type node 1200 according to an example embodiment. As shown in FIG. 12A, in a workflow editor interface, countdown type node 1200 is displayed with unique ID 1201, title 1202, heading 1203, and handle 1204.

Figure 12B:
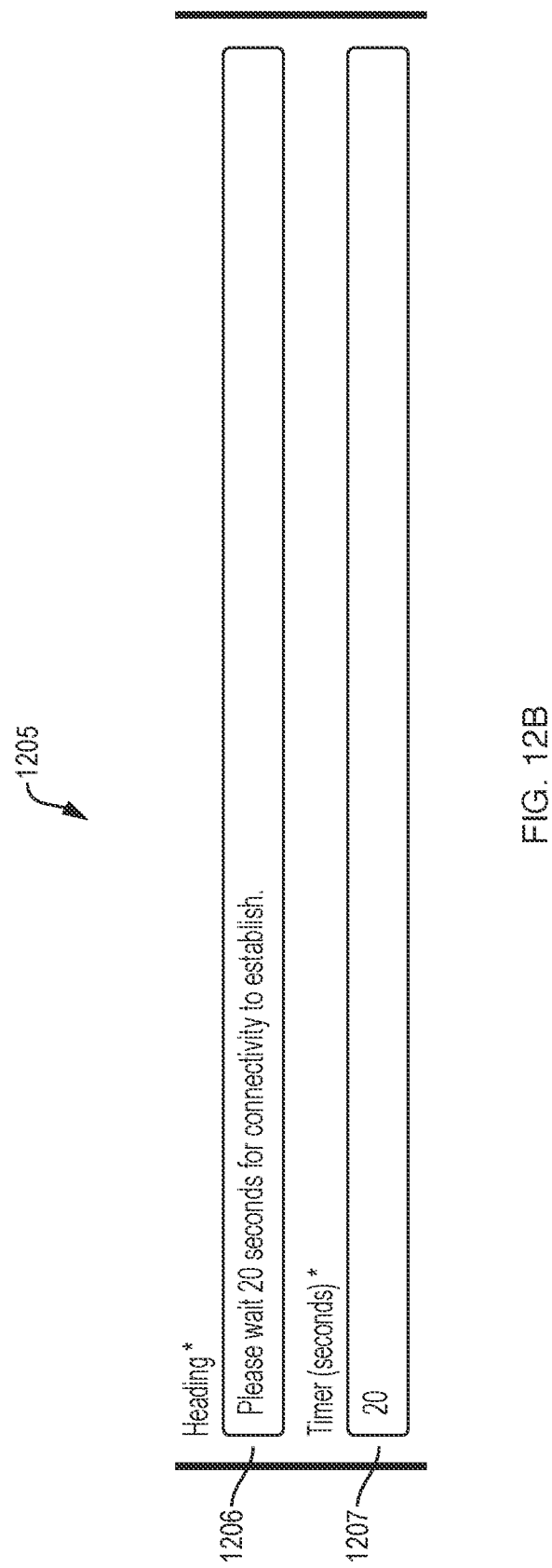
FIG. 12B illustrates a form interface for defining a countdown type node according to an embodiment.

FIG. 12B illustrates a form interface 1205 for defining a countdown type node, e.g., node 1200 of FIG. 12A, according to an embodiment. As shown in FIG. 12B, interface 1205 includes heading input field 1206 and timer input field 1207. In an aspect, field 1207 may be used to specify an amount of time for which a workflow will be paused when a countdown type node, e.g., node 1200, is reached.

In some embodiments, a countdown type node, e.g., node 1200 (FIG. 12A), may be used to perform or facilitate performing real-world tasks, including tasks involving real-world devices. Such tasks may include, e.g., confirming that a real-world physical or network connection is established. For example, in an aspect, a countdown type node may display a prompt to "Please wait 20 seconds for connectivity to establish."—where "connectivity" refers to connectivity of a real-world physical or network connection being established.

API Node

In some embodiments, an API type node may be used to make an API call, for example, to obtain information or perform various operations via an API endpoint. According to an aspect, API endpoints may be used for operations such as (i) retrieving a router (or other such device) configuration, (ii) retrieving a carrier identifier, (iii) conducting a ping test, (iv) ascertaining a core status, (v) performing a speed test, (vi) identifying packet loss, (vii) determining a router (or other such device) status, (viii) performing a soft reboot, (ix) enabling monitoring, (x) toggling provisioning, (xi) modifying a trunk type, and (xii) altering a port type, among other examples.

Figure 13A:
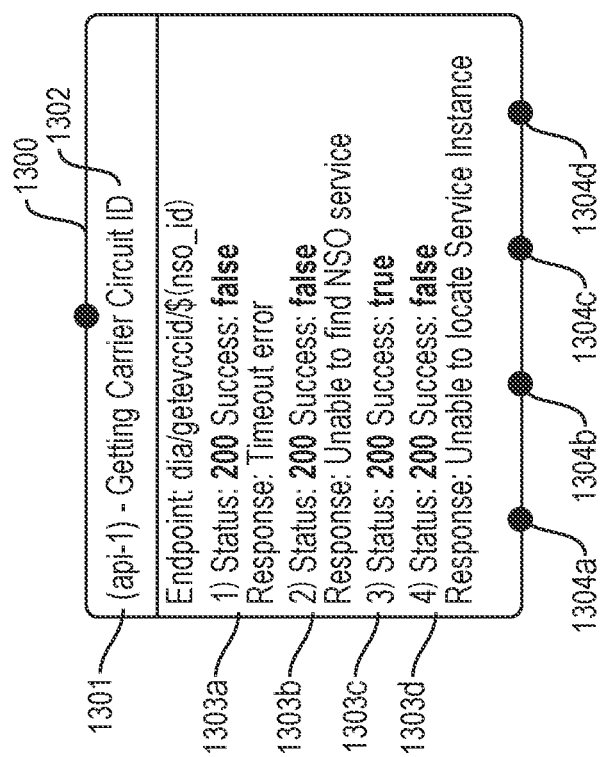
FIG. 13A illustrates defining an API type node according to an example embodiment.

FIG. 13A illustrates defining an API type node 1300 according to an example embodiment. As shown in FIG. 13A, in a workflow editor interface, API type node 1300 is displayed with unique ID 1301, title 1302, and API result values 1303a-1303d with corresponding handles 1304a-1304d.

Figure 13B:
FIG. 13B illustrates a form interface for defining an API type node according to an embodiment.

FIG. 13B illustrates a form interface 1305 for defining an API type node, e.g., node 1300 of FIG. 13A, according to an embodiment. As shown in FIG. 13B, interface 1305 includes label/title input field 1306, category dropdown menu 1307, API endpoint dropdown menu 1308, parameter input field 1309, and API result input rows 1310-1313. In an aspect, selecting a category via menu 1307 may cause endpoint menu 1308 to populate with a list of endpoints available for the selected category. Thus, for example, as shown in FIG. 13B, endpoint "dia/getevccid" may be an available option for menu 1308 when category "dia" (e.g., Dedicated Internet Access) is selected for menu 1307. According to an implementation, an API endpoint may have one or more associated parameters, which are inputs when calling or invoking the endpoint. Such API endpoint parameters may be specified using parameter input fields, e.g., input field 1309. Thus, for example, as shown in FIG. 13B, the endpoint selected via menu 1308 may take a parameter "<nso_id>" (e.g., Network Services Orchestrator ID), which in turn may be provided by specifying a variable identifier "$ {nso_id}" in input field 1309.

Continuing with FIG. 13B, in an aspect, each of API result input rows 1310-1313 may enable a handle to be defined based on a particular result of invoking an API endpoint selected via, e.g., menu 1308. Thus, for example, result input row 1310 may define a handle based on a particular response status code, e.g., code 1310a, an API invocation outcome, e.g., unsuccessful outcome 1310b, and a particular response status, e.g., timeout status 1310c; result input row 1311 may define a handle based on the same response status code, e.g., code 1311a, an unsuccessful outcome, e.g., 1311b, and a different status, e.g., unable to find NSO service 1311c; result input row 1312 may define a handle based on the same response status code, e.g., 1312a, a successful outcome, e.g., 1312b, and a blank status, e.g., 1312c; and result input row 1313 may define a handle based on the same response status code, e.g., 1313a, an unsuccessful outcome, e.g., 1313b, and yet another different status, e.g., unable to locate service instance 1313c.

Figure 13C:
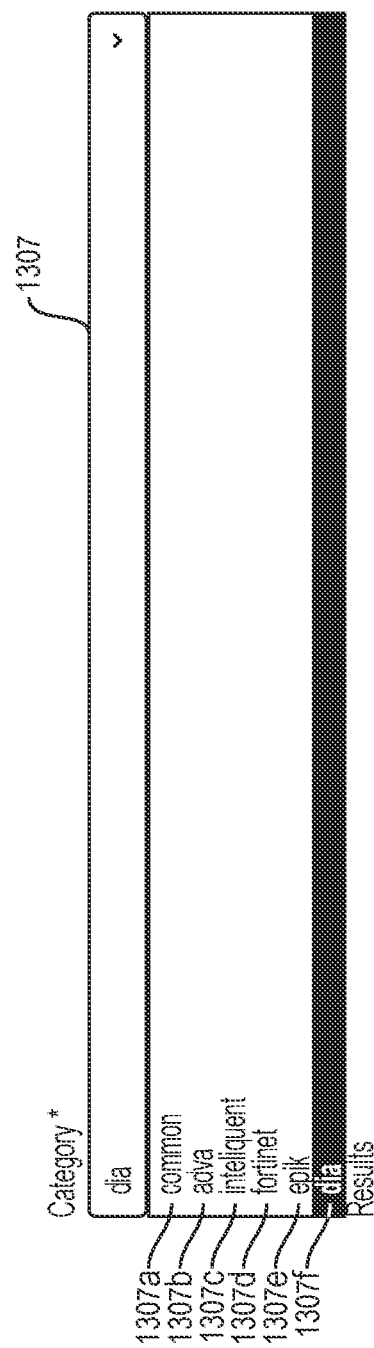
FIG. 13C illustrates exemplary category options available for the form interface of FIG. 13B.
Figure 13D:
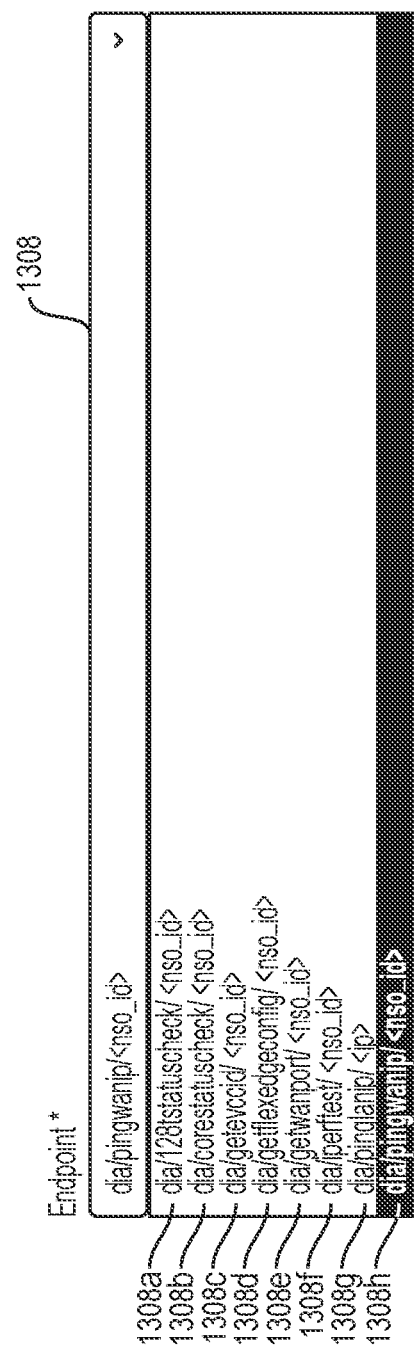
FIG. 13D illustrates exemplary API endpoint options available for a category shown in FIG. 13C.

FIG. 13C illustrates exemplary options "common" 1307a, "adva" (e.g., ADVA®) 1307b, "inteliquent" (e.g., Inteliquent®) 1307c, "fortinet" (e.g., Fortinet®) 1307d, "epik" (e.g., Epik™) 1307e, and "dia" (e.g., DIA) 1307f available for dropdown menu 1307 of FIG. 13B. Further, it is noted that while options 1307a-f are shown in FIG. 13C, embodiments are not limited to options 1307a-f and, instead, any other options known to those of skill in the art may be used. In turn, FIG. 13D illustrates exemplary options "dia/128statuscheck/<nso_id>" 1308a, "dia/corestatuscheck/<nso_id>" 1308b, "dia/getevccid/<nso_id>" 1308c, "dia/getflexedgeconfig/<nso_id>" 1308d, "dia/getwanport/<nso_id>" 1308e, "dia/iperftest/<nso_id>" 1308f, "dia/pinglanip/<nso_id>" 1308g, and "dia/pingwanip/<nso_id>" 1308h available when option "dia" 1307f of FIG. 13C is selected.

Figure 13E:
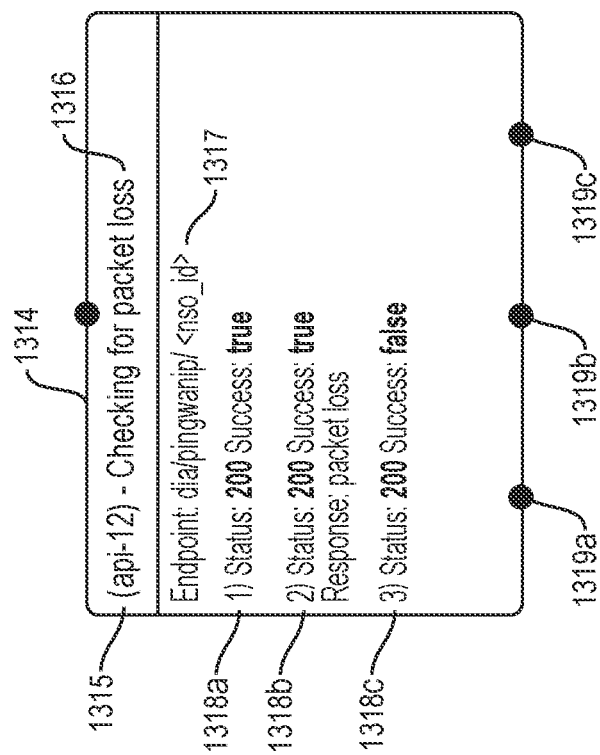
FIG. 13E illustrates defining an API type node according to another example embodiment.

FIG. 13E illustrates defining an API type node 1314 according to another example embodiment. As shown in FIG. 13E, in a workflow editor interface, API type node 1314 is displayed with unique ID 1315, title 1316, API endpoint identifier 1317, and API result values "Status: 200 Success: true" 1318a, "Status: 200 Success: true" 1318b, and "Status: 200 Success: false" 1318c with corresponding handles 1319a, 1319b, and 1319c.

Figure 13F:
FIG. 13F illustrates a form interface for defining an API type node according to another embodiment.

FIG. 13F illustrates a form interface 1320 for defining an API type node, e.g., node 1314 of FIG. 13E, according to another embodiment. As shown in FIG. 13F, interface 1320 includes label/title input field 1321, category dropdown menu 1322, API endpoint dropdown menu 1323, parameter input field 1324, argument input row 1325 with input fields 1325a-b, and API result input rows 1326-1328, with corresponding input fields 1326a-c, 1327a-c, and 1328a-c, which may be used to define handles 1319a, 1319b, and 1319c of FIG. 13E, respectively. In an aspect, selecting a category via menu 1322 may cause endpoint menu 1323 to populate with a list of endpoints available for the selected category.

In an implementation, an API endpoint may receive one or more arguments, e.g., as defined by argument input row 1325, as inputs. Arguments may be similar to API parameters, but, unlike parameters, may be optional instead of required, according to an embodiment. In some embodiments, arguments may be defined as key/value pairs, e.g., via argument input fields 1325a (key) and 1325b (value). However, any other suitable data structure known to those of skill in the art may be used. Thus, for example, in FIG. 13F, endpoint 1323 "dia/pingwanip" (e.g., for pinging a WAN [wide area network] IP [Internet Protocol] address) may receive an optional argument defined by argument row 1325 fields 1325a and 1325b as having a key of "count" and a value of 30, respectively. In an embodiment, such a key/value pair may indicate a number of times, e.g., 30, for a WAN IP address to be pinged.

Figure 14A:
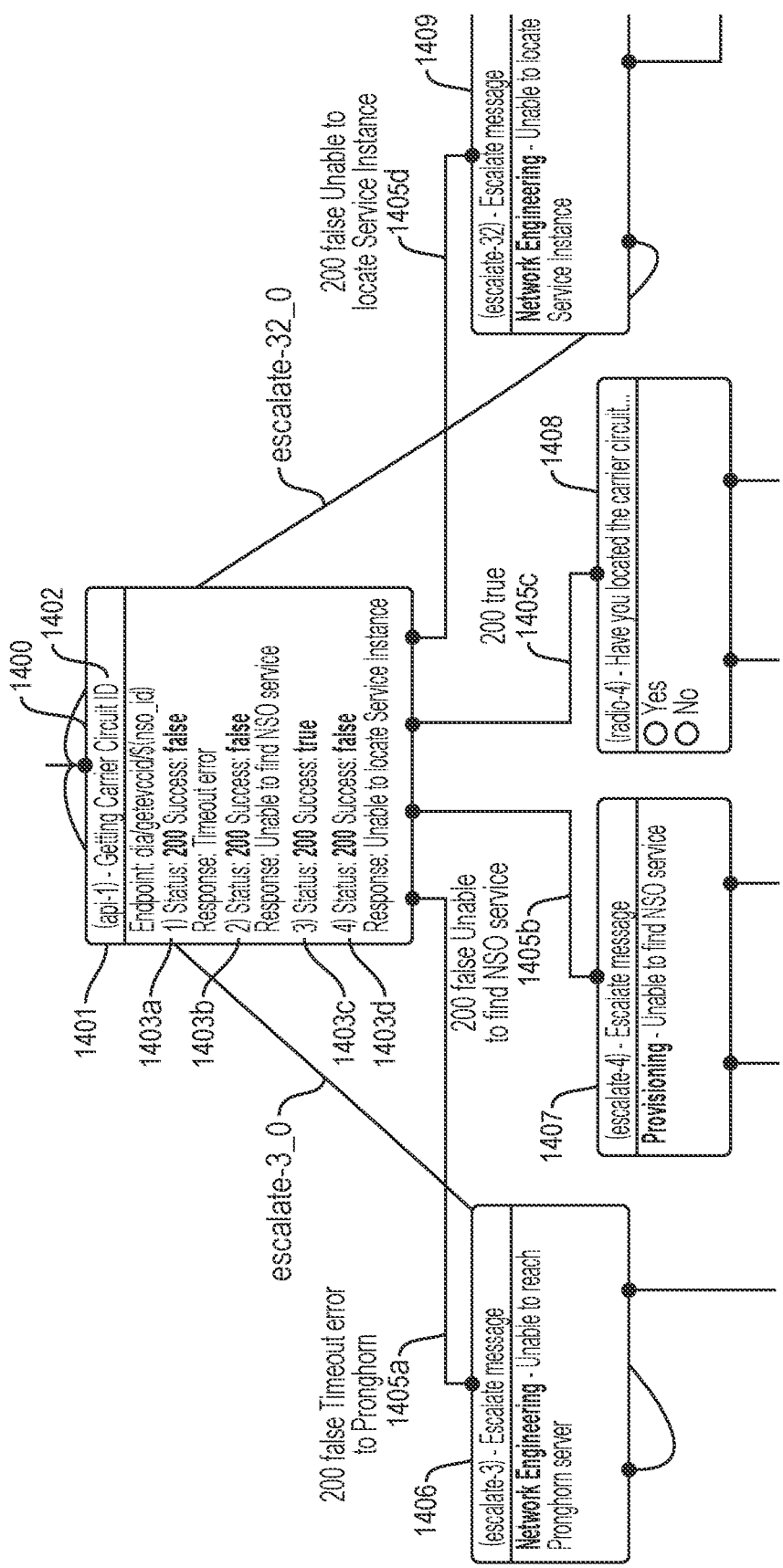
FIG. 14A illustrates defining an API type node according to another example embodiment.

FIG. 14A illustrates defining an API type node 1400 according to another example embodiment. As shown in FIG. 14A, in a workflow editor interface, API type node 1400 is displayed with unique ID 1401, title 1402, and API result values 1403a-1403d, which correspond to handles 1404a-1404d. Further, edges 1405a-1405d connect handles 1404a-1404d of node 1400 to nodes 1406-1409, respectively. Thus, FIG. 14A illustrates logic for making an API call at node 1400 and proceeding to one of nodes 1406-1409 depending on results 1403a-d of the API call.

FIG. 14B is an exemplary node data structure 1410 according to an embodiment. In an aspect, data structure 1410 may represent the contents of an API type node, e.g., node 1400 of FIG. 14A. As shown in FIG. 14B, data structure 1410 includes fields 1411 and 1412. In turn, field 1412 includes subfields 1412*a*-1412*c*. Field 1412*b* further includes its own subfields 1412*b*1-1412*b*4.

According to an implementation, field 1411 may indicate a node type, e.g., an API node type. In an embodiment, a node type indicated by, e.g., field 1411, may inform what data is expected in field 1412, which may contain custom properties of a node. For example, in an aspect, when field 1411 indicates an API type node, field 1412 may include a title subfield, e.g., field 1412*a*, and an API results subfield, e.g., field 1412*b* with further subfields 1412*b*1-1412*b*4.

Continuing with FIG. 14B, field 1412*c* may indicate a node's unique ID, e.g., "api-1."

According to an embodiment, node data structure 1410 may be arranged according to, e.g., JSON format, or any other suitable format known to those of skill in the art.

In some embodiments, an API type node, e.g., node 1300 (FIG. 13A), 1314 (FIG. 13E), or 1400 (FIG. 14A), may be used to perform or facilitate performing real-world tasks, including tasks involving real-world devices. Such tasks may include, e.g., sending a network request to a real-world device, such as a "ping" request, or any other suitable network request known to those of skill in the art. For example, in an aspect, an API type node may be used to carry out a "Ping WAN IP" request on a real-world device, and return as results, e.g., a ping time and an amount of packet loss.

Escalation Node

In other embodiments, an escalation type node may be used to specify a group, such as a higher-level technical support group, to receive an escalation from, e.g., user 101*a* or 101*b* (FIG. 1), who may be a field engineer or a customer support technician.

Figure 15:
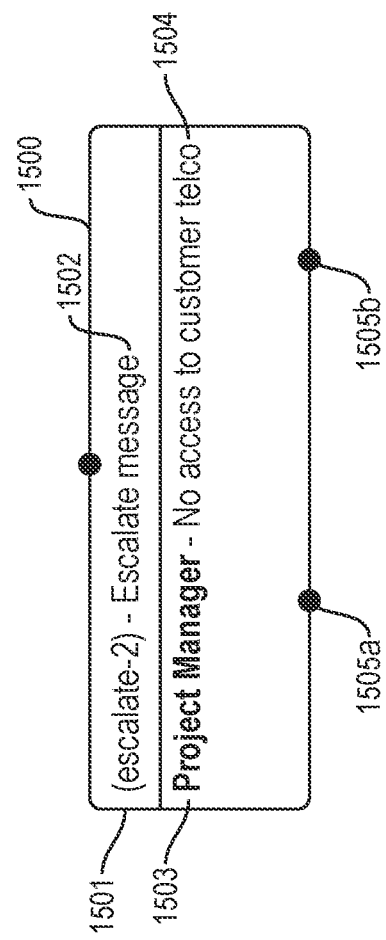
FIG. 15 illustrates defining an escalation type node according to an example embodiment.

FIG. 15 illustrates defining an escalation type node 1500 according to an example embodiment. As shown in FIG. 15, in a workflow editor interface, escalation type node 1500 is displayed with unique ID 1501, title 1502, escalation group or team name 1503, failure description 1504, and handles 1505*a* and 1505*b*.

In an aspect, when an escalation is performed at node 1500, a communications channel may be opened, and failure description 1504 may be sent to escalation group 1503 via the communications channel. According to an implementation, a communication channel may be, e.g., a Slack® channel associated with escalation group 1503. However, any suitable known communications interface or channel may be used. In an embodiment, escalation group 1503 may be, e.g., a project management group, a client services group, a provisioning group, a network engineering group, or any other suitable known group.

Continuing with FIG. 15, in an aspect, handles 1505*a* and 1505*b* may correspond to whether a workflow is capable of being continued or not following an escalation at node 1500. Thus, for example, if escalation successfully resolves failure 1504, the workflow may continue via an edge (not shown) originating from handle 1505*a*. Otherwise, if escalation is unsuccessful, because, for example, additional troubleshooting is required, the workflow may follow an edge (not shown) originating from handle 1505*b*.

According to an implementation, various settings for performing escalations may be configured. For example, escalation settings may include specifying an escalation or failure group to receive failure notifications, as well as specifying a failure or issue description to be transmitted to the escalation group. According to an aspect, escalation settings may be configured for an entire workflow, or on an individual node-by-node level.

In some embodiments, an escalation type node, e.g., node 1500 (FIG. 15), may be used to perform or facilitate performing real-world tasks, including tasks involving real-world devices. Among other examples, such tasks may include, e.g., notifying a higher level or tier of technical support representative concerning an issue arising with a real-world device. For example, in an aspect, an escalation type node may be used to provide a technical support representative with a notification of "No link lights on device XYZ"—where "device XYZ" refers to a real-world device.

Conditional Node

In yet other embodiments, a conditional type node may be used to provide logic for directing a workflow based on previous node answers and/or API data and responses.

Figure 16A:
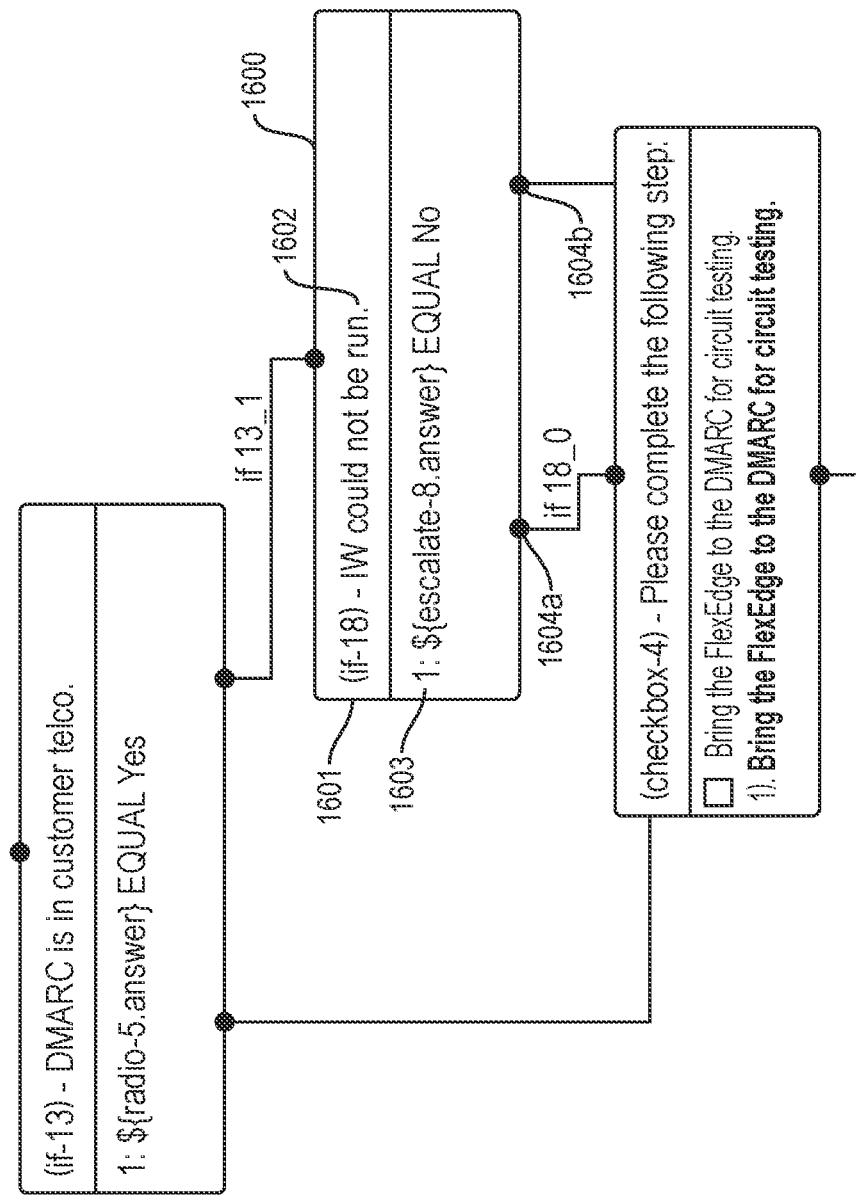
FIG. 16A illustrates defining a conditional type node according to an example embodiment.

FIG. 16A illustrates defining a conditional type node 1600 according to an example embodiment. As shown in FIG. 16A, in a workflow editor interface, conditional type node 1600 is displayed with unique ID 1601, title 1602, condition 1603, and handles 1604*a* and 1604*b*.

Figure 16B:
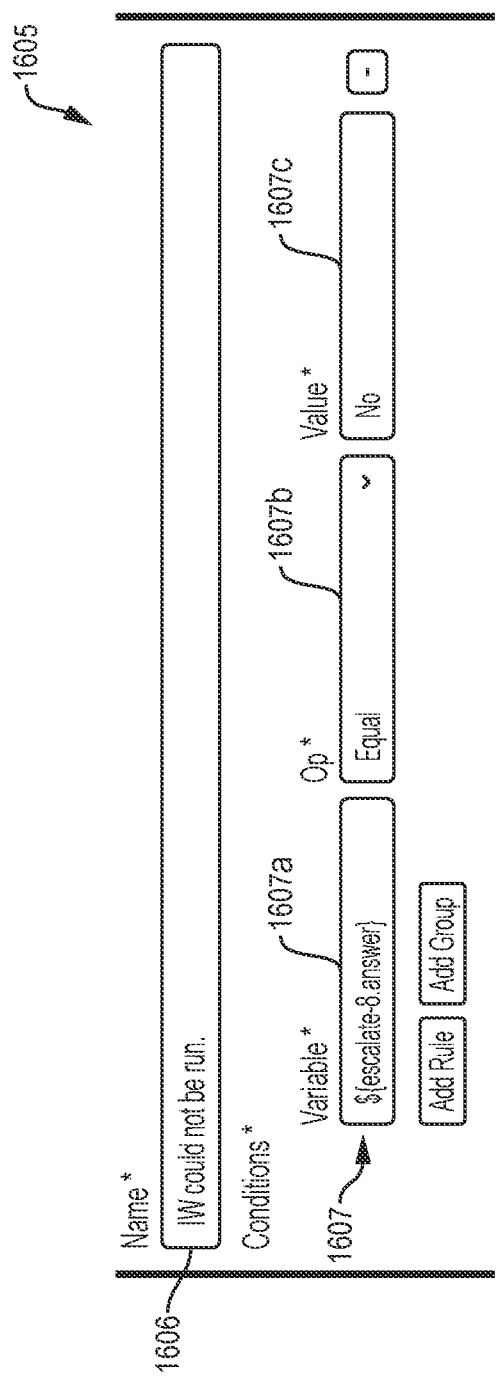
FIG. 16B illustrates a form interface for defining a conditional type node according to an embodiment.

FIG. 16B illustrates a form interface 1605 for defining a conditional type node, e.g., node 1600 of FIG. 16A, according to an embodiment. As shown in FIG. 16B, interface 1605 includes name/title input field 1606, and condition input row 1607. In an aspect, input row 1607 may enable a handle to be defined based on evaluating a particular condition. According to an implementation, a condition may be defined as evaluating an operator, e.g., a logical or mathematical operator, that takes as inputs a variable and a value. Thus, for example, condition input row 1607 may define a handle based on evaluating a particular operator, e.g., an equality operator 1607*b*, with inputs of a particular variable, e.g., prior node answer variable reference 1607*a*, and a particular value, e.g., a negative response or answer value 1607*c*. According to an implementation, handle 1604*a* of FIG. 16A may correspond to a condition, e.g., a condition defined by input row 1607 of FIG. 16B, while handle 1605*b* of FIG. 16A may correspond to another condition defined by a different input row (not shown in FIG. 16B).

Figure 17:
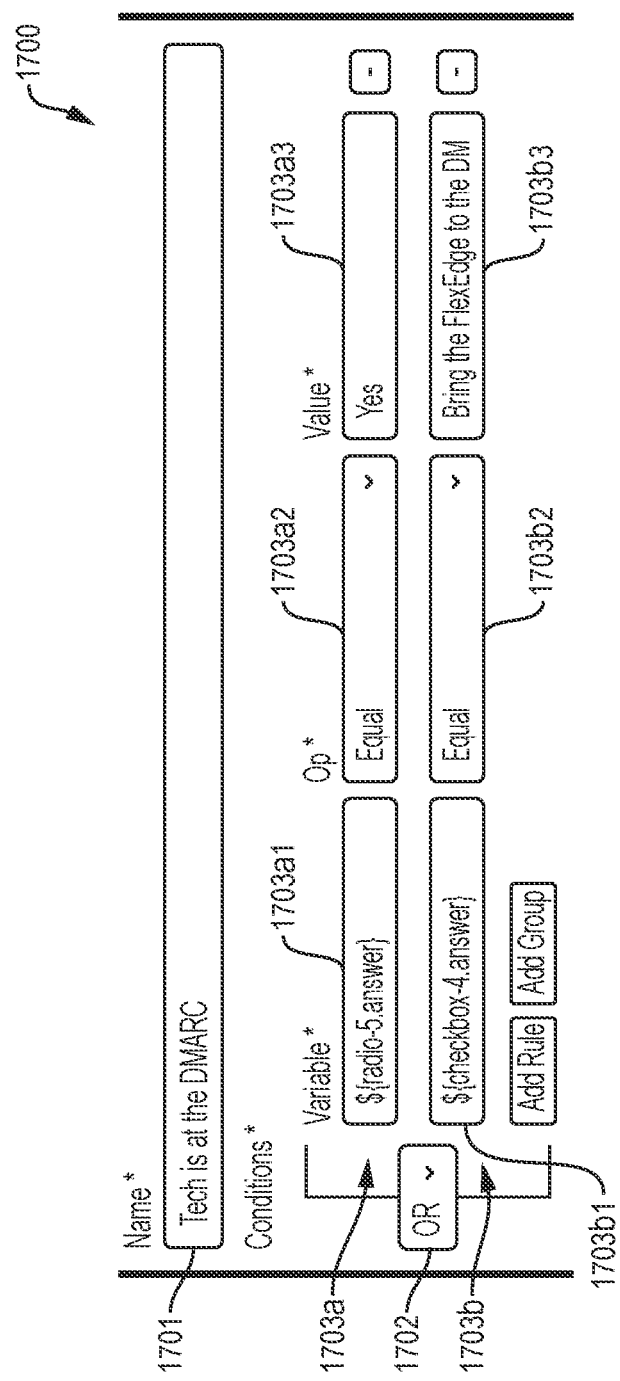
FIG. 17 illustrates a form interface for defining a conditional type node according to another embodiment.

FIG. 17 illustrates a form interface 1700 for defining a conditional type node according to another embodiment. As shown in FIG. 17, interface 1700 includes name/title input field 1701, condition group field 1702, and condition input rows 1703*a-b* having respective condition definition components 1703*a*1-3 and 1703*b*1-3. In an aspect, condition group field 1702 together with condition input rows 1703*a* and 1703*b* may enable handle(s) to be defined based on evaluating groupings of particular conditions. Thus, for example, condition group field 1702 may specify a grouping operator, e.g., a logical disjunction operator, for associated condition input rows, e.g., rows 1703*a* and 1703*b*.

Figure 18:
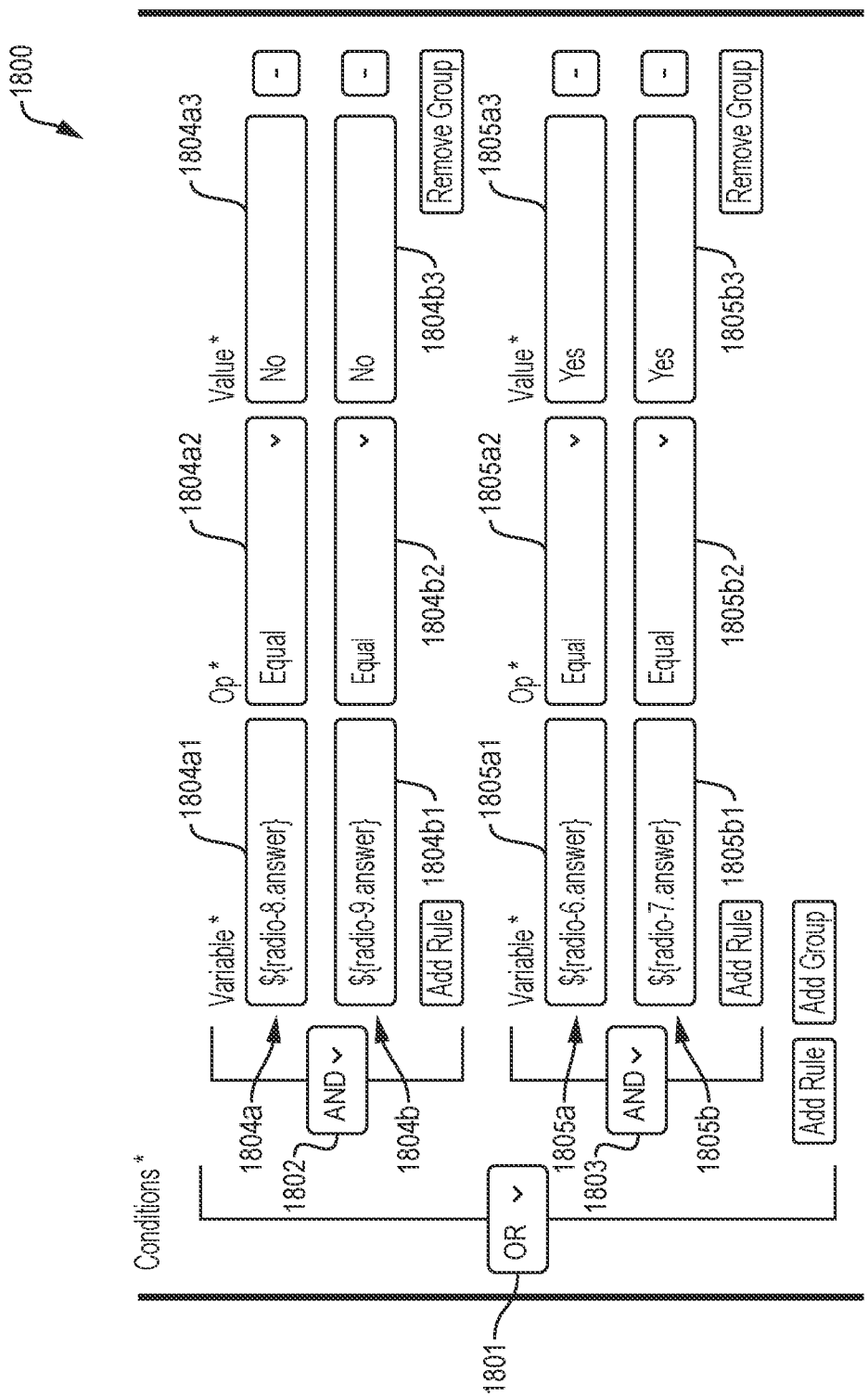
FIG. 18 illustrates a form interface for defining a conditional type node according to yet another embodiment.

FIG. 18 illustrates a form interface 1800 for defining a conditional type node according to yet another embodiment. As shown in FIG. 18, interface 1800 includes condition group field 1801 and condition subgroup fields 1802 and 1803, which include condition input rows 1804*a*-1804*b* and 1805*a*-1805*b*, respectively. In turn, condition input rows 1804*a*-1804*b* and 1805*a*-1805*b* have respective condition definition components 1804*a*1-3, 1804*b*1-3, 1805*a*1-3, and 1805*b*1-3. According to an aspect, condition group field 1801 and condition subgroup fields 1802 and 1803 together with condition input rows 1804*a*-1804*b* and 1805*a*-1805*b* may enable handle(s) to be defined based on evaluating groupings and subgroupings of particular conditions. Thus, for example, condition group field 1801 may specify a grouping operator, e.g., a logical disjunction operator, for associated condition subgroup fields, e.g., fields 1802 and

1803. In turn, condition group field 1802 may specify a grouping operator, e.g., a logical conjunction operator, for associated condition input rows, e.g., rows 1804*a* and 1804*b*. Similarly, condition group field 1803 may specify a grouping operator, e.g., a logical conjunction operator, for associated condition input rows, e.g., rows 1805*a* and 1805*b*.

In some embodiments, a conditional type node, e.g., node 1600 (FIG. 16A), may be used to perform or facilitate performing real-world tasks, including tasks involving real-world devices. Such tasks may include, e.g., automatically making a real-world decision according to a predefined logic where the decision relates to a real-world device. For example, in an aspect, a conditional type node may evaluate a result of a logical expression "'$ {checkbox-31.answer}' equals 'Bring device XYZ to the DMARC for circuit testing.'" as being "true"—e.g., meaning that a previous checkbox answer had been given to indicate that a real-world device had been already brought to the DMARC (demarcation point, e.g., a point at which a public network ends and connects with a customer's on-premises wiring). Accordingly, the conditional type node may cause a workflow not to further prompt for the device to be brought to the DMARC.

Field Input Node

In some embodiments, a field input type node may be used to request information from a user, e.g., user 101*a* or 101*b* (FIG. 1). According to an aspect, a field input type node may include a name/title for the node and a label for an input field. In an implementation, configuring a field input type node may include specifying whether or not input validation will be performed.

In some embodiments, a field input type node may be used to perform or facilitate performing real-world tasks, including tasks involving real-world devices. Such tasks may include, e.g., collecting real-world information in relation to task(s) being performed for a real-world device. For example, in an aspect, a field input type node may be used to collect real-world information regarding a field engineer or customer support technician, e.g., user 101*a* or 101*b* (FIG. 1), who may be, e.g., installing or configuring a real-world device.

Start Node

In other embodiments, a start type node may be an empty or blank node that will direct a user, e.g., user 101*a* or 101*b* (FIG. 1), to begin a workflow.

End Node

In yet other embodiments, a final type node may be a terminal or end node of a workflow that indicates whether execution of the workflow was successful or unsuccessful.

Figure 19:
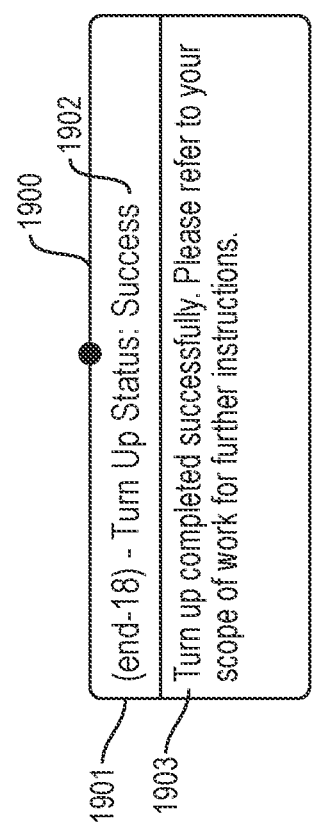
FIG. 19 illustrates defining a final type node according to an example embodiment.

FIG. 19 illustrates defining a final type node 1900 according to an example embodiment. As shown in FIG. 19, in a workflow editor interface, final type node 1900 is displayed with unique ID 1901, title 1902, and completion message 1903. In an aspect, title 1902 and message 1903 may be configured to indicate that a workflow completed successfully.

Figure 20:
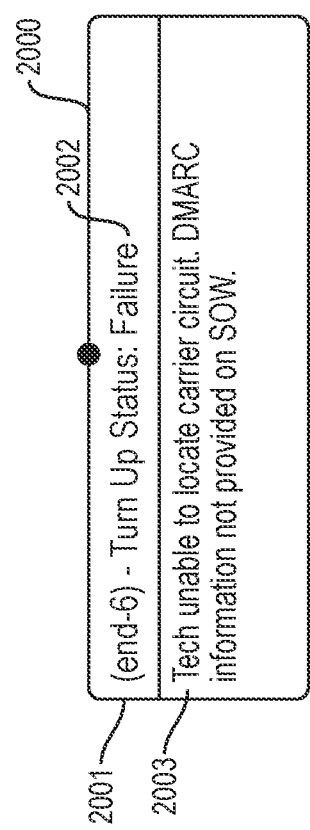
FIG. 20 illustrates defining a final type node according to another example embodiment.

FIG. 20 illustrates defining a final type node 2000 according to another example embodiment. As shown in FIG. 20, in a workflow editor interface, final type node 2000 is displayed with unique ID 2001, title 2002, and completion message 2003. In an aspect, title 2002 and message 2003 may be configured to indicate that a workflow completed unsuccessfully.

According to an implementation, following completion (successful or unsuccessful) of a workflow, a report or summary of the workflow execution may be generated. Further, in an embodiment, the report or summary may be displayed and/or saved to a storage location.

Workflow Runner

In some embodiments, an exemplary workflow runner software tool executing on, e.g., user device 102*a* or 102*b* (FIG. 1), may load a previously-generated workflow data structure, e.g., data structure 103 (FIG. 1) or 330 (FIG. 3D), which may be stored in, e.g., JSON or any other known format. According to an aspect, the workflow runner tool then processes the loaded data structure to perform a control task for a real-world communications network. Processing the loaded data structure includes displaying a GUI that enables a user, e.g., user 101*a* or 101*b* (FIG. 1), to step through nodes of the workflow and provide inputs at certain steps, as part of performing the control task. In addition to receiving user inputs as part of processing the loaded data structure, various nodes may cause real-world measurements to be taken that are indicative of real-world conditions (e.g., network functionality such as latency, among other examples) or cause other data to be automatically obtained, e.g., through an API call.

In an implementation, an exemplary workflow runner component may build a map of a workflow based on nodes and edges, e.g., nodes A-E and associated edges (FIG. 3C) or nodes 669-678 and associated edges (FIG. 6), in a data structure generated by a workflow editor component, and may render the map as steps of a decision tree. This map object may contain all steps, their possible responses, and identifiers of next steps to render based on each possible response.

Figure 21A:
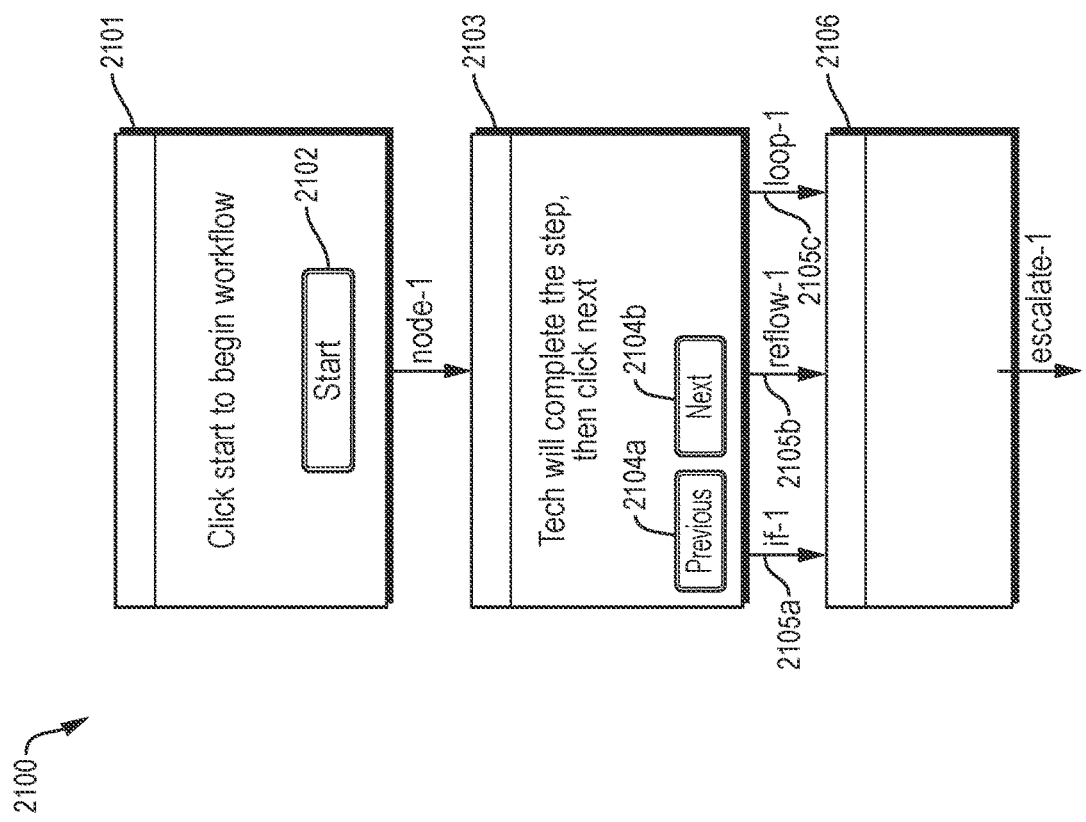
FIGS. 21A-B illustrate an exemplary workflow instance according to an embodiment.
Figure 21B:
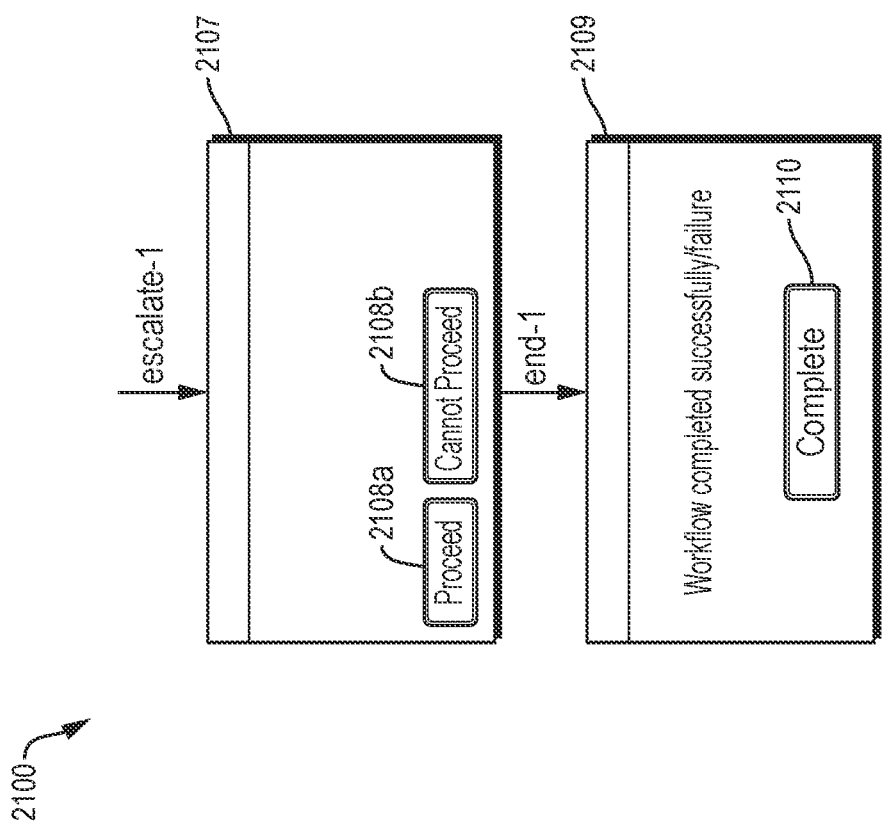

FIGS. 21A-B illustrate an exemplary workflow instance 2100 according to an embodiment. In an aspect, instance 2100 may be a visual representation of a path through a workflow data structure as the data structure is traversed by, e.g., an exemplary workflow runner component. Further, according to an implementation, API type nodes, e.g., node 1300 (FIG. 13A) or 1400 (FIG. 14A), may be used to, e.g., receive configuration and/or real-time diagnostic information, in the course of execution for instance 2100.

Referring now to FIG. 21A, in an embodiment, workflow instance 2100 commences by displaying a step for a start type node, e.g., node 2101. According to one such embodiment, node 2101 may be rendered or displayed with a "Start" button or icon 2102, which, when clicked or otherwise activated, may cause the workflow 2100 to proceed to a subsequent step. Following node 2101, instance 2100 next displays a step for node 2103. In an implementation, node 2103 may be rendered or displayed with "Previous" button 2104*a* and "Next" button 2104*b*, which, when clicked, may cause the workflow 2100 to, respectively, return to a prior step, e.g., node 2101, or proceed to a later step. Paths 2105*a-c* represent ways in which node 2016 may be reached from node 2103. Thus, for example, path 2105*a* may correspond to reaching node 2103 via a conditional type node (not shown), e.g. 1600 (FIG. 16A); path 2105*b* may correspond to reaching node 2103 via a reflow type node (not shown); and path 2105*c* may correspond to reaching node 2103 via a loop type node (not shown). According to an embodiment, a node such as a conditional type node, a reflow type node, or a loop type node may not be displayed to a user because the node type is not associated with content to be presented visually.

Transitioning from FIG. 21A to FIG. 21B, according to an aspect, after rendering node 2106, workflow instance 2100 may then continue to node 2107, which may be, e.g., an escalation type node, such as node 1500 (FIG. 15). In an implementation, node 2107 may be rendered with "Proceed"

button 2108a and "Cannot Proceed" button 2108b, which, when clicked, may cause the workflow to move to, respectively, a final node type associated with successful or unsuccessful completion of the workflow. As shown in FIG. 21B, in an embodiment, node 2109 may be, e.g., a final node type corresponding to either success, such as node 1900 (FIG. 19), or failure, such as node 2000 (FIG. 20). In an aspect, clicking on "Complete" button 2110 displayed for node 2109 may cause instance 2100 to conclude or terminate.

In some embodiments, workflow instance 2100 may be executed or performed via method 300, described hereinabove in relation to FIGS. 3A-B. To provide such functionality, method 300 starts at step 301 by loading a data structure, e.g., data structure 103 (FIG. 1) or 330 (FIG. 3C), in memory, e.g., a memory of user device 102a or 102b (FIG. 1). The data structure includes node(s), e.g., nodes 2101, 2103, 2106, 2107, and/or 2109, corresponding to step(s) of the workflow 2100. Then, at step 302, method 300 executes the workflow, to perform a control task for a real-world communications network, by traversing a subset of the node(s). The traversing includes, at each node of the subset, performing some or all operations depicted in FIG. 3B.

At step 302a of FIG. 3B, method 300 first determines a node type of the node, e.g., a start type node 2101, an escalation type node 2107, or a final node type 2109. Next, at step 302b, based on the determined node type, method 300 renders, on a display, e.g., a display of user device 102a or 102b (FIG. 1), a graphical representation of the node. In an aspect, the graphical representation may include, e.g., button 2102, buttons 2104a-b, buttons 2108a-b, or button 2110 for nodes 2101, 2103, 2107, and 2109, respectively. At step 302c, responsive to the rendering, method 300 then receives a data input, e.g., an input from user 101a or 101b (FIG. 1). The data input may be based on, e.g., activation or selection of button(s) 2108a-b. At step 302d, responsive to determining the node type is not a final node type—e.g., if the node is a starting or intermediate node such as node 2101, 2103, 2106, or 2107—method 300, first, determines a next node of the subset based on the received data input and response value(s) of the node and, second, moves to the determined next node. The response value(s) are associated with the determined node type. For example, at node 2107, method 300 may first determine, based on the received data input being a selection of button 2108a and a response value of node 2107 associating button 2108a with a final type node corresponding to successful completion of the workflow, that node 2109 is a next node, and then move to node 2109.

Referring now to step 302e of method 300, responsive to determining the node type is the final node type—e.g., if the node is a final node such as node 2109—method 300 completes the performance of the control task for the real-world communications network.

In some embodiments of method 300, for a given node of the subset, e.g., node 2106 (FIG. 21A), the node type may be a conditional type. Receiving the data input may include obtaining prior input(s) corresponding to node(s) of the subset prior to the given node in the workflow, e.g., nodes 2101 and/or 2103 (FIG. 21A). Determining the next node of the subset may include identifying, based on the prior input(s), a given response value of the response value(s). Determining the next node of the subset may also include determining the next node, e.g., node 2107 (FIG. 21B), based on the given response value.

Exemplary Granite Guardian FlexEdge™ Turn Up

In some embodiments, a control task for a real-world communications network may include a control task for a real-world device such as a Granite Guardian FlexEdge™ device (Granite Telecommunications, LLC, Quincy, MA) or any other suitable known device that is associated with communications networks. Below is a description of an example implementation in which an embodiment is utilized to activate a real-world device, e.g., a Granite Guardian FlexEdge™ device. It is noted that embodiments are not limited to the below example and, instead, embodiments may be utilized to perform any network control tasks known to those of skill in the art. According to one such embodiment, the control task includes activating or turning up a real-world device, configuring a real-world device, verifying operating parameter(s) of a real-world device, instantiating virtual network function(s) for a real-world device, or instantiating virtual machine(s) for a real-world device, among other examples.

Field Input Node

Figure 22:
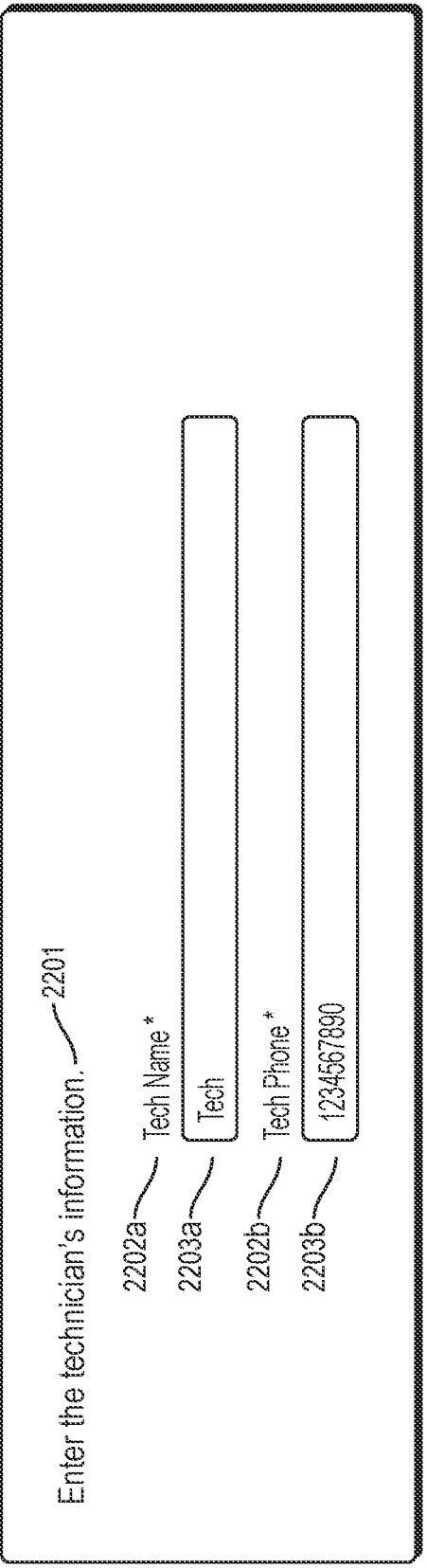
FIG. 22 illustrates rendering of a field input type node according to an embodiment.

FIG. 22 illustrates rendering of a field input type node 2200 according to an embodiment. In an aspect, rendered node 2200 includes a question/title 2201, and answer headings 2202a and 2202b with corresponding answer input fields 2203a and 2203b. According to an implementation, question 2201 may prompt a technician, such as user 101b, to enter information, e.g., the technician's name 2202a and phone number 2202b via respective fields 2203a and 2203b.

In some embodiments, rendering, e.g., by method 300, may include rendering response value(s) of a given node, e.g., answer headings 2202a and 2202b of rendered node 2200, on a display. Receiving a data input may include receiving a user input, e.g., inputs to fields 2203a and 2203b. Further, determining a next node of a subset may include identifying, based on the received user input, given response value(s) of the response value(s). Determining the next node of the subset may also include determining the next node based on the given response value(s). In some implementations, the node type of the given node, e.g., rendered node 2200, may be a field input type.

Selection (Radio Button) Node

Figure 23:
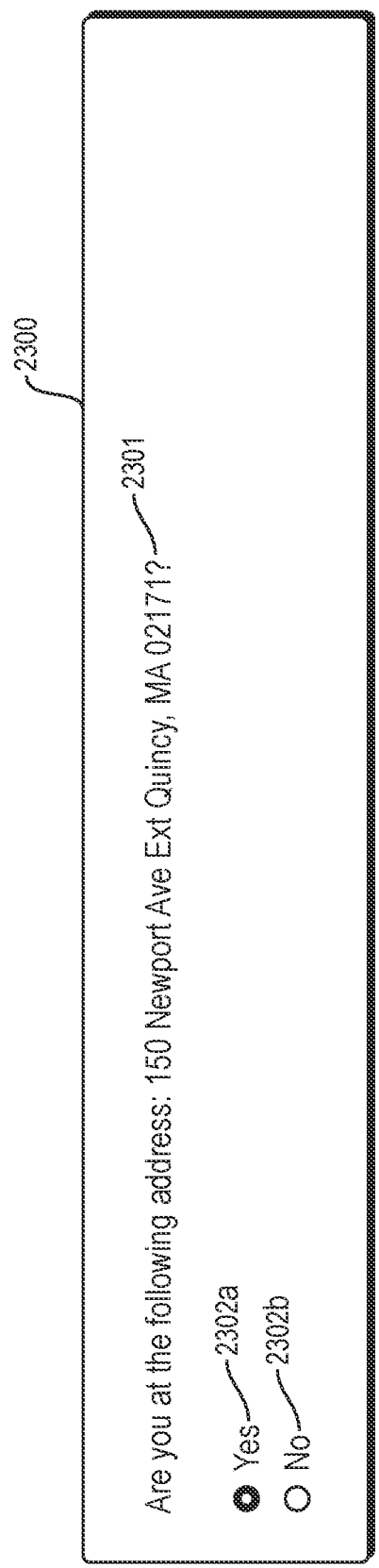
FIG. 23 illustrates rendering of a radio button type node according to an embodiment.

FIG. 23 illustrates rendering of a radio button type node 2300 according to an embodiment. In an aspect, rendered node 2300 includes a question/title 2301 and answer options 2302a and 2302b. According to an implementation, question 2301 may prompt the technician to indicate whether s/he is at a particular location, such as a customer site, among other examples.

In some embodiments, rendering may include rendering response value(s) of a given node, e.g., answer options 2302a and 2302b of rendered node 2300, on a display. Receiving a data input may include receiving a user input, e.g., a selection of answer option 2302a or 2302b. Further, determining a next node of a subset may include identifying, based on the received user input, given response value(s) of the response value(s), such as by determining which of response value 2302a and 2302b was selected. Determining the next node of the subset may also include determining the next node based on the given response value(s). In some implementations, the node type of the given node, e.g., rendered node 2300, may be a radio button type.

Figure 24A:
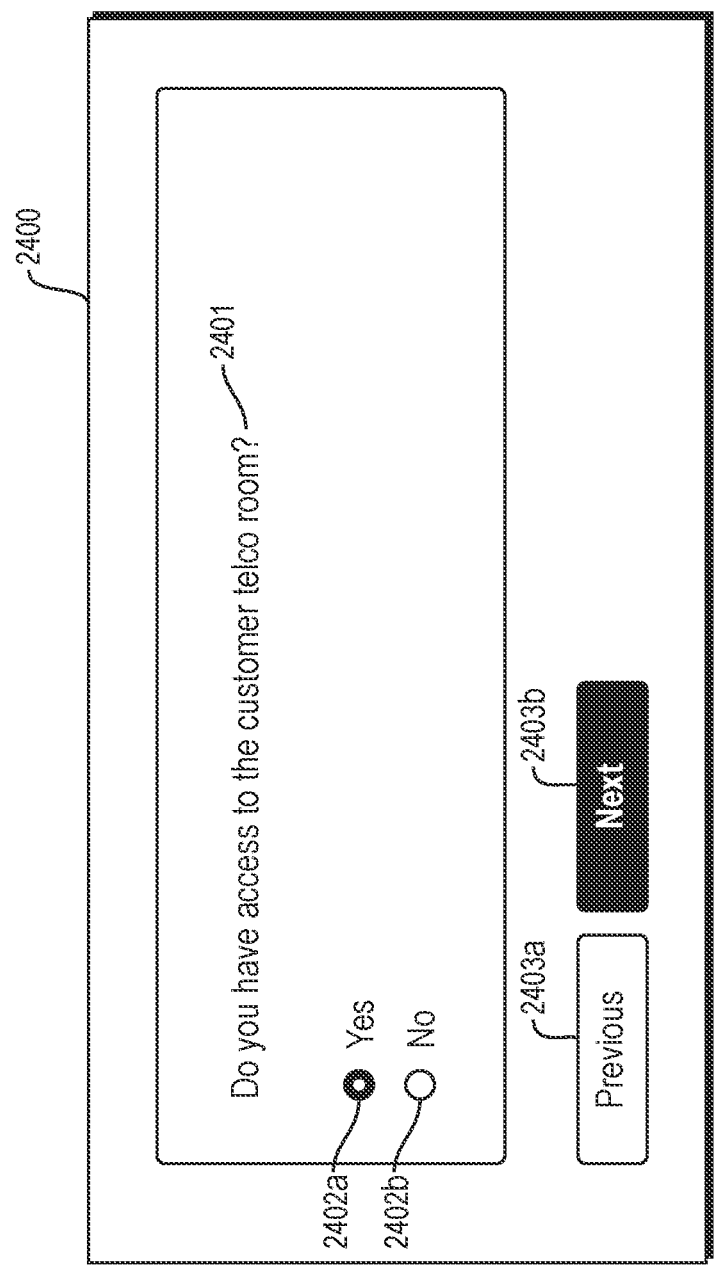
FIG. 24A illustrates rendering of a radio button type node according to another embodiment.

FIG. 24A illustrates rendering of a radio button type node 2400 according to another embodiment. In an aspect, rendered node 2400 includes a question/title 2401, answer options 2402a and 2402b, and previous/next buttons 2403a/2403b. According to an implementation, question 2401 may prompt the technician to indicate whether s/he can access a particular area, such as a portion of a customer site, among other examples.

FIG. 24B is an exemplary map entry data structure 2410 according to an embodiment. In an aspect, map entry 2410 may represent the contents of a node and associated edges, e.g., node 990 with associated edges 995a and 995b (FIG. 9A), after a data structure including the node and edges, e.g., data structure 103 (FIG. 1) or 330 (FIG. 3D), is translated or converted into a map object by an exemplary workflow runner component. In an embodiment, map entry 2410 may be rendered by the workflow runner component as rendered node 2400. As shown in FIG. 24B, map entry 2410 includes fields 2411-2414. Field 2411 includes subfields 2411a and 2411b. Fields 2411a and 2411b each further include their own subfields 2411a1-2411a2 and 2411b1-2411b2, respectively.

According to an implementation, field 2414 may indicate a node type, e.g., a radio button node type. In an embodiment, a node type indicated by, e.g., field 2414, may inform what data is expected in map entry 2410, as well as how map entry 2410 is displayed, e.g., as rendered node 2400 of FIG. 24A. For example, in an aspect, when field 2414 indicates a radio button node type, map entry 2410 may include two response values, e.g., fields 2411a and 2411b. According to an aspect, when answer option 2402a ("Yes") of rendered node 2400 is selected, the workflow runner component may refer to or scan response values 2411a and 2411b and determine—based on a match between yes answer 2402a and subfield 2411a2 of response value 2411a—that a next node to be visited is one associated with subfield 2411a1, e.g., an API type node 1300 (FIG. 13A) or 1400 (FIG. 14A).

Continuing with FIG. 24B, in an implementation, field 2412 may correspond to a node's unique ID, e.g., unique ID 991 ("radio-2") of node 990 (FIG. 9A), while field 2413 may correspond to, e.g., question 2401 of rendered node 2400 (FIG. 24A).

Selection (Checkbox) Node

Figure 25:
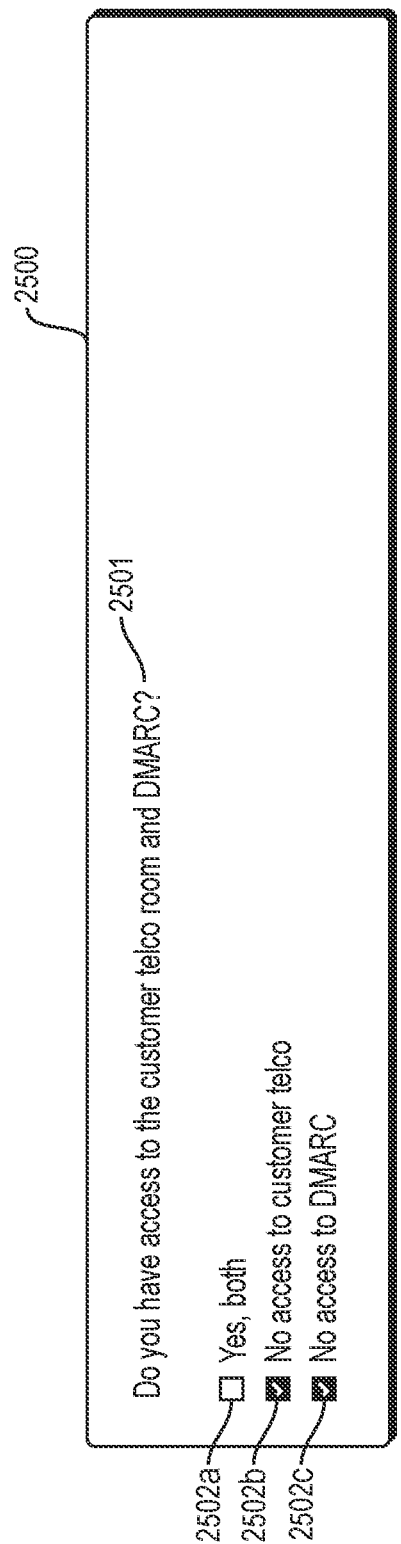
FIG. 25 illustrates rendering of a checkbox type node according to an embodiment.

FIG. 25 illustrates rendering of a checkbox type node 2500 according to an embodiment. In an aspect, rendered node 2500 includes a question/title 2501 and answer options 2502a-2502c. According to an implementation, question 2501 may prompt the user, e.g., a technician, to indicate whether s/he can access particular area(s) and/or equipment, such as portion(s) of a customer site and/or customer equipment, among other examples.

In some embodiments, rendering, e.g., by method 300, may include rendering response value(s) of a given node, e.g., answer options 2502a-2502c of rendered node 2500, on a display. Receiving a data input may include receiving a user input, e.g., a selection of answer option(s) (e.g. response values) 2502a-2502c. Further, determining a next node of a subset may include identifying, based on the received user input, given response value(s) of the response value(s). Determining the next node of the subset may also include determining the next node based on the given response value(s). In some implementations, the node type of the given node, e.g., rendered node 2500, may be a checkbox type.

Figure 26:
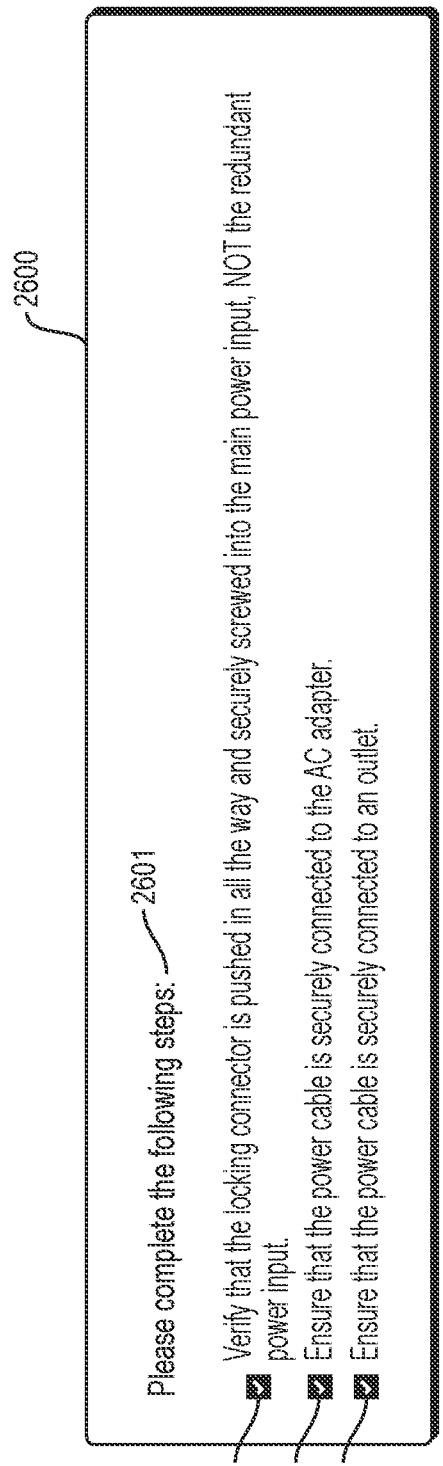
FIG. 26 illustrates rendering of a checkbox type node according to another embodiment.

FIG. 26 illustrates rendering of a checkbox type node 2600 according to another embodiment. In an aspect, rendered node 2600 includes a question/title 2601 and answer options 2602a-c. According to an implementation, title 2601 may prompt the user to complete various task(s) or activity(ies), among other examples.

In an embodiment, node 2600 may be configured such that all displayed tasks must be completed, and all corresponding boxes, e.g., answer options 2602a-c, must be selected before proceeding further.

API Node

In some embodiments, an API type node may be configured to dynamically obtain information from an external application or system to make use of said information during the workflow.

Figure 27A:
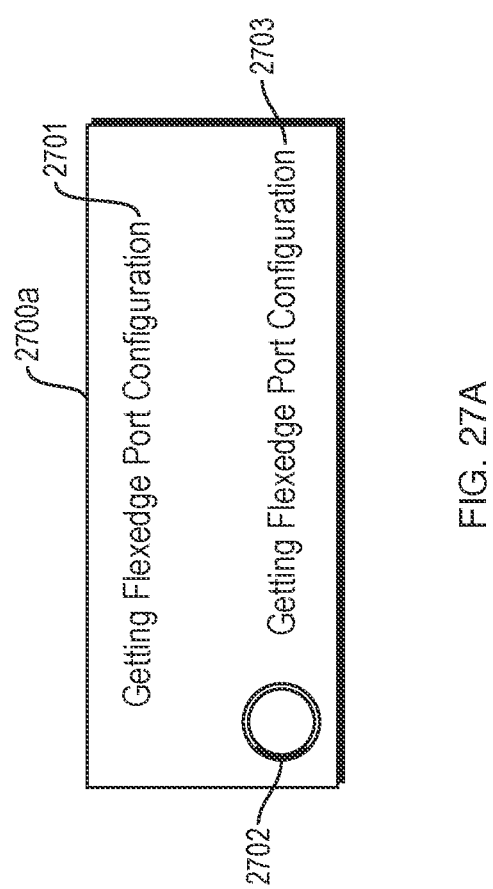
FIG. 27A illustrates a rendering of an API type node according to an embodiment.

FIG. 27A illustrates a rendering 2700a of an API type node, e.g., node 1300 (FIG. 13A) or 1400 (FIG. 14A), according to an embodiment. In an aspect, rendering node 2700a includes a title 2701, a status icon or indicator 2702, and a status message 2703. According to an implementation, icon 2702 may be configured to indicate that an API call is in progress, e.g., because the workflow runner component is checking or querying the real-world device.

Figure 27B:
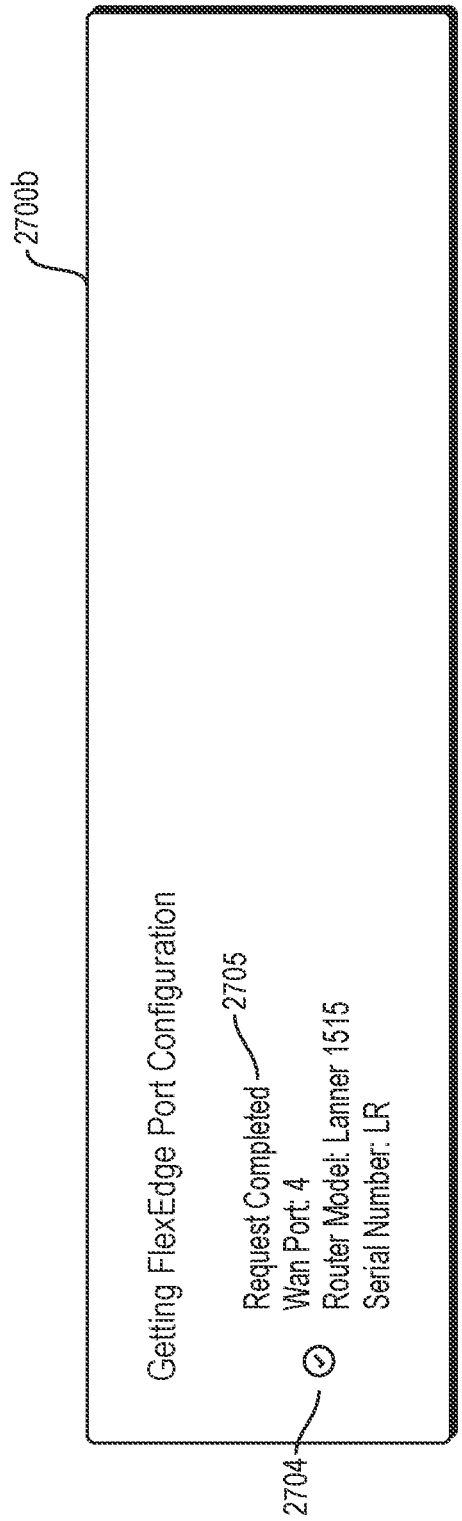
FIG. 27B illustrates another rendering of the API type node of FIG. 27A according to an embodiment.

FIG. 27B illustrates a rendering 2700b of the API type node of FIG. 27A according to another embodiment. In an aspect, rendering 2700b includes status icon or indicator 2704 and status information 2705. According to an implementation, icon 2704 may be configured to indicate that the API call of FIG. 27A was successful and required information has been obtained by querying the device. Status information 2705 indicates, for example, that the query request is complete, and includes results of the query, such as a port number, model identifier, and serial number for the device. In an embodiment, the obtained information may be used for, e.g., testing the device and/or as a reference in future workflow steps. Otherwise, in an aspect, if the API call fails, a corresponding icon (not shown) may be displayed instead, and the user may be prompted to perform troubleshooting of the failure.

Figure 28A:
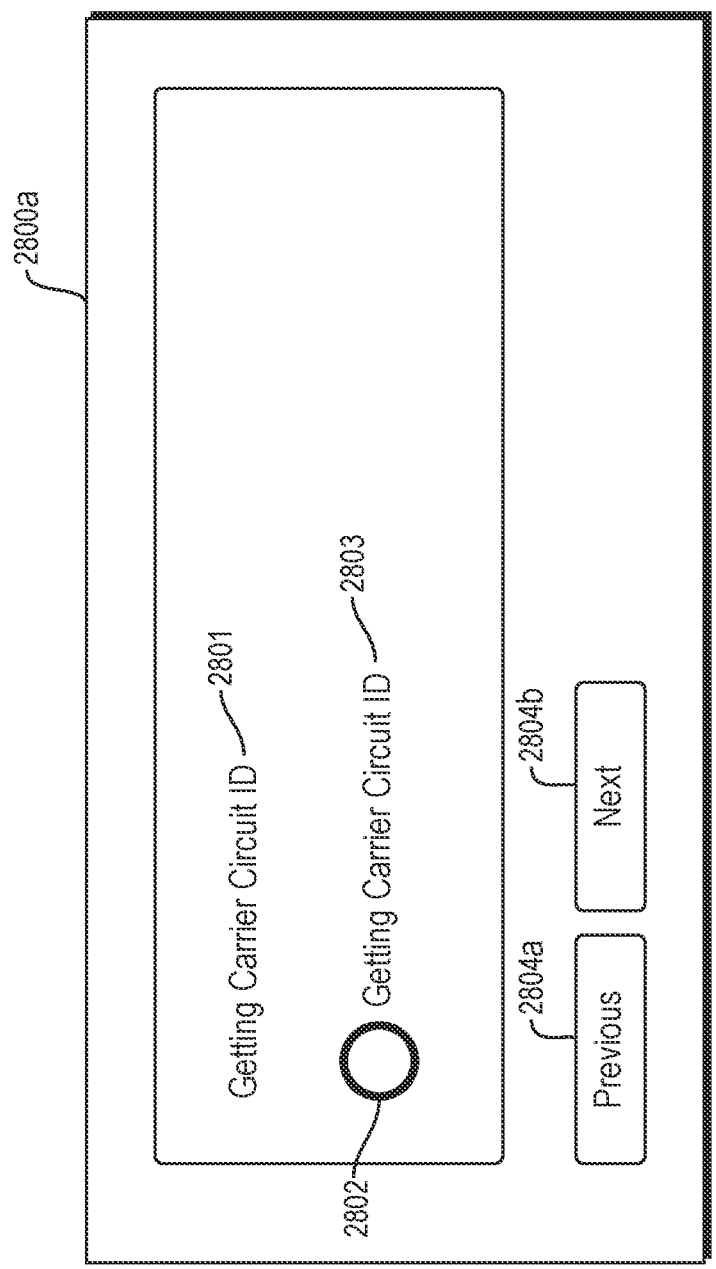
FIG. 28A illustrates a rendering of an API type node according to another embodiment.

FIG. 28A illustrates a rendering 2800a of an API type node, e.g., node 1300 (FIG. 13A) or 1400 (FIG. 14A), according to an embodiment. In an aspect, rendering 2800a includes a title 2801, a status icon or indicator 2802, a status message 2803, and buttons 2804a-b. According to an implementation, icon 2802 may be configured to indicate that an API call is in progress, e.g., data is being fetched or loaded, such as a circuit ID of an internet access circuit being retrieved from an external application or system.

FIG. 28B is an exemplary map entry data structure 2810 according to an embodiment. In an aspect, map entry 2810 may represent the contents of a node and associated edges, e.g., node 1400 with associated edges 1405a-1405d (FIG. 14A), after a data structure including the node and edges, e.g. data structure 103 (FIG. 1) or 330 (FIG. 3D), is translated or converted into a map object by an exemplary workflow runner component. In an embodiment, map entry 2810 may be rendered by the workflow runner component as 2800a, 2800b (FIG. 28C), and/or 2800c (FIG. 28D). As shown in FIG. 28B, map entry 2810 includes fields 2811-2814. Field 2813 includes subfields 2813a and 2813b, while field 2814 includes subfields 2814a-2814d. Each of fields 2814a-2814d includes its own subfields 2814a1-4, 2814b1-4, 2814c1-4, and 2814d1-4, respectively.

According to an implementation, field 2812 may indicate a node type, e.g., an API node type. In an embodiment, a node type indicated by, e.g., field 2812, may inform what data is expected in map entry 2810, as well as how map entry 2810 is displayed, e.g., rendered as 2800a, 2800b (FIG. 28C), and/or 2800c (FIG. 28D). For example, in an aspect, when field 2812 indicates an API type, map entry 2810 may include response value(s), e.g., field(s) 2814a-2814d. According to an aspect, when a result of the API call of FIG. 28A is received, the workflow runner component may refer to or scan response values 2814a-2814d and determine a next node to be visited. For example, in an implementation, based on a match between the API result and subfields 2814c1-3 of response value 2814c, the workflow runner may determine that the next node is one associated with subfield 2814c4, e.g., a radio button type node such as node 990 (FIG. 9A).

As shown in FIG. 28B, in an embodiment, there may be multiple possible results for failures (success=false) that have different response keys, e.g., fields 2814a3, 2814b3, and/or 2814d3. These responses may represent different ways that fetching data can fail. For example, in an aspect, if there is no response after a certain duration from an external application or system, e.g., corresponding to API endpoint field 2813b, an error message of "Timeout error" may be received. According to an implementation, the workflow runner component may scan map entry 2810 to determine a next step. In one such implementation, based on a match of results keys for success=False and response="Timeout error", e.g., fields 2814a2 and 2814a3, respectively, the workflow runner may determine the next step to be escalate-3, e.g., a node corresponding to field 2814a4.

Continuing with FIG. 28B, in an embodiment, field 2811 may correspond to a node's unique ID, e.g., unique ID 1301 ("api-1") of node 1300 (FIG. 13) or unique ID 1401 of node 1400 (FIG. 14A), while fields 2813a and 2813b may correspond to, e.g., title 2801 (FIG. 28A) and an identifier for an API endpoint to be invoked, respectively.

Figure 28C:
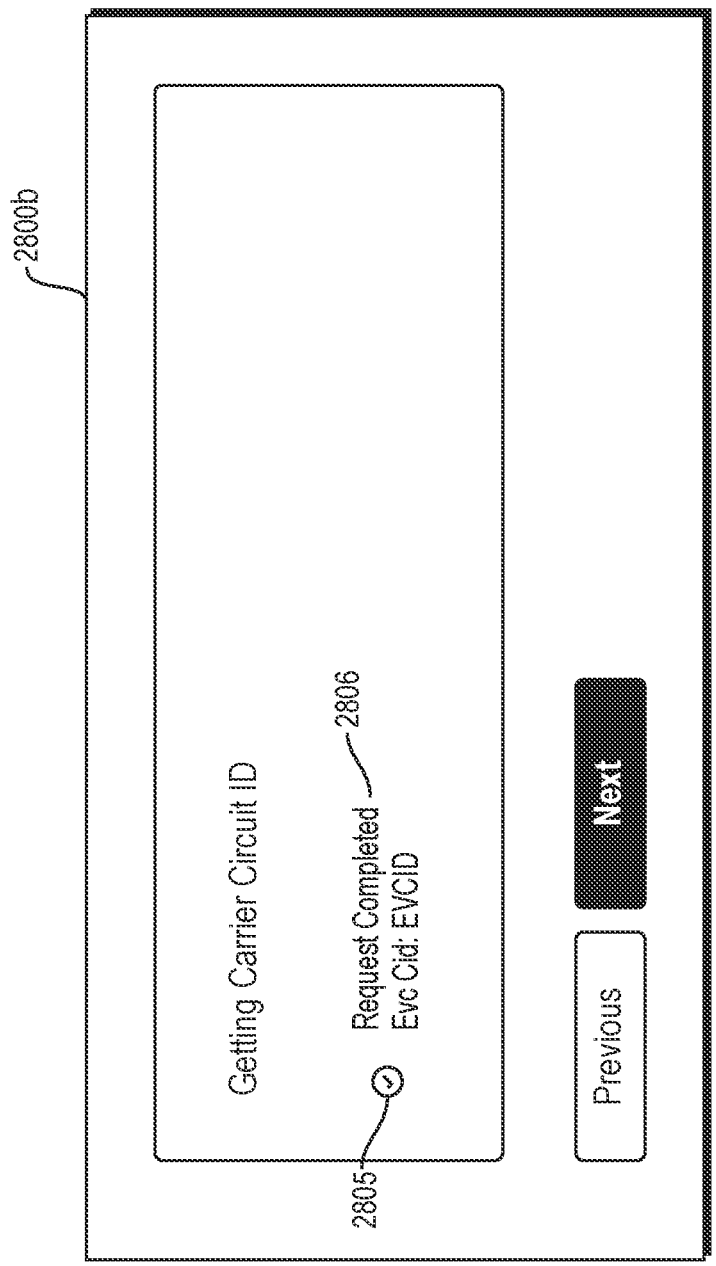
FIG. 28C illustrates another rendering of the API type node of FIG. 28A according to an embodiment.
Figure 28D:
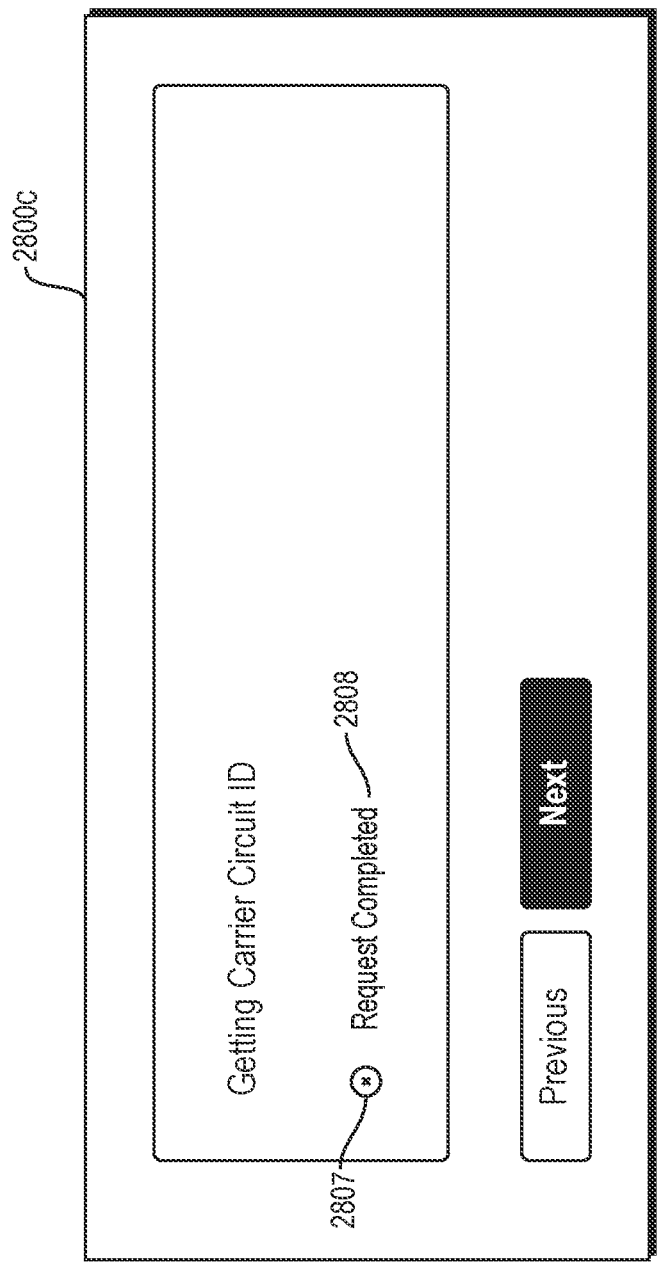
FIG. 28D illustrates yet another rendering of the API type node of FIG. 28A according to an embodiment.

FIG. 28C illustrates a rendering 2800b of the API type node of FIG. 28A according to another embodiment. In an aspect, rendering 2800b includes status icon or indicator 2805 and status information 2806 (e.g., information indicating that the API call of FIG. 28A is complete and including results of the API call). According to an implementation, icon 2805 may be configured to indicate that the API call of FIG. 28A was successful and required information has been obtained. In an embodiment, the obtained information may be used for, e.g., testing purposes and/or as a reference in future workflow steps.

FIG. 28D illustrates a rendering 2800c of the API type node of FIG. 28A according to yet another embodiment. In an aspect, rendering 2800c includes status icon or indicator 2807 and status information 2808. According to an implementation, icon 2807 may be configured to indicate that the API call of FIG. 28A failed, e.g., an error occurred while retrieving the data, and the user may be prompted to perform troubleshooting of the failure.

In some embodiments of method 300, for a given node of a subset, e.g., node 1300 (FIG. 13A) or 1400 (FIG. 14A) corresponding to unique ID field 2811 of map entry 2810 (FIG. 28B), a node type may be an API type. Receiving a data input may include receiving an API result by invoking an API associated with the given node, e.g., an external application or system, e.g., corresponding to API endpoint field 2813b (FIG. 28B). In addition, rendering may include rendering the API result on a display. Further, determining a next node of the subset may include identifying, based on the received API result, a given response value of response value(s) of the node, e.g., response value(s) 2814a-2814d (FIG. 28B). Determining the next node of the subset may also include determining the next node based on the given response value.

Wait/Countdown Node

FIG. 29 illustrates rendering of a countdown or wait type node 2900 according to an embodiment. In an aspect, rendered node 2900 includes a title 2901 with countdown length or time amount 2901a and timer 2902. According to an implementation, displaying the node 2900 instructs the user to wait an allotted amount of time 2901a before proceeding to a next step or task/activity. Further, in an embodiment, the technician may be instructed to confirm that the task, e.g., powering on a customer device such as a router, is complete before proceeding.

In some embodiments of method 300, for a given node of a subset, e.g., node 2900, a node type may be a countdown type. Receiving a data input may include obtaining a time interval associated with the given node. Additionally, rendering may include rendering the time interval on the display, e.g., as countdown length 2901a. In some implementations, executing a workflow may also be suspended for a duration of the time interval.

Escalation Node

Figure 30:
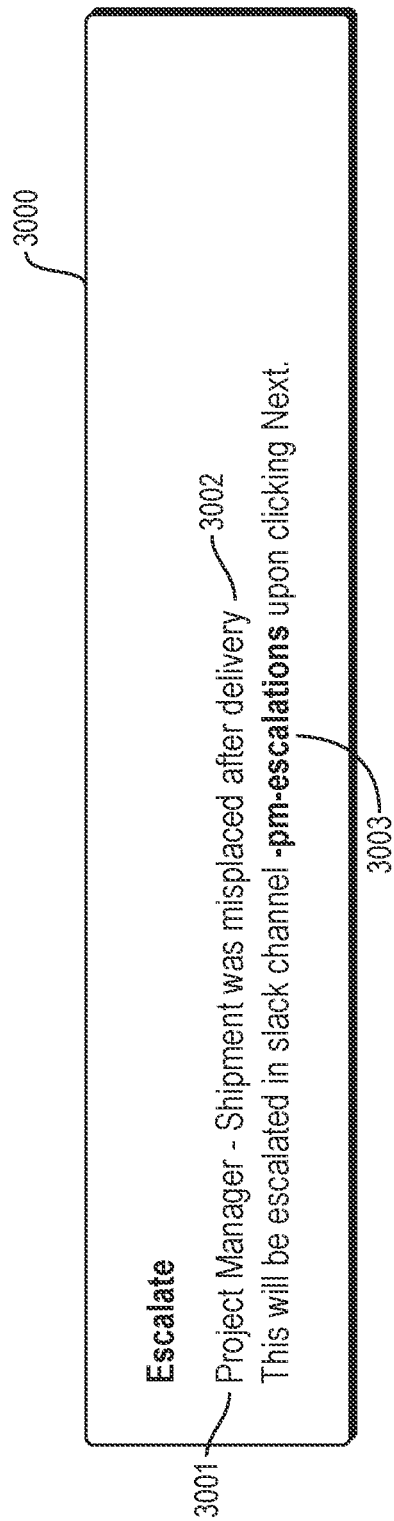
FIG. 30 illustrates rendering of an escalation type node according to an embodiment.

FIG. 30 illustrates rendering of an escalation type node 3000 according to an embodiment. In an aspect, rendered node 3000 includes an escalation group or team name 3001, a failure description 3002, and a communications channel name or identifier 3003.

In some embodiments of method 300, for a given node of a subset, e.g., node 3000, a node type may be an escalation type. Rendering may include rendering, on a display, a communications interface for a communications channel, e.g., a channel corresponding to name 3003, associated with the given node. In addition, receiving a data input may include receiving a user input, e.g., an input from user 101a or 101b (FIG. 1), in response to rendering the communications interface. Further, determining a next node of the subset may include identifying, based on the received user input, a given response value of response value(s) of the node. Determining a next node of the subset may also include determining the next node based on the given response value. In some aspects, receiving the user input includes acquiring an image relating to the real-world device.

Nodes With Attachment(s)

Figure 31:
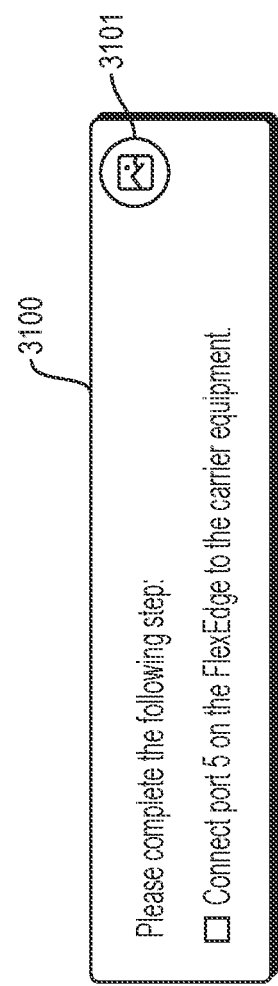
FIG. 31 illustrates rendering of a node with an attached content item according to an embodiment.

FIG. 31 illustrates rendering of a node 3100 with an attached content item (not shown) according to an embodiment. In an aspect, rendered node 3100 includes a picture icon 3101. According to an implementation, icon 3101 may be configured such that clicking or otherwise activating icon 3101 may open and/or display the content item, e.g., a reference image.

As discussed hereinabove in relation to 787 of FIG. 7, attachment(s) may be included with any type of node that is rendered, such as a radio button type node, a checkbox type node, a wait/countdown type node, an API type node, an escalation type node, a field input type node, a start node, or a final node type, among other examples.

In some embodiments of method 300, for a given node of a subset, e.g., node 3100, rendering may include rendering the reference image on a display.

Building a Demonstration Workflow

In some embodiments, a workflow may be constructed using, e.g., an exemplary workflow editor software tool. Building the workflow may involve adding one or more settings to the workflow. Settings may include, for example, a workflow name, a workflow description, a customer name, a customer account number, a name of an associated scheduling form, and/or a status (e.g., active or inactive), as well as escalation settings, among other examples. According to an aspect, escalation settings may include, for example, one or more escalation group names and one or more corresponding communication channel identifiers.

Figure 32:
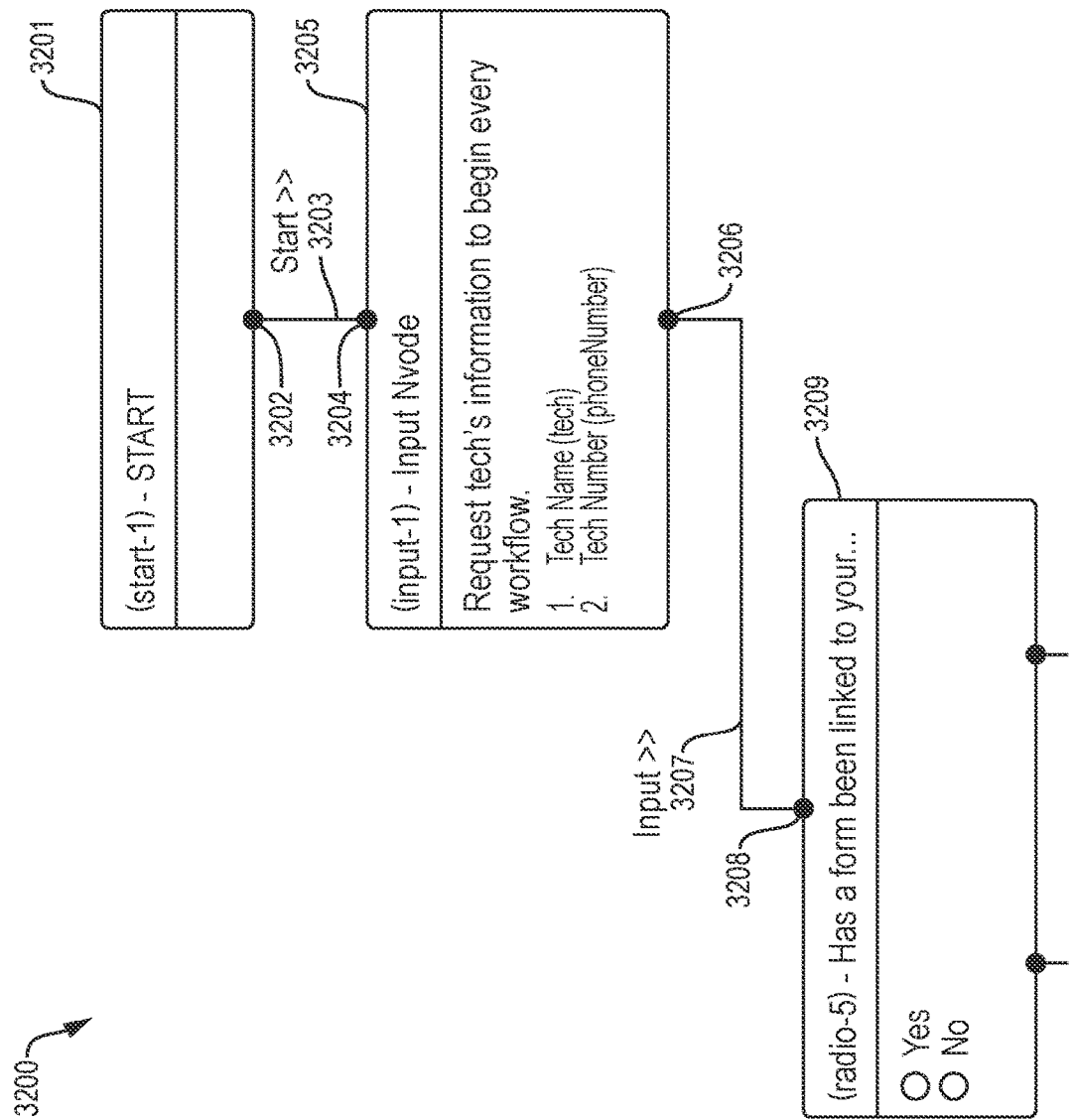
FIG. 32 is an image of workflow nodes according to an embodiment.

FIG. 32 is an image 3200 of workflow nodes 3201, 3205, and 3209 according to an embodiment. The image 3200 may be an example of a workflow editor tool GUI. As shown in FIG. 32, start type node 3201 includes source handle 3202. Edge 3203 connects handle 3202 of node 3201 to target handle 3204 of field input type node 3205. In turn, edge 3207 connects source handle 3206 of node 3205 to target handle 3208 of radio button type node 3209.

The above-mentioned interconnections between nodes 3201, 3205, and 3209 using edges 3203 and 3207 may be designed/indicated by a user, e.g., user 101a or 101b (FIG. 1), as part of building a workflow. For instance, a user may indicate desired nodes and interconnections between said nodes so as to design a desired logic workflow. For example, in an implementation, after workflow settings are configured, nodes may be added to the workflow. For instance, designing the workflow may begin with adding a start type node, e.g., node 3201. According to an embodiment, no information may be required for such a node. In an aspect, a workflow may not be run without a start type node.

In an embodiment, once a start type node, e.g., 3201, is added, a field input type node, e.g., node 3205, may then be preferably added. According to an aspect, a field input type node may be used, for example, to collect information about a field engineer, e.g., user 101b (FIG. 1), for reference and/or for technical support escalations.

In an implementation, a workflow may be constructed by connecting nodes, e.g., nodes 3201, 3205, and/or 3209, by creating edges, e.g., edges 3203 and/or 3207, via handles, e.g., handles 3202, 3204, 3206, and/or 3208.

Figure 33:
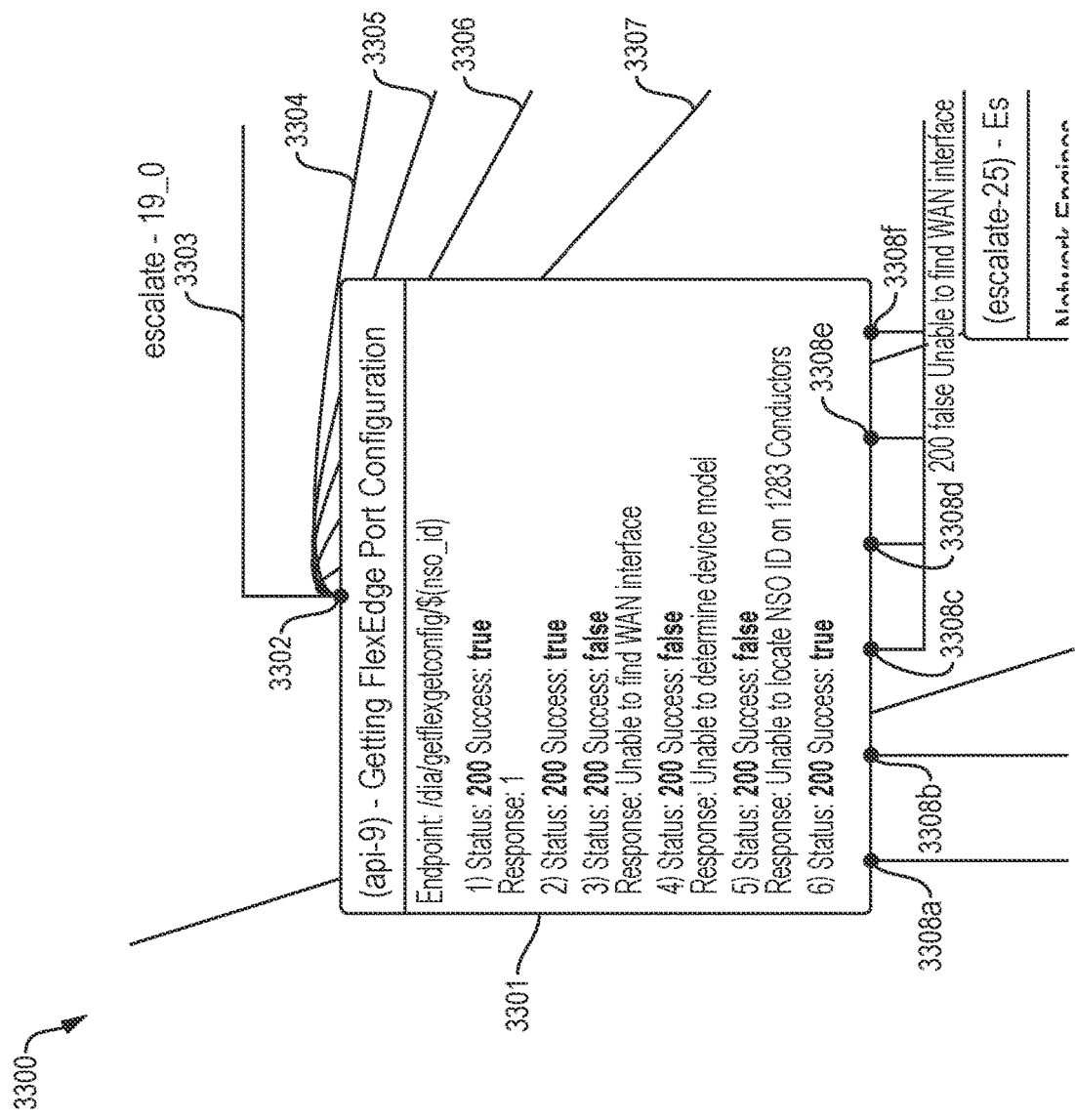
FIG. 33 is an image of a workflow node according to an embodiment.

FIG. 33 is an image 3300 of a workflow node 3301 according to an embodiment. The image 3300 may be an example of a workflow editor tool GUI. As shown in FIG. 33, node 3301 includes target handle 3302 with incoming edges 3303, 3304, 3305, 3306, and 3307. Further, node 3301 includes source handles 3308a-f, each with a single outbound edge.

In some embodiments, a source handle, e.g., handle(s) 3202, 3206, or 3308a-f, may correspond to an answer or response. According to an aspect, a source handle may only have one outbound edge, e.g., edge 3203 or 3207, or an edge corresponding to one of handles 3308a-f. However, in an implementation, multiple edges, e.g., edges 3303, 3304, 3305, 3306, and 3307, may be connected to a single target handle, e.g., handle 3302 of node 3301.

Figure 34:
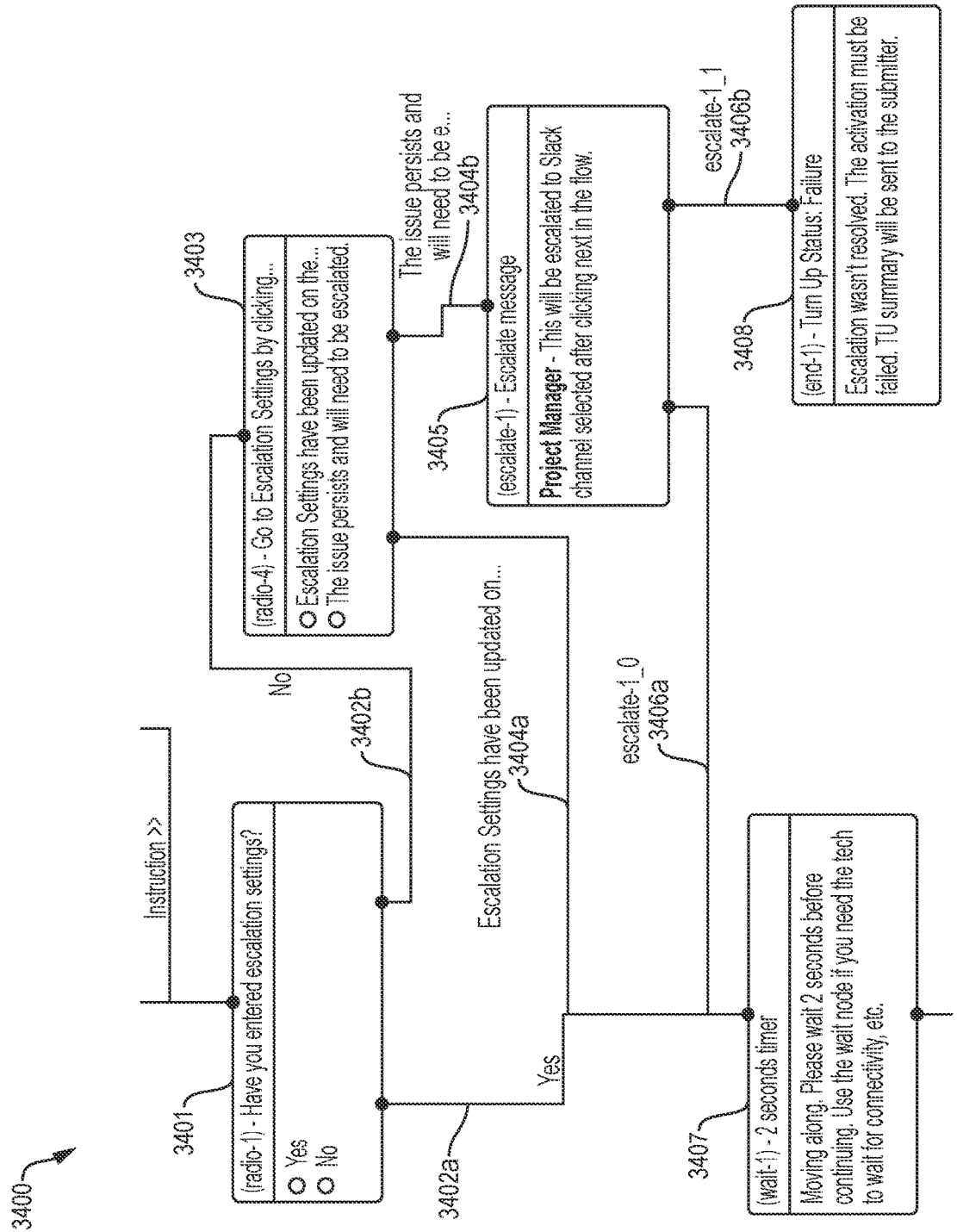
FIG. 34 is an image of workflow nodes according to an embodiment.

FIG. 34 is an image 3400 of workflow nodes 3401, 3403, 3405, 3407, and 3408 according to an embodiment. The image 3400 may be an example of a workflow editor tool GUI. As shown in FIG. 34, node 3401, e.g., a radio button type node, may include a Yes answer edge 3402a and a No answer edge 3402b. In an aspect, a No answer to node 3401 may indicate that workflow escalation settings have not been entered, and may accordingly cause the workflow to proceed to node 3403 via edge 3402b. According to an implementation, node 3403, e.g., a radio button type node, may in turn have edges 3404a and 3404b, which may correspond to answers that escalation settings have been updated/entered and that an issue (e.g., a technical issue occurring with a real-world device) persists, respectively. In an embodiment, an answer to node 3403 that the issue persists may cause the workflow to proceed to node 3405 via edge 3404b. Node 3405 may be, e.g., an escalation type node. According to an aspect, node 3405 may be configured such that, as part of rendering the node, a display will be presented that prompts a user, e.g., user 101a or 101b (FIG. 1), to indicate whether escalation has resolved the issue. In an implementation, a "yes" answer to the prompt may cause the workflow to proceed via edge 3406a to node 3407, while a "no" answer may cause the workflow to proceed via edge 3406b to node 3408.

Figure 35A:
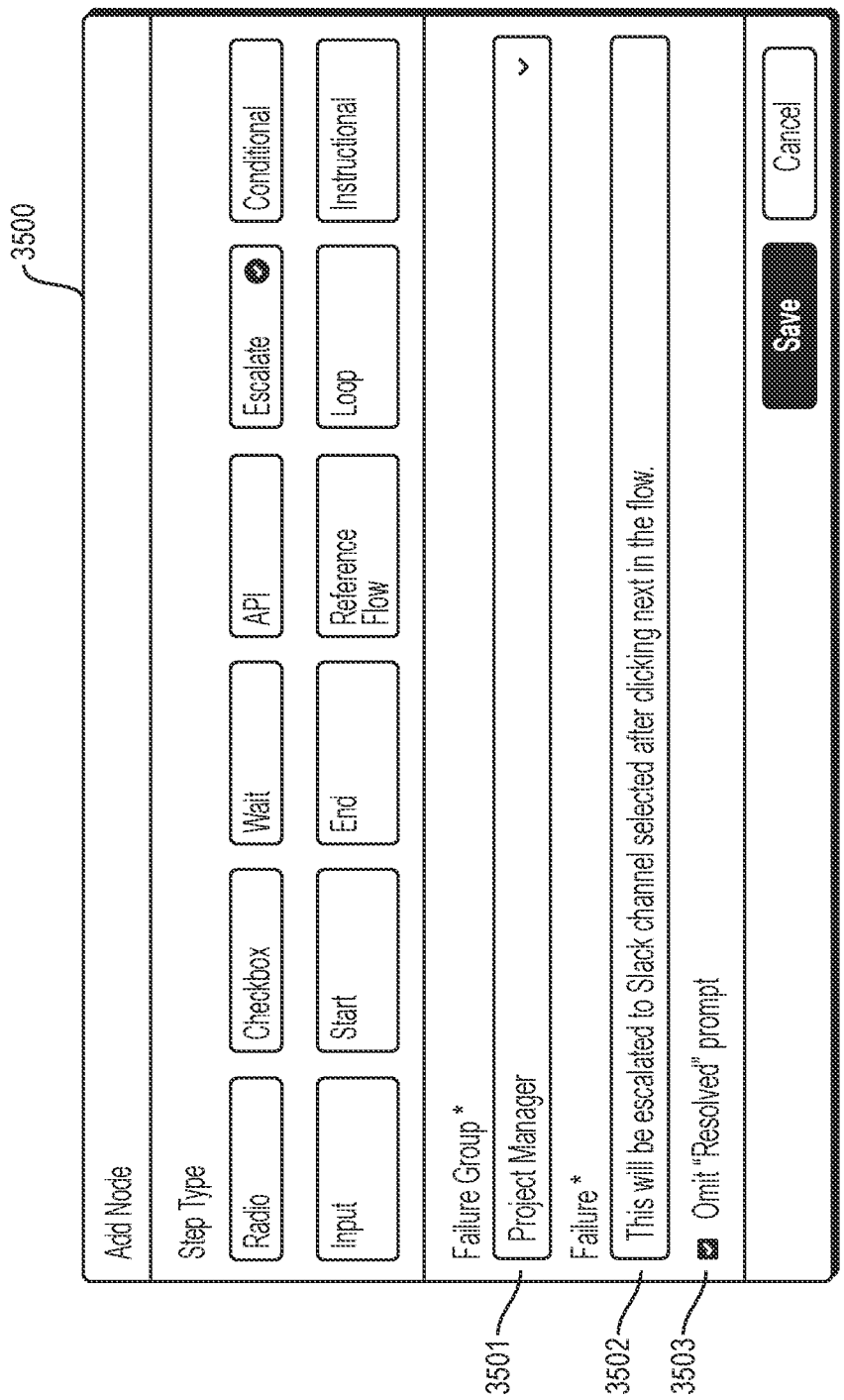
FIG. 35A illustrates a form interface for defining an escalation type node according to an embodiment.

FIG. 35A illustrates a form interface 3500 for defining an escalation type node, e.g., node 3405 of FIG. 34, according to an embodiment. As shown in FIG. 35A, interface 3500 may include escalation group dropdown menu 3501, message input field 3502, and checkbox 3503.

Figure 35B:
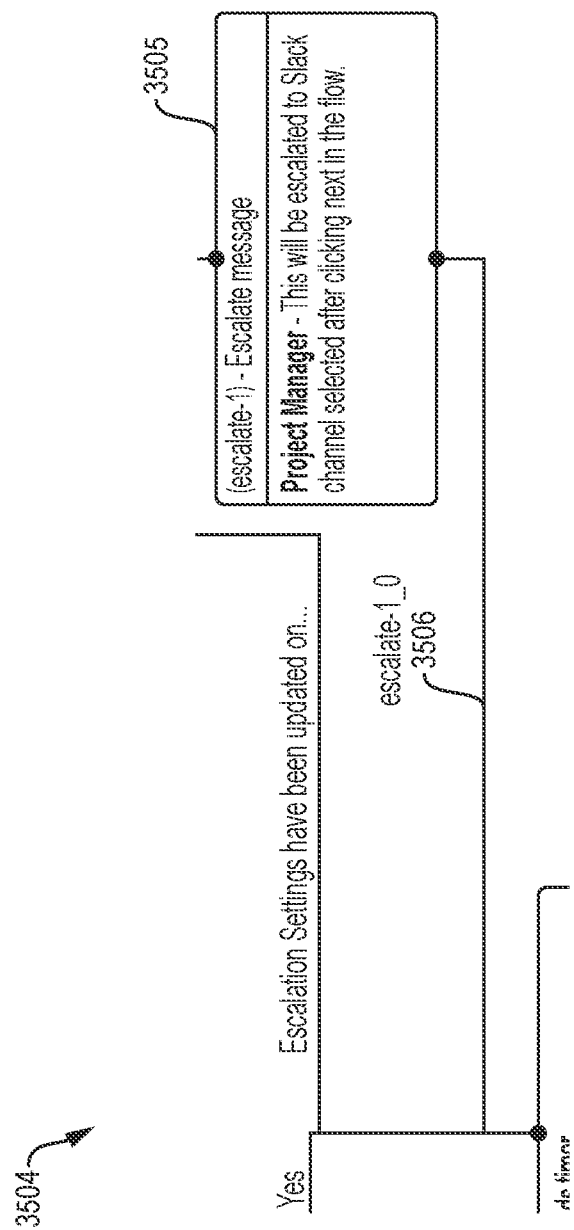
FIG. 35B is an image of a workflow node according to an embodiment.

FIG. 35B is an image 3504 of a workflow node 3505, e.g., an escalation type node, according to an embodiment. The image 3504 may be an example of a workflow editor tool GUI. As shown in FIG. 35B, node 3505 may have only one source edge 3506.

In an aspect, when defining an escalation type node, e.g., node 3405 or 3505, using form interface 3500, if checkbox 3503 is not checked, then the escalation type node, e.g., node 3405, may be configured to display a prompt concerning resolution of an issue, and proceed via one of two source edges, e.g., edges 3406a and 3406b, depending on an answer to the prompt. According to another aspect, if checkbox 3503 is checked, then the escalation type node, e.g., node 3505, may be configured to omit displaying the prompt, and may only have one source edge, e.g., edge 3506.

Figure 36A:
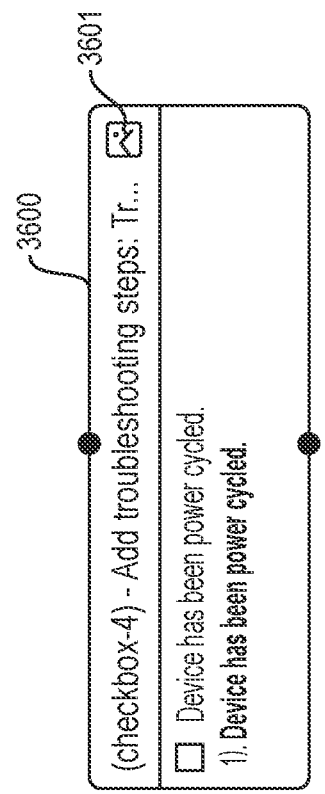
FIG. 36A illustrates defining a node with attached media content according to an embodiment.

FIG. 36A illustrates defining a node 3600 with attached media content according to an embodiment. As shown by FIG. 36A, node 3600 includes icon 3601. In an aspect, a presence of icon 3601 may indicate that node 3600 includes a media content attachment, such as a video, image, or photo item, or any other suitable media content item known to those in the art.

Figure 36B:
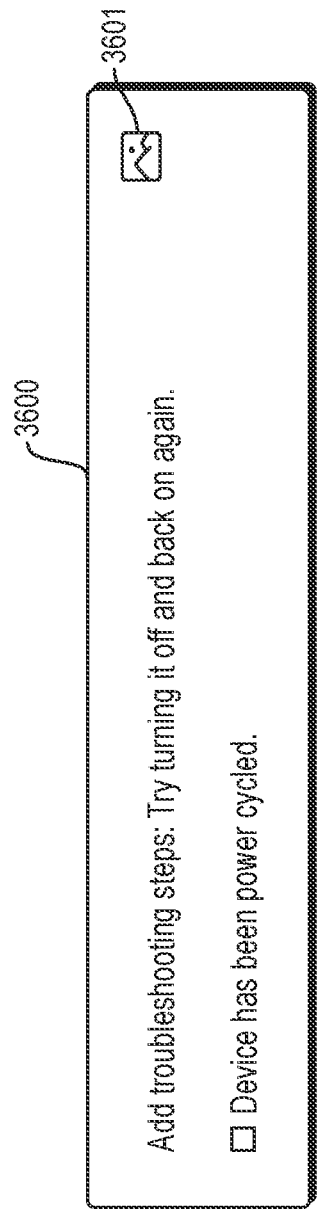
FIG. 36B illustrates rendering the node of FIG. 36A.

FIG. 36B illustrates rendering the node 3600 of FIG. 36B. In an implementation, when icon 3601 of rendered node is clicked or otherwise activated, the attached media content may be displayed or otherwise presented.

Figure 37:
FIG. 37 illustrates a form interface for defining a reference flow (reflow) type node according to an example embodiment.

FIG. 37 illustrates a form interface 3700 for defining a reference flow (reflow) type node according to an example embodiment. As shown in FIG. 37, form interface 3700 may include workflow selection menu 3701, node label field 3702, variables section 3703, and escalation settings section 3704. In an embodiment, reflow type nodes may be used to simplify large or complex workflows, e.g., workflows having many hundreds or potentially thousands of nodes. This may be accomplished by splitting or dividing existing workflows into multiple smaller parts. Each resulting component workflow may contain a subset of nodes from the original workflow and is thus modular and reusable in different situations; such modular workflows may be referred to as "reference flows." For example, in the case of a workflow to activate a real-world device supporting numerous types of voice lines and/or associated configurations, a separate reference flow may be used for troubleshooting issues arising with each type of voice line.

Continuing with FIG. 37, to implement the abovementioned reference flow functionality, form interface 3700 may include menu 3701 for selecting a reference flow to assign to a reflow type node. In an aspect, menu 3701 may be populated with names of workflows that have already been created. Thus, an existing workflow may be invoked by another workflow simply by creating a reflow type node that is configured to refer to an existing workflow. The node label field 3702 may be used to input a label (or title or description) for the reflow type node being defined by form interface 3700. The variables section 3703 may be used to input identifiers for variables that will be used by the reference flow. In an embodiment, variables from a "parent" workflow that includes a reflow type node will be passed to a "child" workflow referenced by that node. Similarly, escalation settings section 3704 may be used to define escalation settings used by a reference flow.

Running a Demonstration Workflow

Figure 38:
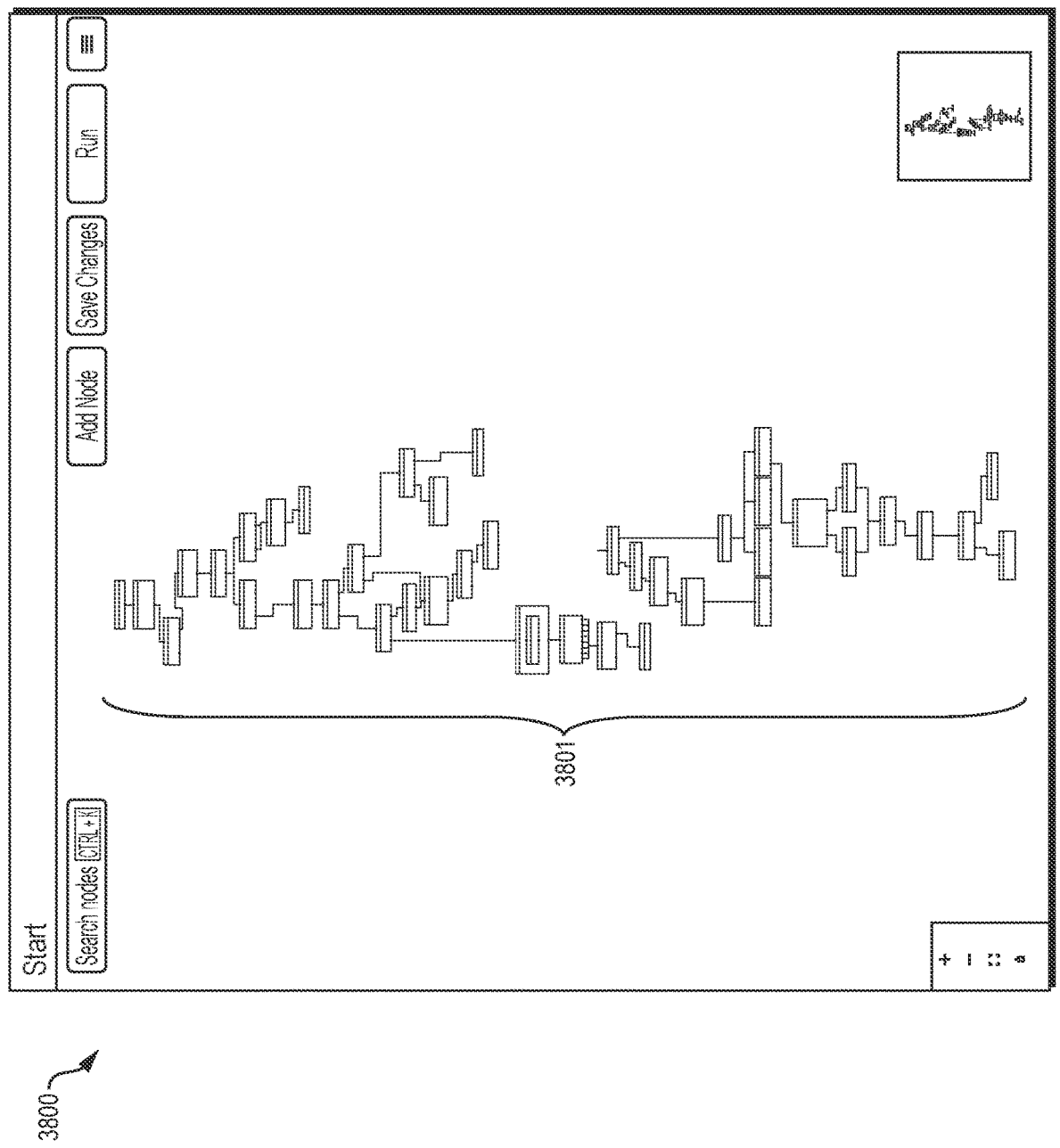
FIG. 38 is an image of an exemplary workflow containing nodes according to an embodiment.

FIG. 38 is an image 3800 of an exemplary workflow 3801 containing nodes according to an embodiment. Image 3800 may be an example of a workflow editor tool GUI.

FIG. 39 illustrates a form interface 3900 for scheduling execution of a workflow according to an example embodiment. As shown in FIG. 39, form interface 3900 may include dropdown menu 3901, customer data input fields group 3902, scheduling date/time input fields 3903a-b, and phone line input fields 3904a-b. The dropdown menu 3901 may be populated with names of existing workflows to enable a workflow to be selected for scheduling.

In some embodiments, it may be necessary to schedule a workflow before the workflow can be executed. In other embodiments, each form interface for an individual workflow to be scheduled may be completed manually, or alternately or additionally, multiple workflows may be scheduled via, e.g., a bulk upload process.

Figure 40:
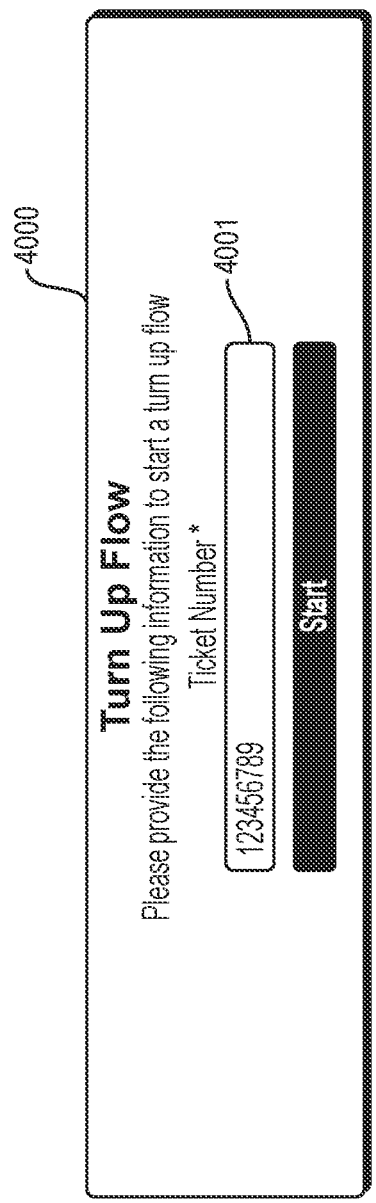
FIG. 40 illustrates an exemplary interface for commencing a workflow according to an embodiment.

FIG. 40 illustrates an exemplary interface 4000 for commencing a workflow according to an embodiment. As shown in FIG. 40, interface 4000 may include ticket number input field 4001. In some embodiments, field 4001 may be used for inputting a unique ticket number. In other embodiments, it may be necessary to input a ticket number via field 4001 in order to commence a workflow.

Figure 41A:
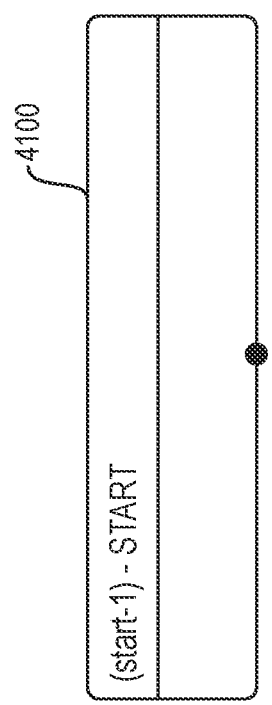
FIG. 41A illustrates a definition of a start type node of the workflow of FIG. 38.

FIG. 41A illustrates a definition of a start type node 4100 of the workflow 3801 of FIG. 38.

Figure 41B:
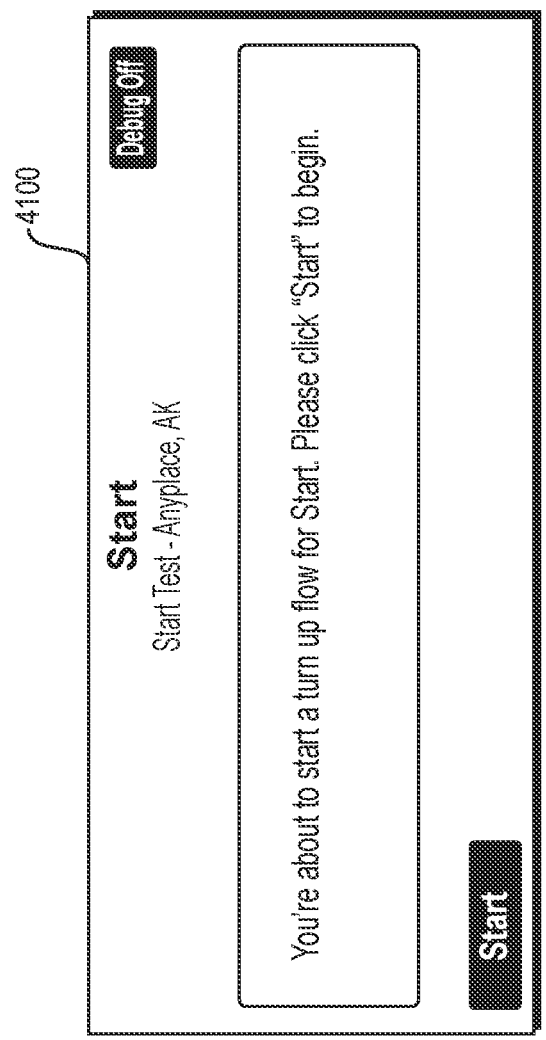
FIG. 41B illustrates rendering the start type node of FIG. 41A.

FIG. 41B illustrates rendering the start type node 4100 of FIG. 41A.

Figure 42A:
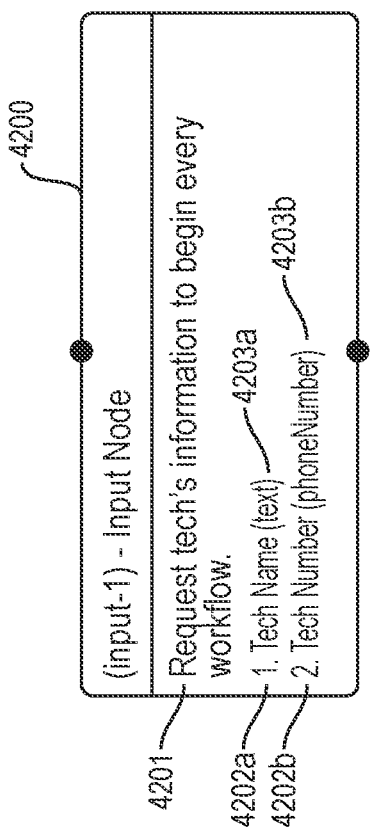
FIG. 42A illustrates a definition of a field input type node of the workflow of FIG. 38.

FIG. 42A illustrates a definition of a field input type node 4200 of the workflow 3801 of FIG. 38. As shown in FIG. 42A, in an aspect, node 4200 may include question/title 4201 and answer headings 4202a-b with corresponding variable names 4203a-b in parentheses.

Figure 42B:
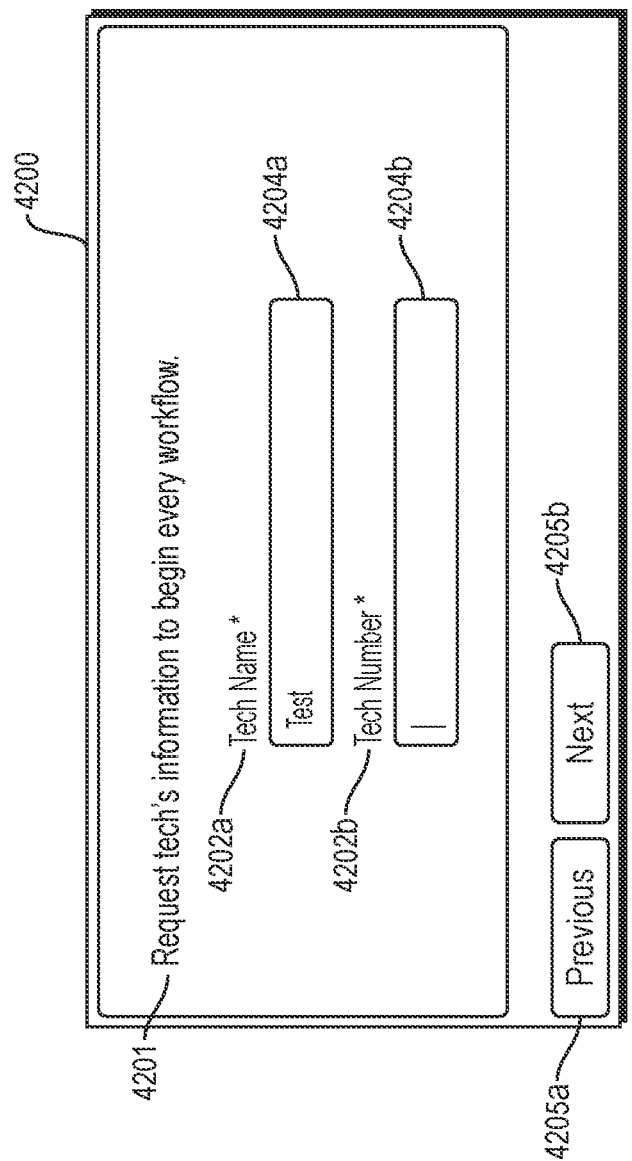
FIG. 42B illustrates rendering the field input type node of FIG. 42A.

FIG. 42B illustrates rendering the field input type node 4200 of FIG. 42A. In an implementation, rendered node 4200 may display components 4201 and 4202a-b described with respect to FIG. 42A, and may further display answer input fields 4204a-b corresponding to answer headings 4202a-b, as well as buttons 4205a-b. According to an embodiment, node 4200 may be used to request information from a field engineer or customer support technician, e.g., user 101a or 101b (FIG. 1), who is interacting with the workflow 3801. The buttons 4205a-b may allow a user to move to different portions of the workflow 3801, e.g., a previous step indicated by the button 4205a or a next step indicated by the button 4205b. Furthermore, the buttons 4205a-b may be inactive and/or greyed out when, e.g., data has yet to be input into all fields 4204a-b.

Figure 43A:
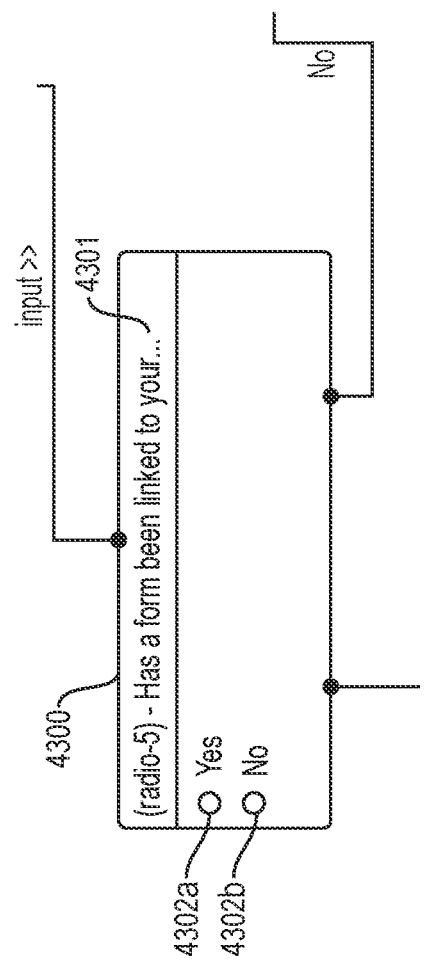
FIG. 43A illustrates a definition of a radio button type node of the workflow of FIG. 38.

FIG. 43A illustrates a definition of a radio button type node 4300 of the workflow 3801 of FIG. 38. As shown in FIG. 43A, in an aspect, node 4300 may include question/title 4301 and response values 4302a-b.

Figure 43B:
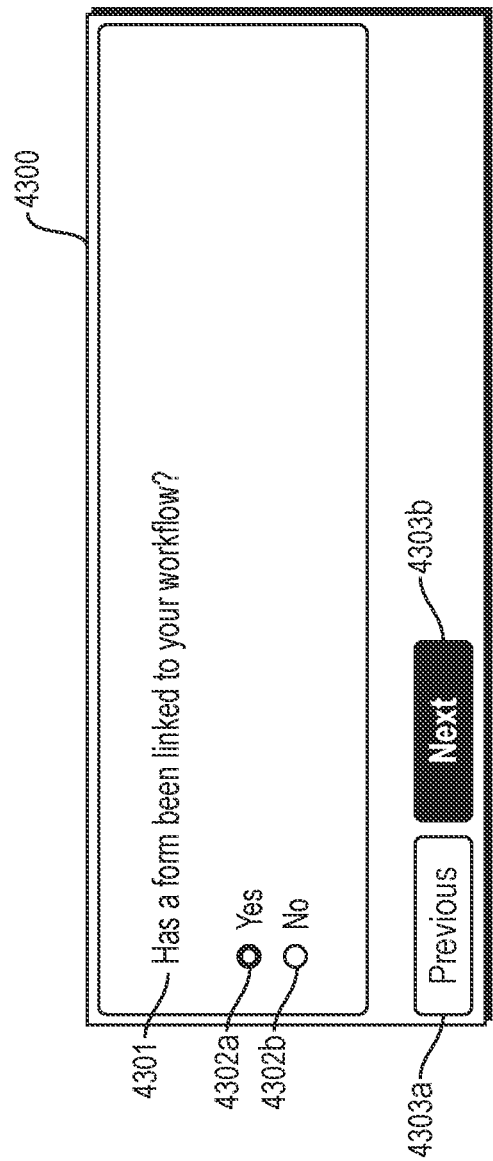
FIG. 43B illustrates rendering the radio button type node of FIG. 43A.

FIG. 43B illustrates rendering the radio button type node 4300 of FIG. 43A. In an implementation, rendered node 4300 may display elements 4301 and 4302a-b described with respect to FIG. 43A, and may further display buttons 4303a-b. In contrast with buttons 4205a-b of FIG. 42B, according to an embodiment, buttons 4303a-b of FIG. 43B may be active and/or highlighted when, e.g., either of response values 4302a-b is selected, thus allowing the workflow to continue to a subsequent node or return to a previous node.

Figure 44A:
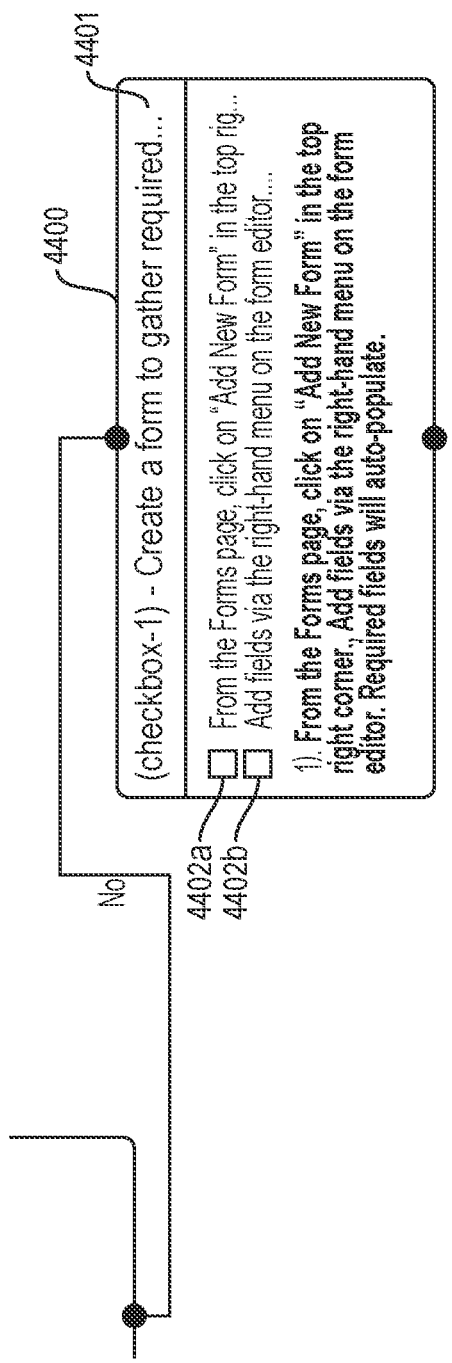
FIG. 44A illustrates a definition of a checkbox type node of the workflow of FIG. 38.

FIG. 44A illustrates a definition of a checkbox type node 4400 of the workflow 3801 of FIG. 38. As shown in FIG. 44A, in an aspect, node 4400 may include question/title 4401 and response values 4402a-b.

Figure 44B:
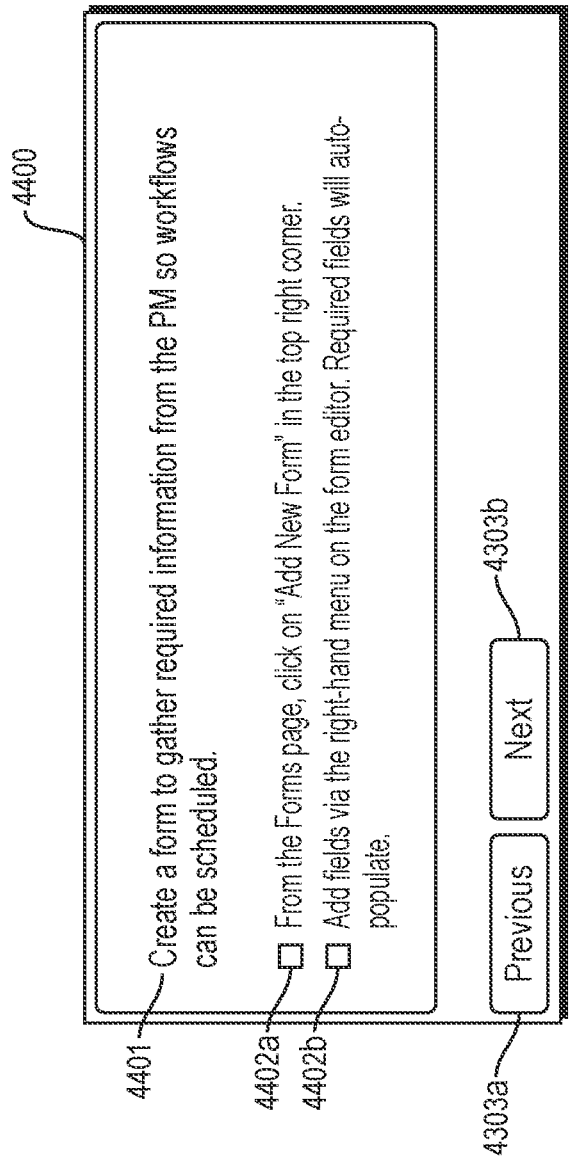
FIG. 44B illustrates rendering the checkbox node of FIG. 44A.

FIG. 44B illustrates rendering the checkbox node 4400 of FIG. 44A. In an implementation, rendered node 4400 may display components 4401 and 4402a-b described with respect to FIG. 44A. The buttons 4403a-b may allow a user to move to different portions of the workflow 3801, e.g., a previous step indicated by the button 4403a or a next step indicated by the button 4403b.

Figure 45A:
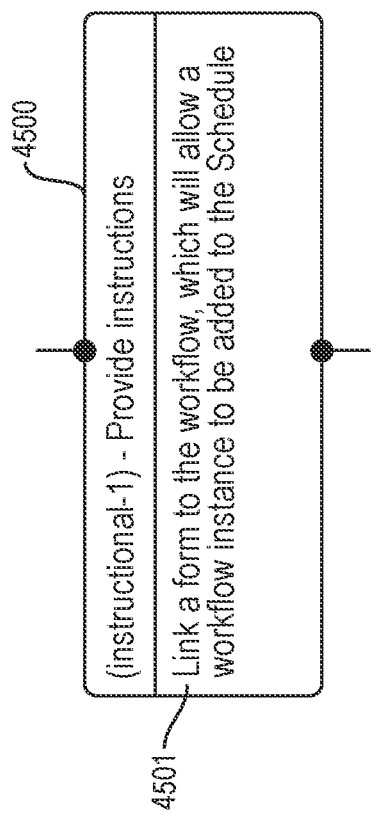
FIG. 45A illustrates a definition of an instructional type node of the workflow of FIG. 38.

FIG. 45A illustrates a definition of an instructional type node 4500 of the workflow 3801 of FIG. 38. As shown in FIG. 45A, in an aspect, node 4500 may include title/instructions 4501.

Figure 45B:
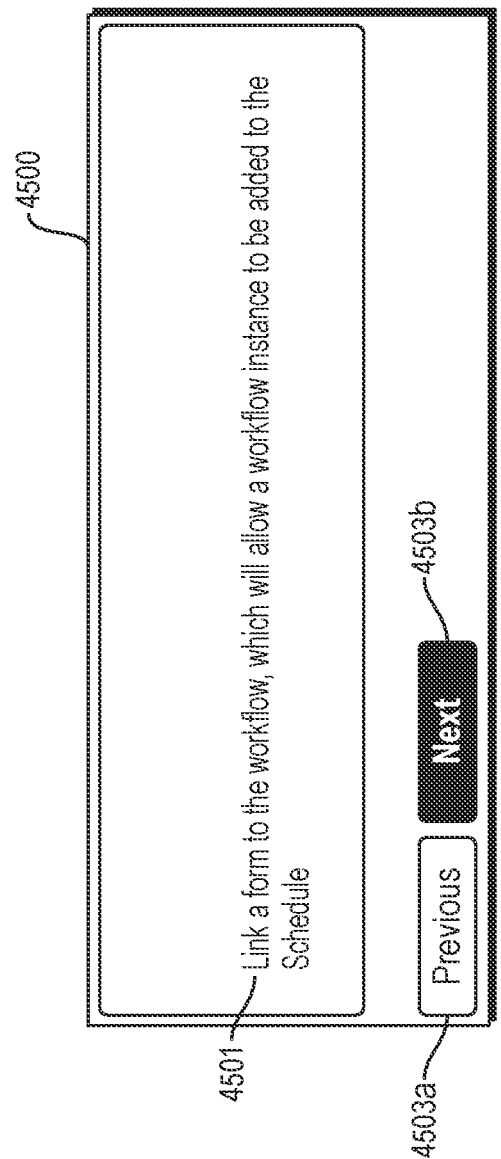
FIG. 45B illustrates rendering the instructional type node of FIG. 45A.

FIG. 45B illustrates rendering the instructional type node 4500 of FIG. 45A. In an implementation, rendered node 4500 may display instructions 4501 described above with respect to FIG. 45A. In some embodiments, an instructional type node may be used to provide instructions, e.g., 4501, to, e.g., user 101a or 101b (FIG. 1). No response value(s) may be required for such a node type. The buttons 4503a-b may allow a user to move to different portions of the workflow 3801, e.g., previous step indicated by the button 4503a or a next step indicated by the button 4503b.

In some embodiments, an instructional type node, e.g., node 4500 (FIG. 45A), may be used to perform or facilitate performing real-world tasks, including tasks involving real-world devices. Such tasks may also include, e.g., providing instructions for real-world tasks involving real-world devices. For example, in an aspect, an instructional type node may be used to display a prompt of "Please bring device XYZ to the DMARC."—where "device XYZ" refers to a real-world device.

Figure 46A:
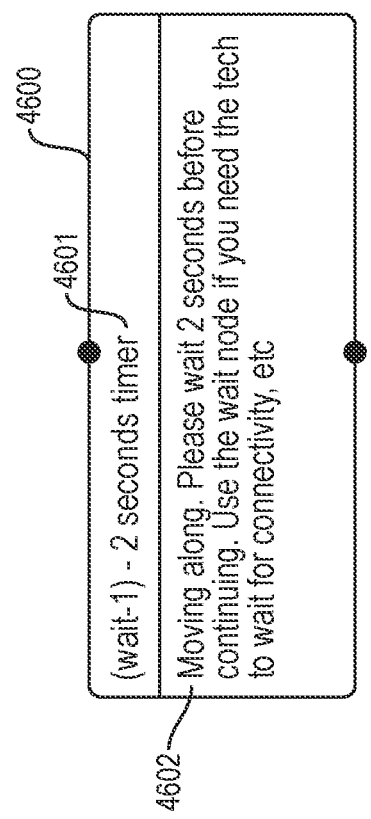
FIG. 46A illustrates a definition of a wait or countdown type node of the workflow of FIG. 38.

FIG. 46A illustrates a definition of a wait or countdown type node 4600 of the workflow 3801 of FIG. 38. As shown in FIG. 46A, in an aspect, node 4600 may include timer value 4601 and title/instructions 4602.

Figure 46B:
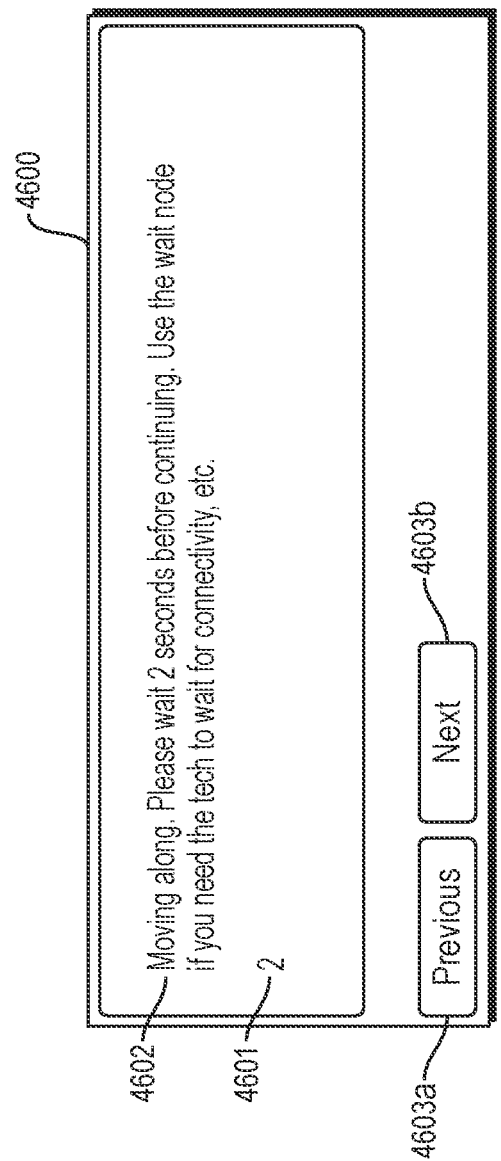
FIG. 46B illustrates rendering the countdown type node of FIG. 46A

FIG. 46B illustrates rendering the countdown type node 4600 of FIG. 46A. In an implementation, rendered node 4600 may display title 4602 and initiate a countdown of timer value 4601 described above with respect to FIG. 46A. In some embodiments, a countdown type node may be used to require a user, e.g., user 101a or 101b (FIG. 1), to wait for the timer to reach 0 before the user is able to continue. The buttons 4603a-b may allow a user to move to different portions of the workflow 3801, e.g., a previous step indicated by the button 4603a or a next step indicated by the button 4603b.

Figure 47A:
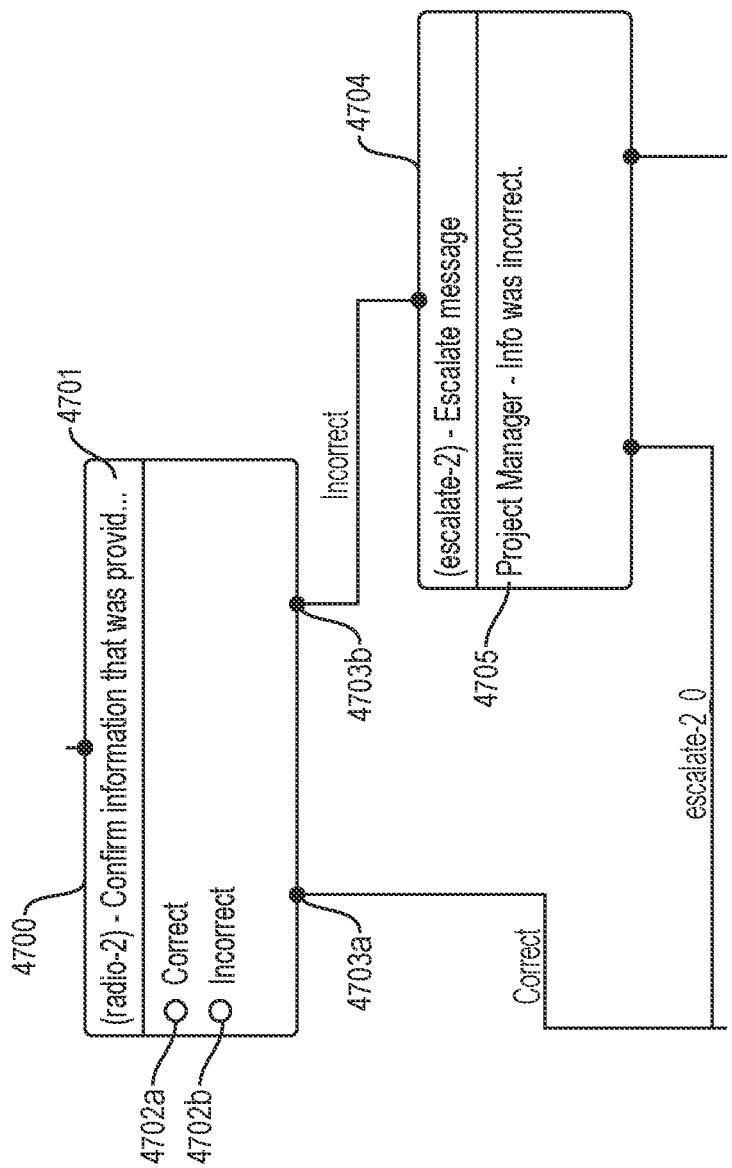
FIG. 47A illustrates a definition of two nodes of the workflow of FIG. 38.

FIG. 47A illustrates a definition of two nodes, radio button type node 4700 and escalation type node 4704, of the workflow 3801 of FIG. 38. As shown in FIG. 47A, in an aspect, radio button type node 4700 may include title/question 4701 and response values 4702a-b and corresponding handles 4703a-b. The escalation type node 4704 may include escalation details 4705. Further, handle 4703b (corresponding to response value 4702b) of radio button type node 4700 may be connected via an edge to escalation type node 4704.

FIG. 47B illustrates rendering the node 4700 of FIG. 47A and associated response values 4702a-b. In addition, FIG. 47B illustrates selection of response value 4702b (corresponding to handle 4703b). FIG. 47B further illustrates buttons 4703a-b that allow a user to move to different portions of the workflow 3801, e.g., a previous step indicated by button 4703a or a next step indicated by button 4703b.

Figure 47C:
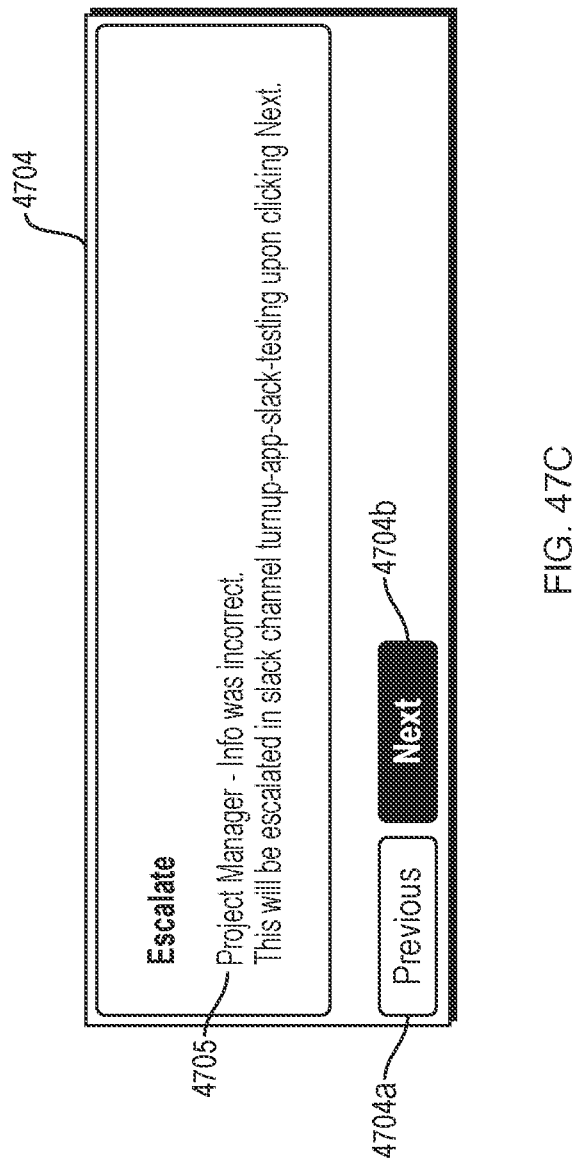
FIG. 47C illustrates rendering another node of FIG. 47A and associated response values.

FIG. 47C illustrates rendering the node 4704 of FIG. 47A. In an implementation, node 4704 may be reached from node 4700 when response value 4702b of node 4700 is selected. According to an embodiment, an escalation type node may be used to escalate an issue to, e.g., a higher level or tier of technical support. FIG. 47C further illustrates buttons 4704a-b that allow a user to move to different portions of the workflow 3801, e.g., a previous step indicated by button 4704a or a next step indicated by button 4704b.

Figure 47D:
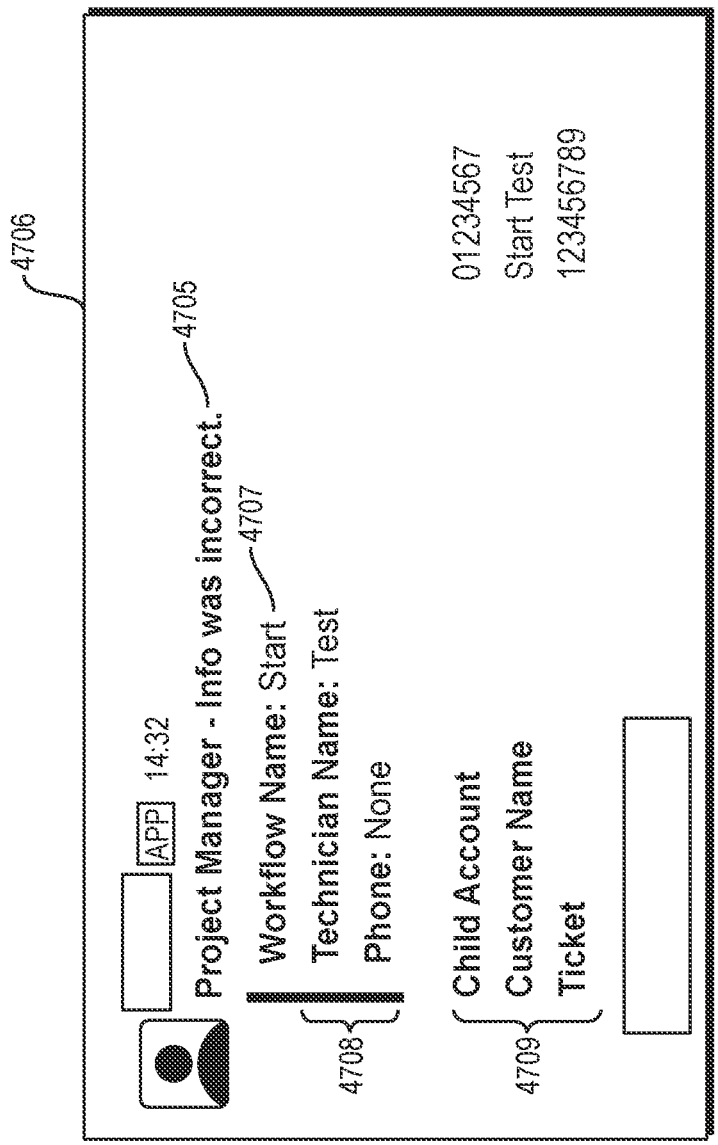
FIG. 47D illustrates a communications channel notification displayed following an escalation initiated via a node of FIG. 47A.

FIG. 47D illustrates a communications channel notification 4706 displayed following an escalation initiated via the node 4704 of FIG. 47A. As shown by FIG. 47D, notification 4706 includes escalation details 4705 (FIG. 47A), as well as workflow name 4707, technician/user information 4708, and customer/scheduling information 4709.

Figure 47E:
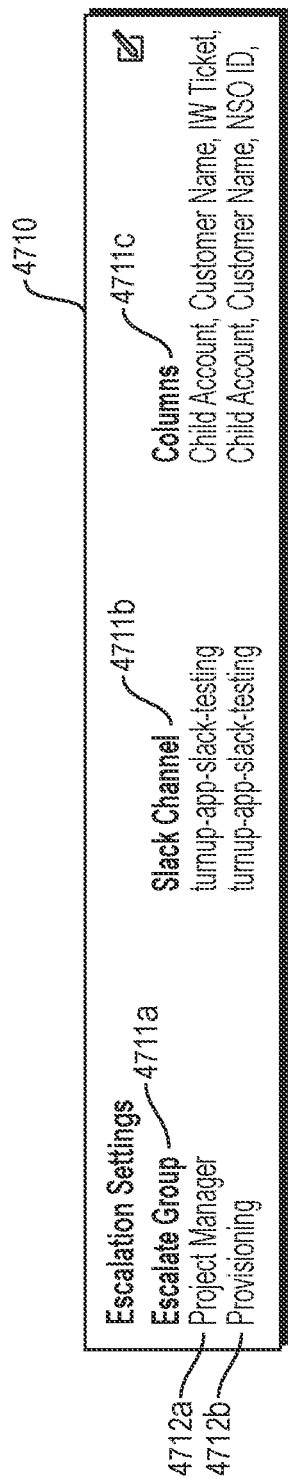
FIG. 47E is an image of escalation settings associated with the workflow of FIG. 38.

FIG. 47E is an image 4710 of escalation settings associated with the workflow 3801 of FIG. 38. As shown in FIG. 47E, the escalation settings include entries 4712a ("Project Manager" and 4712b "Provisioning", with each entry specifying, e.g., an escalation group 4711a, communications channel identifier 4711b, and customer/scheduling information 4711c.

In an aspect, workflow name 4707 of FIG. 47D may be populated with, e.g., workflow name 3901 (FIG. 39). Likewise, customer/scheduling information 4709 of FIG. 47D may be populated with information from the form associated with the workflow that was selected under "Escalation Settings" on a main flow page, e.g., information 4711c for settings entry 4712b of FIG. 47E.

Figure 48A:
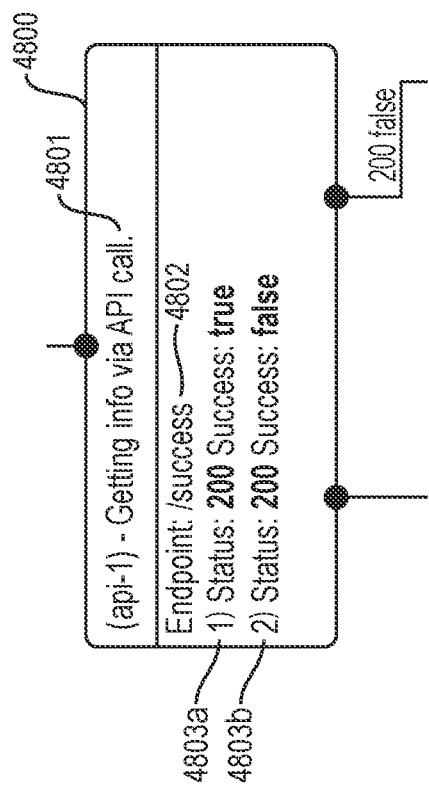
FIG. 48A illustrates a definition of an API type node of the workflow of FIG. 38.

FIG. 48A illustrates a definition of an API type node 4800 of the workflow 3801 of FIG. 38. As shown in FIG. 48A, in an aspect, node 4800 may include title/description 4801, API endpoint identifier 4802, and API response values 4803a-b.

Figure 48B:
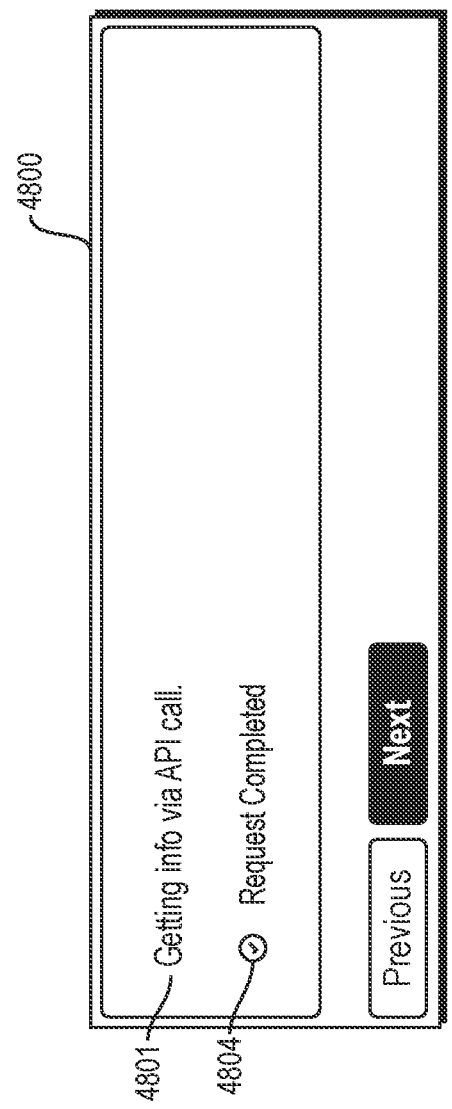
FIG. 48B illustrates rendering the API type node of FIG. 48A.

FIG. 48B illustrates rendering the API type node 4800 of FIG. 48B. In an implementation, rendered node 4800 may display title 4801 described above with respect to FIG. 48A. According to an embodiment, rendered node 4800 may further display a message 4804 indicating that an invocation of (or call to) the API endpoint identified by 4802 was successful.

Figure 49:
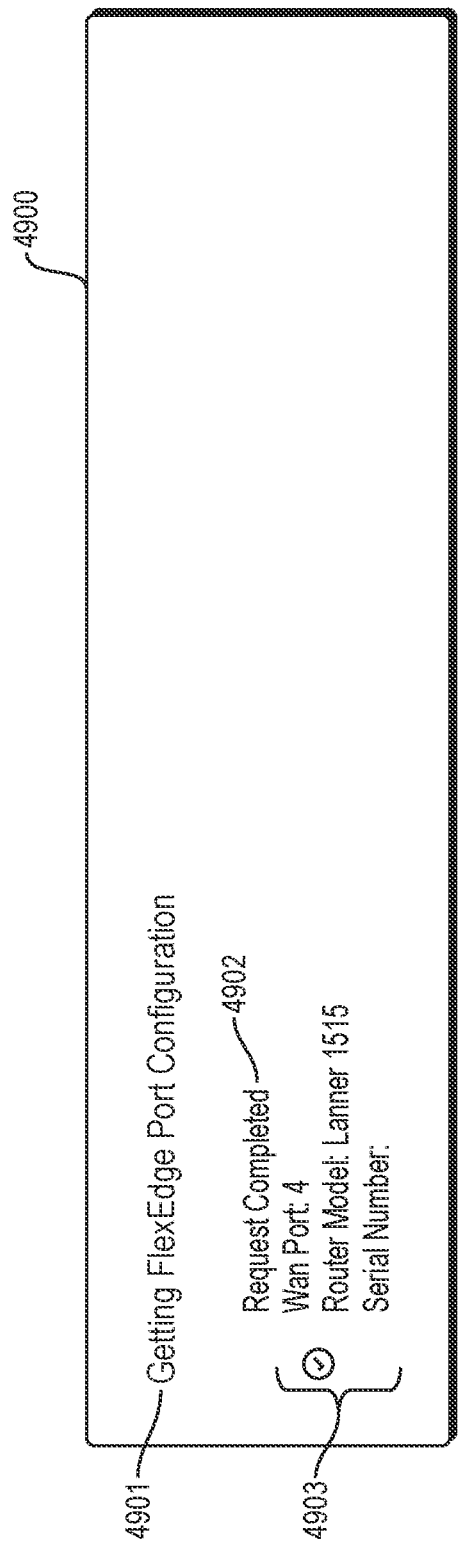
FIG. 49 illustrates rendering an exemplary API type node according to an embodiment.

FIG. 49 illustrates rendering an exemplary API type node 4900 according to an embodiment. As shown in FIG. 49, node 4900 includes a title 4901, success message 4902, and API results details 4903.

Figure 50A:
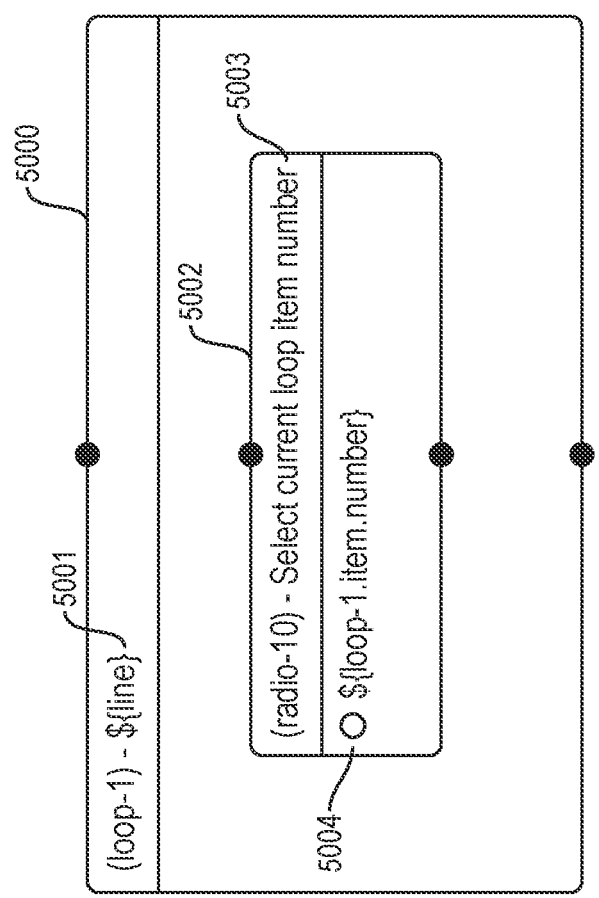
FIG. 50A illustrates a definition of a loop type node of the workflow of FIG. 38.

FIG. 50A illustrates a definition of a loop type node 5000 of the workflow 3801 of FIG. 38. As shown in FIG. 50A, node 5000 may include variable identifier 5001 and may further contain one or more internal nodes, e.g., node 5002. In turn, internal node 5002 may include label/title 5003 and variable identifier 5004. While a radio button type node 5002 is shown in FIG. 50A, it should be noted that a loop type node, e.g., node 5000, may contain one or more internal nodes of any available type, including reflow type nodes.

Figure 50B:
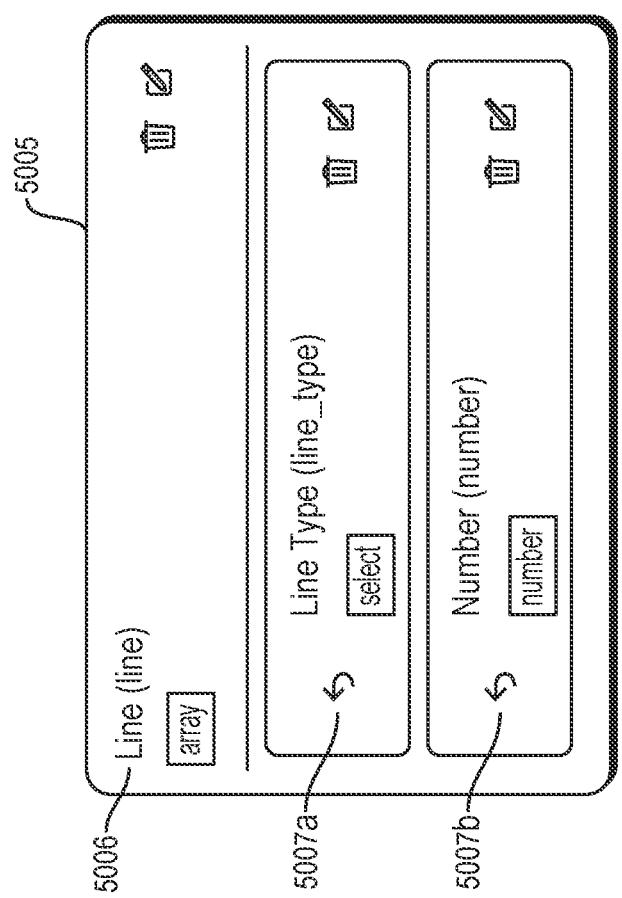
FIG. 50B illustrates a form interface for defining an array type variable according to an embodiment.

FIG. 50B illustrates a form interface 5005 for defining an array type variable 5006 according to an embodiment. In an aspect, defining variable 5006 may include defining one or more fields, e.g., fields 5007a and 5007b, of each array item or entry.

Figure 50C:
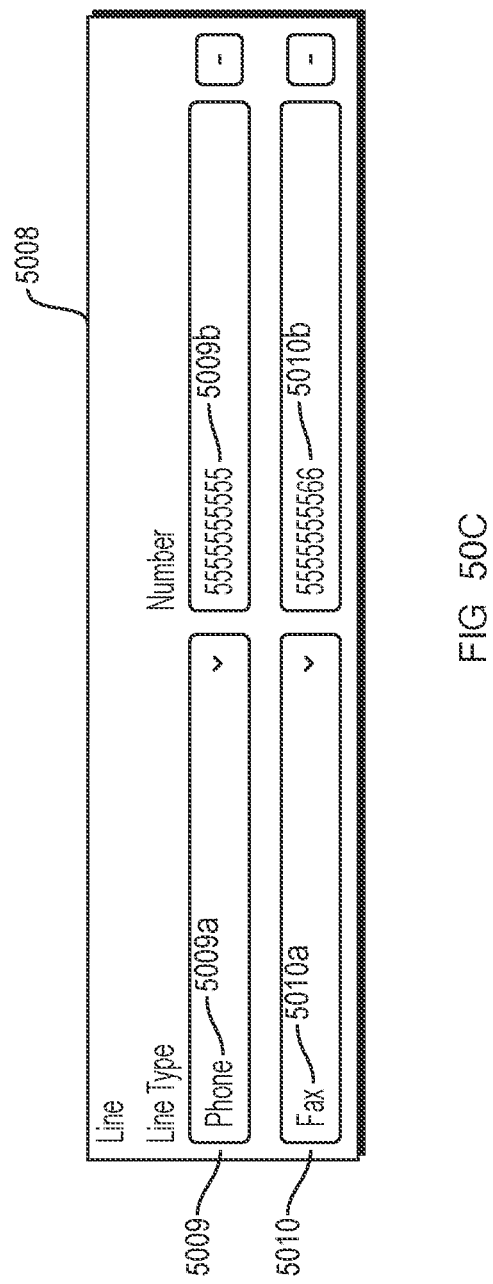
FIG. 50C illustrates a form interface for defining entries for the array type variable of FIG. 50B.

FIG. 50C illustrates a form interface 5008 for defining entries for the array type variable 5006 of FIG. 50B. As shown in FIG. 50C, a first item 5009 of variable 5006 may be defined with values 5009a and 5009b, corresponding to fields 5007a and 5007b of FIG. 50B. Likewise, a second item 5010 may be defined with values corresponding values 5010a and 5010b.

In an aspect, when a loop type node, e.g., node 5000, is executed, it will first determine an associated array type variable, e.g., variable 5006 (FIG. 50B), identified by, e.g., identifier 5004 (FIG. 50A). Then, for each item in the array, e.g., items 5009 and 5010, the loop type node will execute its one or more internal nodes, e.g., node 5002 (FIG. 50A), passing as input(s) to a given internal node value(s) for field(s) of the array item that are identified by the internal node, e.g., identifier 5004 (FIG. 50A) of node 5002, which identifies values 5009b and 5010b corresponding to field 5007b (FIG. 50B).

Figure 50E:
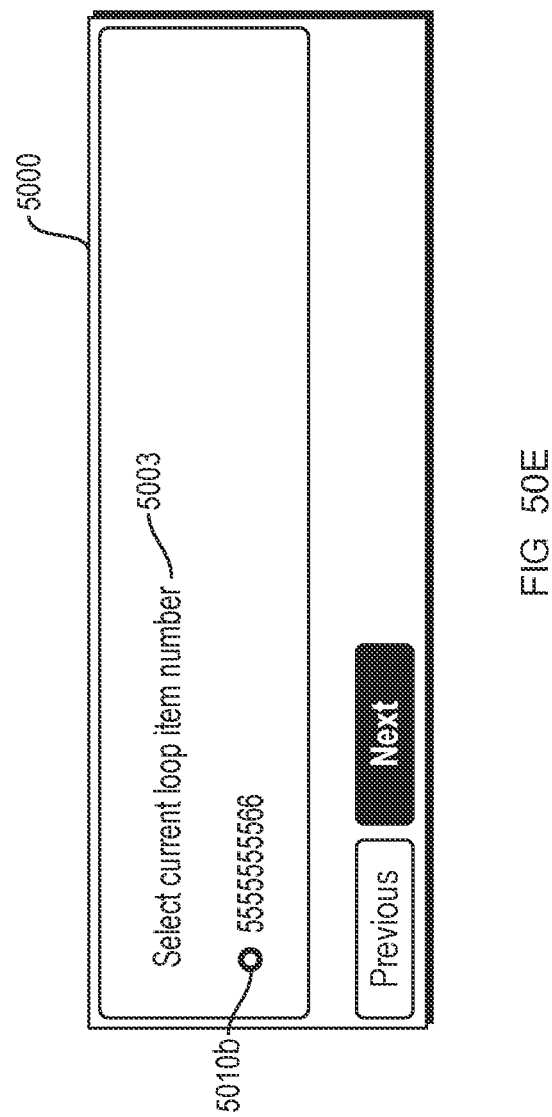

FIGS. 50D-E illustrate rendering the loop type node 5000 of FIG. 50A. FIG. 50D shows a display of entry value 5009b of first array item 5009 (FIG. 50C). Likewise, FIG. 50E shows a display of entry value 5010b of second array item 5010 (FIG. 50C).

Figure 51A:
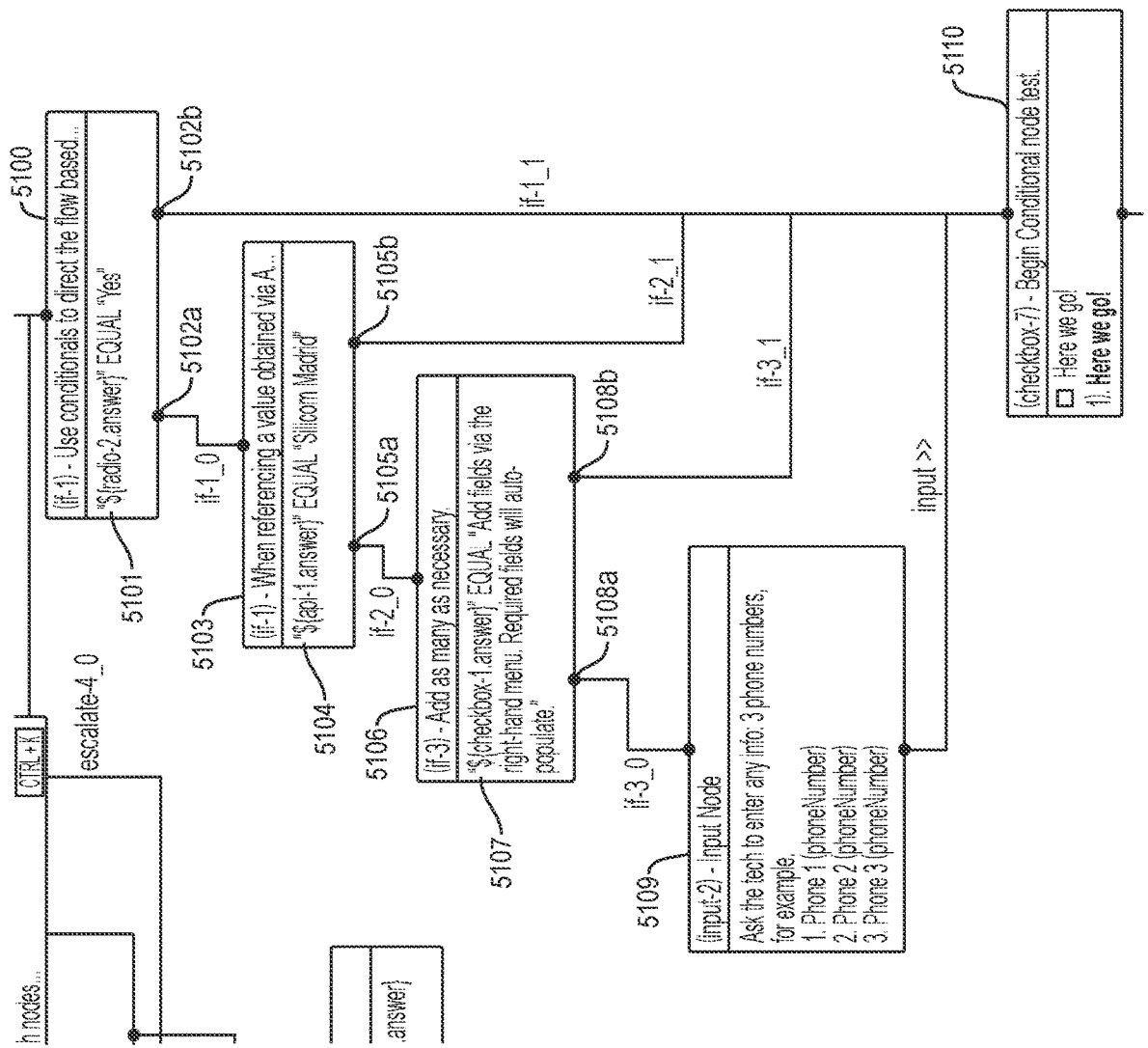
FIG. 51A illustrates defining conditional type nodes of the workflow of FIG. 38.

FIG. 51A illustrates defining conditional type nodes 5100, 5103, and 5106 of the workflow 3801 of FIG. 38. As shown in FIG. 51A, node 5100 includes logical expression 5101 and outbound handles 5102a-b, node 5103 includes logical expression 5104 and outbound handles 5105a-b, and node 5106 includes logical expression 5107 and outbound handles 5108a-b. In an embodiment, a conditional type node, e.g., node 5100, 5103, or 5106, may be used to direct a workflow, e.g. workflow 3801, based on answer(s) and response(s) to previous node(s) in the workflow. According to an aspect, when a logical expression, e.g., 5101, 5104, or 5107, evaluates to a "true" value, the workflow will follow a first outbound handle, e.g., 5102a, 5105a, or 5108a, of the node associated with the expression. Conversely, in an implementation, when the logical expression evaluates to a "false" value, the workflow will follow a second outbound handle, e.g., 5102b, 5105b, or 5108b.

Thus, for example, in FIG. 51A, if expressions 5101, 5104, and 5107 all evaluate to "true," then workflow 3801 will proceed via handle 5102a to node 5103, then via handle 5105a to node 5106, and finally via handle 5108a to node 5109. However, if any or all of expressions 5101, 5104, and 5107 evaluate to "false," then workflow 3801 will proceed to node 5110 via one of handle 5102b, 5105b, or 5108b.

Figure 51B:
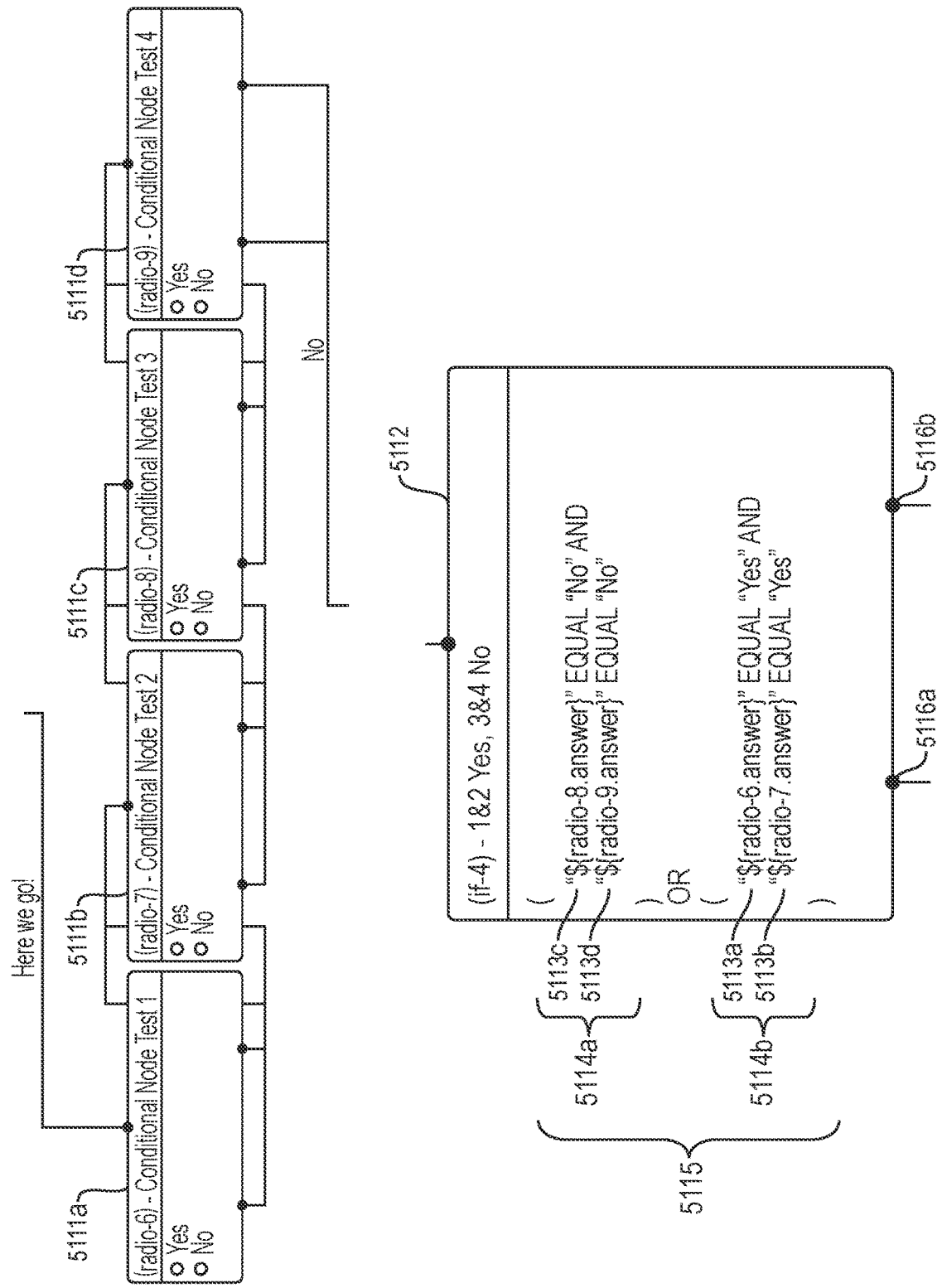
FIG. 51B illustrates defining a conditional type node of the workflow of FIG. 38.

FIG. 51B illustrates defining an additional conditional type node 5112 of the workflow 3801 of FIG. 38. As shown in FIG. 51B, node 5112 includes logical expression 5115 and outbound handles 5116a-b. The logical expression 5115 is made up of two subexpressions 5114a-b. In turn, expressions 5114a and 5114b are made up of further subexpressions 5113c-d and 5113a-b, respectively. According to an aspect, expressions 5113a, 5113b, 5113c, and 5113d may include variable identifiers corresponding to response values for radio button type nodes 5111a, 5111b, 5111c, and 5111d, respectively.

In an implementation, a conditional type node, e.g., node 5112, may direct a sequence of a workflow, e.g., workflow 3801, based on groupings of logical statements or expressions, e.g., grouping 5115.

Thus, for example, in FIG. 51B, if Yes, No, Yes, and No are selected for radio button type nodes 5111a, 5111b, 5111c, and 5111d, respectively, then expression 5115 will evaluate to "false" and workflow 3801 will proceed via outbound handle 5116b.

Figure 52:
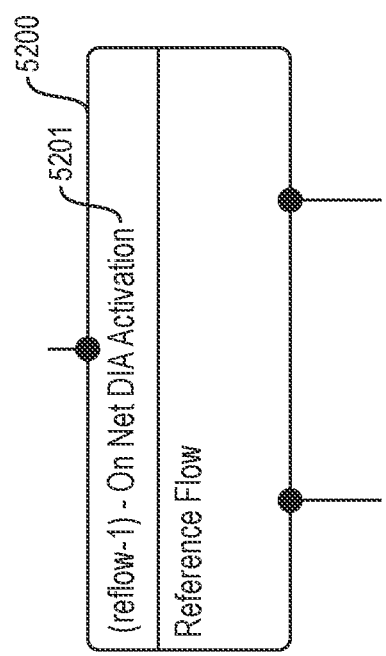
FIG. 52 illustrates a definition of a reflow type node of the workflow of FIG. 38.

FIG. 52 illustrates a definition of a reflow type node 5200 of the workflow 3801 of FIG. 38. As shown in FIG. 52, in an aspect, node 5200 may include label/title 5201. In an implementation, reflow type node 5200 may be configured to refer to a "child" workflow such as workflow that may be selected via, e.g., menu 3701 of form interface 3700 (FIG. 37). According to an embodiment, when node 5200 is executed by, e.g., an exemplary workflow execution tool, it may cause the child workflow, e.g., the workflow selected via menu 3701, to be executed, after which execution flow will return to a "parent" workflow, e.g., workflow 3801. In an aspect, a reflow type node, e.g., node 5200, may be used to invoke a reference workflow for a specific real-world device/product or testing procedure.

Figure 53:
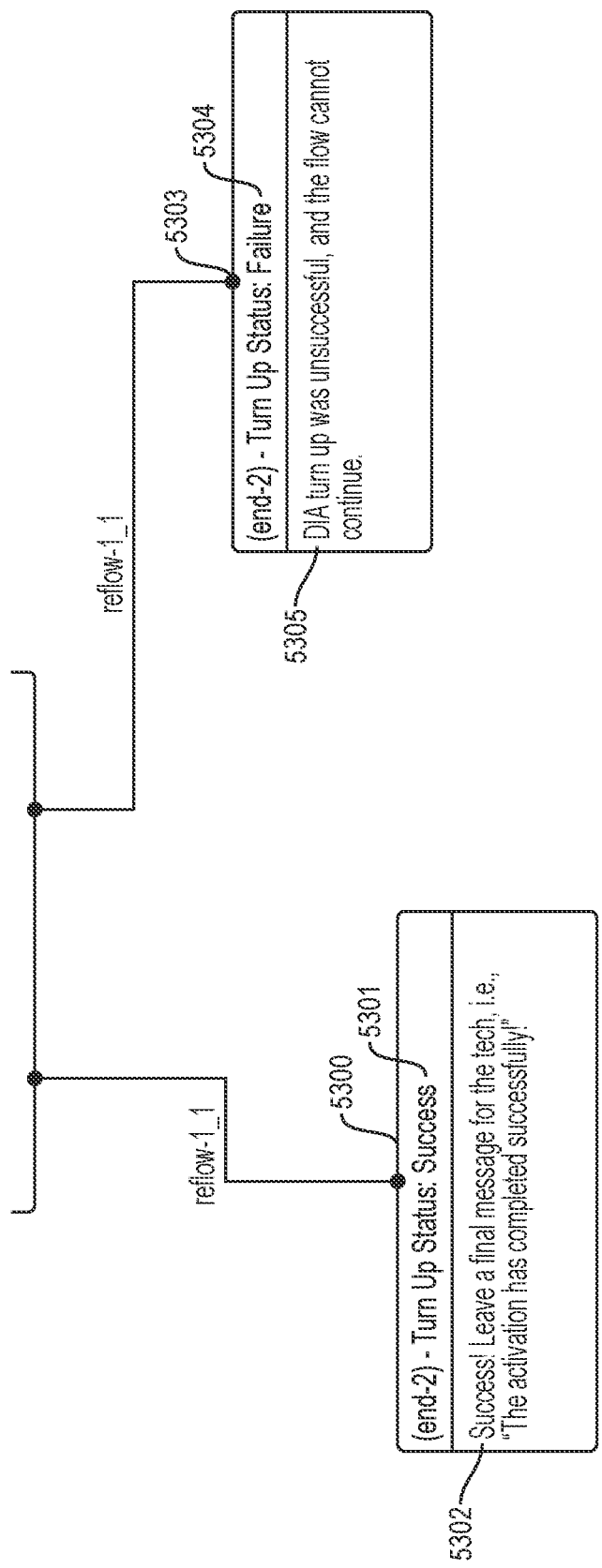
FIG. 53 illustrates a definition of end type nodes of the workflow of FIG. 38.

FIG. 53 illustrates a definition of two end type nodes 5300 and 5303 of the workflow 3801 of FIG. 38. As shown in FIG. 53, in an aspect, node 5300 may include title/description 5301 and message 5302. Likewise, node 5303 may include title/description 5304 and message 5305.

Figure 54:
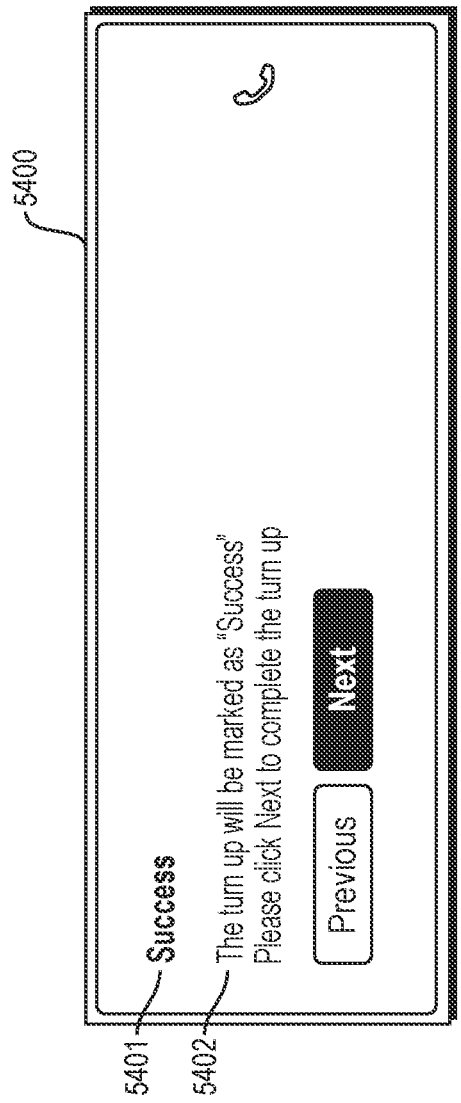
FIG. 54 illustrates rendering of an end type node according to an embodiment.

FIG. 54 illustrates rendering of an end type node 5400 according to an embodiment. As shown in FIG. 54, rendered node 5400 may include title/description 5401 and message 5402. In an aspect, the display of rendered node 5400 may correspond to contents of a defined end type node such as node 5300 or 5303 of FIG. 53.

According to an implementation, a workflow, e.g., workflow 3801 (FIG. 38), may be required to have at least one end type node indicating successful completion, e.g., end type node 5300 (FIG. 53), and may additionally have one or more end type nodes indicating unsuccessful completion.

Computer Support

Figure 55:
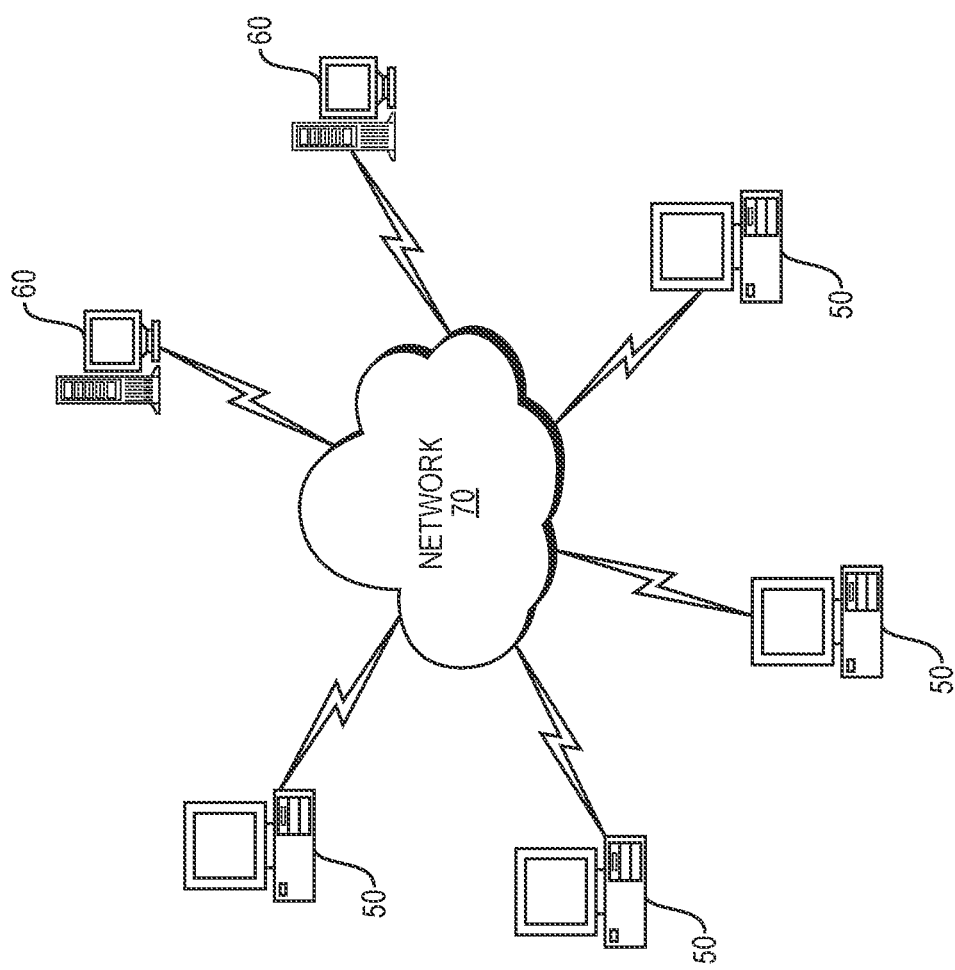
FIG. 55 illustrates a computer network or similar digital processing environment in which embodiments may be implemented.

FIG. 55 illustrates a computer network or similar digital processing environment in which embodiments of the present disclosure may be implemented.

Client computer(s)/device(s) 50 and server computer(s) 60 provide processing, storage, and input/output devices executing application programs and the like. The client computer(s)/devices 50 can also be linked through communications network 70 to other computing devices, including other client computer(s)/device(s) 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computer(s)/device(s) 50 and/or server computer (s) 60 may be configured, alone or in combination, to implement the embodiments described herein, e.g., the methods 300 and 400, among other examples. The server computer(s) 60 may not be separate server computers but part of communications network 70.

Figure 56:
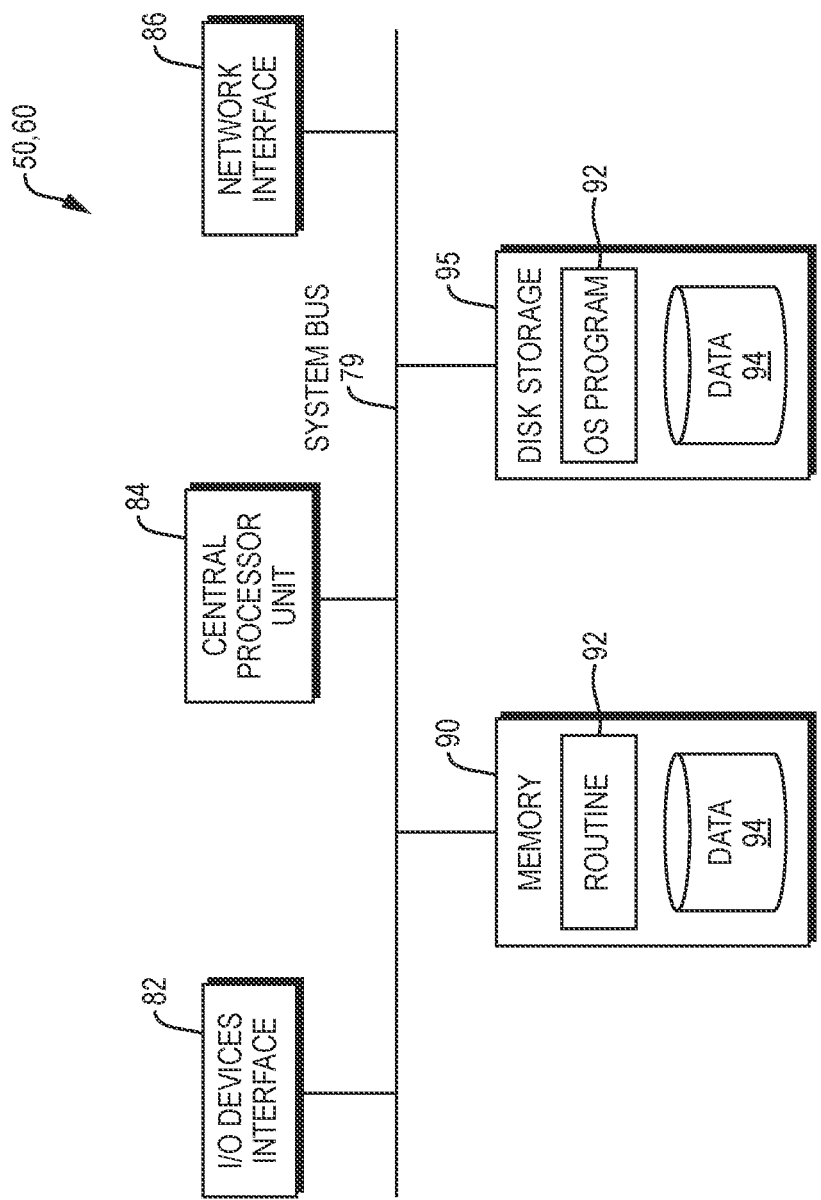
FIG. 56 is a diagram illustrating an example internal structure of a computer in the environment of FIG. 55.

FIG. 56 is a diagram of an example internal structure of a computer (e.g., client computer(s)/device(s) 50 or server computer(s) 60) in the computer system of FIG. 55. Each computer/device 50 and server computer 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output (I/O) ports, network ports, etc.) and enables the transfer of information between the elements. Attached to the system bus 79 is an I/O device interface 82 for connecting various input and output devices (e.g., keyboard, mouse, displays, printers, speakers, etc.) to the computer/device 50 or server computer 60. A network interface 86 allows the computer/device 50 or server computer 60 to connect to various other devices attached to a network (e.g., communications network 70 of FIG. 55). Memory 90 provides volatile storage for computer software instructions 92 and data 94 used to implement an embodiment of the present disclosure (e.g., the methods 300 and 400, among others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for performing a multi-phase control task for a real-world communications network, the computer-implemented method comprising:

loading a data structure in memory, the data structure including (i) one or more node entries defining one or more respective nodes corresponding to one or more steps of a workflow and (ii) a node type field for each node indicating a node type of the node; and executing the workflow, to perform the multi-phase control task for the real-world communications network, by traversing a subset of the one or more nodes, the traversing including, at each node of the subset:

determining the node type of the node by parsing the node type field of the loaded data structure in the memory, the node type field indicating the node type;

based on the determined node type, rendering, on a display, a graphical representation of the node;

receiving a data input; and responsive to determining the node type is not a final node type:

performing a phase of the multi-phase control task for the real-world communications network;

determining a next node of the subset based on (i) the received data input and (ii) one or more response values of the node, the one or more response values associated with the determined node type; and moving to the determined next node;
responsive to determining the node type is the final node type, completing the performance of the multi-phase control task for the real-world communications network; and
wherein for a given node of the subset, the node type is an application programming interface (API) type, and:
(a) the receiving the data input comprises receiving an API response by invoking an API indicated by an API endpoint field of the given node, the API response including (i) a status, (ii) a result, and (iii) a message;
(b) the rendering, on the display, comprises rendering, on the display, the received API response including the status, the result, and the message; and (c) the determining the next node of the subset based on (i) the received data input and (ii) the one or more response values of the node, comprises: identifying a given response value of the one or more response values by comparing at least one of (i) the status and a status field of the given response value, (ii) the result and a result field of the given response value, and (iii) the message and a message field of the given response value, and determining, based on the given response value, the next node.

2. The computer-implemented method of claim 1, wherein, for at least one node of the subset:
the rendering, on the display, comprises rendering, on the display, the one or more response values;
the receiving the data input comprises receiving a user input; and
the determining the next node of the subset based on (i) the received data input and (ii) the one or more response values of the at least one node, comprises:
identifying, based on the received user input, one or more given response values of the one or more response values; and
determining, based on the one or more given response values, the next node.

3. The computer-implemented method of claim 2, wherein the node type of the at least one node is at least one of: a radio button type, a checkbox type, and a field input type.

4. The computer-implemented method of claim 1, where for at least one node of the subset, the node type is a countdown type, and wherein:
the receiving the data input comprises obtaining a time interval associated with the at least one node; and
the rendering, on the display, comprises rendering, on the display, the time interval.

5. The computer-implemented method of claim 4, further comprising:
suspending the executing the workflow for a duration of the time interval.

6. The computer-implemented method of claim 1, where for at least one node of the subset, the node type is an escalation type, and wherein:
the rendering, on the display, comprises rendering, on the display, a communications interface for a communications channel associated with the at least one node;
the receiving the data input comprises receiving a user input in response to rendering the communications interface; and
the determining the next node of the subset based on (i) the received data input and (ii) the one or more response values of the at least one node, comprises:
identifying, based on the received user input, a given response value of the one or more response values; and
determining, based on the given response value, the next node.

7. The computer-implemented method of claim 6, where receiving the user input comprises:
acquiring an image relating to a real-world device.

8. The computer-implemented method of claim 1, where for at least one node of the subset, the node type is a conditional type, and wherein:
the receiving the data input comprises obtaining one or more prior inputs corresponding to one or more nodes of the subset prior to the at least one node in the workflow; and
the determining the next node of the subset based on (i) the received data input and (ii) the one or more response values of the at least one node, comprises:
identifying, based on the one or more prior inputs, a given response value of the one or more response values; and
determining, based on the given response value, the next node.

9. The computer-implemented method of claim 1, wherein, for at least one node of the subset, the rendering, on the display, comprises:
rendering, on the display, an image.

10. The computer-implemented method of claim 1, further comprising:
generating the data structure by defining the one or more nodes.

11. The computer-implemented method of claim 10, wherein defining the one or more nodes includes, for each node:
creating, in the data structure, based on a user input, the node entry corresponding to the node;
determining, based on the user input, the node type of the node;
creating and populating, in the data structure, the node type field for the node based on the determined node type;
determining, based on the node type and the user input, one or more edge response values of the node; and
creating, in the data structure, based on the user input, one or more edges of the data structure corresponding to the one or more edge response values, each of the one or more edges defining a connection between the node and an adjacent node of the data structure.

12. The computer-implemented method of claim 1, wherein the multi-phase control task for the real-world communications network includes a control task for a real-world device, and wherein:
the control task for the real-world device includes at least one of: (i) activating the real-world device, (ii) configuring the real-world device, (iii) verifying one or more operating parameters of the real-world device, (iv) instantiating one or more virtual network functions for the real-world device, and (v) instantiating one or more virtual machines for the real-world device.

13. A computer-based system for performing a multi-phase control task for a real-world communications network, the computer-based system comprising:
a display;
a processor; and a memory with computer code instructions stored thereon, the processor and the memory, with the computer code instructions, being configured to cause the computer-based system to:
- load a data structure in the memory, the data structure including (i) one or more node entries defining one or more respective nodes corresponding to one or more steps of a workflow and (ii) a node type field for each node indicating a node type of the node; and
- execute the workflow, to perform the multi-phase control task for the real-world communications network, by traversing a subset of the one or more nodes, the traversing including, at each node of the subset:
  - determining the node type of the node by parsing the node type field of the loaded data structure in the memory, the node type field indicating the node type;
  - based on the determined node type, rendering, on the display, a graphical representation of the node;
  - receiving a data input; and
  - responsive to determining the node type is not a final node type:
    - performing a phase of the multi-phase control task for the real-world communications network;
    - determining a next node of the subset based on (i) the received data input and (ii) one or more response values of the node, the one or more response values associated with the determined node type; and
    - moving to the determined next node;
  - responsive to determining the node type is the final node type, completing the performance of the multi-phase control task for the real-world communications network; and
  - wherein for a given node of the subset, the node type is an application programming interface (API) type, and: (a) the receiving the data input comprises receiving an API response by invoking an API indicated by an API endpoint field of the given node, the API response including (i) a status, (ii) a result, and (iii) a message; (b) the rendering, on the display, comprises rendering, on the display, the received API result response including the status, the result, and the message; and (c) the determining the next node of the subset based on (i) the received data input and (ii) the one or more response values of the node, comprises: identifying a given response value of the one or more response values by comparing at least one of (i) the status and a status field of the given response value, (ii) the result and a result field of the given response value, and (iii) the message and a message field of the given response value, and determining, based on the given response value, the next node.

14. The computer-based system of claim 13, wherein, for at least one node of the subset:
- the rendering, on the display, comprises rendering, on the display, the one or more response values;
- the receiving the data input comprises receiving a user input; and
- the determining the next node of the subset based on (i) the received data input and (ii) the one or more response values of the at least one node, comprises:
  - identifying, based on the received user input, one or more given response values of the one or more response values; and
  - determining, based on the one or more given response values, the next node.

15. The computer-based system of claim 13, where for at least one node of the subset, the node type is an escalation type, and wherein:
- the rendering, on the display, comprises rendering, on the display, a communications interface for a communications channel associated with the at least one node;
- the receiving the data input comprises receiving a user input in response to rendering the communications interface; and
- the determining the next node of the subset based on (i) the received data input and (ii) the one or more response values of the node, comprises:
  - identifying, based on the received user input, a given response value of the one or more response values; and
  - determining, based on the given response value, the next node.

16. The computer-based system of claim 13, wherein the processor and the memory, with the computer code instructions, are further configured to cause the computer-based system to:
- generate the data structure by defining the one or more nodes.

17. The computer-based system of claim 16 where, in defining the one or more nodes, the processor and the memory, with the computer code instructions, are further configured to cause the computer-based system to, for each node:
- create, in the data structure, based on a user input, the node entry corresponding to the node;
- determine, based on the user input, the node type of the node;
- create and populate, in the data structure, the node type field for the node based on the determined node type;
- determine, based on the node type and the user input, one or more edge response values of the node; and
- create, in the data structure, based on the user input, one or more edges of the data structure corresponding to the one or more edge response values, each of the one or more edges defining a connection between the node and an adjacent node of the data structure.

18. A non-transitory computer program product for performing a multi-phase control task for a real-world communications network, the non-transitory computer program product comprising a computer-readable medium with computer code instructions stored thereon, the computer code instructions being configured, when executed by a processor, to cause an apparatus associated with the processor to:
- load a data structure in memory, the data structure including (i) one or more node entries defining one or more respective nodes corresponding to one or more steps of a workflow and (ii) a node type field for each node indicating a node type of the node; and
- execute the workflow, to perform the multi-phase control task for the real-world communications network, by traversing a subset of the one or more nodes, the traversing including, at each node of the subset:
  - determining the node type of the node by parsing the node type field of the loaded data structure in the memory, the node type field indicating the node type;
  - based on the determined node type, rendering, on a display, a graphical representation of the node;
  - receiving a data input; and
  - responsive to determining the node type is not a final node type:

performing a phase of the multi-phase control task for the real-world communications network;

determining a next node of the subset based on (i) the received data input and (ii) one or more response values of the node, the one or more response values associated with the determined node type; and moving to the determined next node;

responsive to determining the node type is the final node type, completing the performance of the multi-phase control task for the real-world communications network; and wherein for a given node of the subset, the node type is an application programming interface (API) type, and: (a) the receiving the data input comprises receiving an API response by invoking an API indicated by an API endpoint field of the given node, the API response including (i) a status, (ii) a result, and (iii) a message; (b) the rendering, on the display, comprises rendering, on the display, the received API response including the status, the result, and the message; and (c) the determining the next node of the subset based on (i) the received data input and (ii) the one or more response values of the node, comprises: identifying a given response value of the one or more response values by comparing at least one of (i) the status and a status field of the given response value, (ii) the result and a result field of the given response value, and (iii) the message and a message field of the given response value, and determining, based on the given response value, the next node.

\* \* \* \* \*

UNITED STATES PATENT AND TRADEMARK OFFICE
CERTIFICATE OF CORRECTION

PATENT NO. : 12,160,338 B1  
APPLICATION NO. : 18/340591  
DATED : December 3, 2024  
INVENTOR(S) : Adam Weiner and Stephen Herrick Page 1 of 1

It is certified that error appears in the above-identified patent and that said Letters Patent is hereby corrected as shown below:

In the Claims

In Claim 13, Column 37, Line 43: delete "API result response" and insert -- API response --.

Signed and Sealed this  
First Day of April, 2025

Coke Morgan Stewart  
*Acting Director of the United States Patent and Trademark Office*